United States Patent
Yoon et al.

(10) Patent No.: US 10,042,199 B2
(45) Date of Patent: Aug. 7, 2018

(54) LIQUID CRYSTAL DISPLAY

(71) Applicant: SAMSUNG DISPLAY CO., LTD., Yongin, Gyeonggi-Do (KR)

(72) Inventors: Seok Kyu Yoon, Asan-si (KR); Eun Ju Kim, Suwon-si (KR); Hyung June Kim, Anyang-si (KR); Byoung Sun Na, Seoul (KR); Sung Jae Park, Wonju-si (KR); Yun Seok Lee, Asan-si (KR); Ik Soo Lee, Seoul (KR); Jun Pyo Lee, Asan-si (KR); Wan-Soon Im, Cheonan-si (KR); Jong Hak Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 243 days.

(21) Appl. No.: 14/813,578

(22) Filed: Jul. 30, 2015

(65) Prior Publication Data
US 2016/0033816 A1   Feb. 4, 2016

(30) Foreign Application Priority Data

Jul. 31, 2014 (KR) .................. 10-2014-0098506
Nov. 25, 2014 (KR) .................. 10-2014-0165454
Dec. 8, 2014 (KR) .................. 10-2014-0175233

(51) Int. Cl.
*G02F 1/1335* (2006.01)
*G02F 1/1343* (2006.01)
(Continued)

(52) U.S. Cl.
CPC .... *G02F 1/133514* (2013.01); *G02F 1/13439* (2013.01); *G02F 1/133512* (2013.01);
(Continued)

(58) Field of Classification Search
CPC ......... G02F 1/133707; G02F 1/133514; G02F 2201/52
(Continued)

(56) References Cited

U.S. PATENT DOCUMENTS 7,209,198 B2 * 4/2007 Park .................. G02F 1/133514
349/106
7,212,262 B2 * 5/2007 Kang ................ G02F 1/133514
349/106
(Continued)

FOREIGN PATENT DOCUMENTS

JP    2010-80423 A    4/2010
JP    2013-117674 A   6/2013
(Continued)

OTHER PUBLICATIONS

EPO Search Report dated Nov. 25, 2015, for corresponding European Patent application 15178841.1, (10 pages).
(Continued)

*Primary Examiner* — Hoan C Nguyen
(74) *Attorney, Agent, or Firm* — Lewis Roca Rothgerber Christie LLP

(57) ABSTRACT

One or more embodiments of the present invention are directed to a liquid crystal display including: a first substrate and a second substrate facing each other; a first color pixel area, a second color pixel area, a third color pixel area, and a white pixel area on any one of the first substrate and the second substrate; and a liquid crystal layer between the first substrate and the second substrate. A first color filter is disposed in each of the first color pixel area and the white pixel area, and each of the first, second, third, and white pixel areas includes a plurality of domains, each two adjacent domains having a boundary between them, and the first
(Continued)

color filter is disposed at at least one of the boundaries between the domains in the white pixel area.

11 Claims, 70 Drawing Sheets

(51) Int. Cl.
*G02F 1/1362* (2006.01)
*G02F 1/1337* (2006.01)

(52) U.S. Cl.
CPC .. *G02F 1/134336* (2013.01); *G02F 1/136209* (2013.01); *G02F 1/133707* (2013.01); *G02F 2001/133519* (2013.01); *G02F 2001/136222* (2013.01); *G02F 2201/48* (2013.01); *G02F 2201/52* (2013.01)

(58) Field of Classification Search
USPC .................................. 349/156, 106
See application file for complete search history.

(56) References Cited

U.S. PATENT DOCUMENTS

| | | | | |
|---|---|---|---|---|
| 7,436,472 B2 * | 10/2008 | Baek | ...................... | G02B 5/201 |
| | | | | 349/106 |
| 7,714,970 B2 | 5/2010 | Kim et al. | | |
| 7,724,324 B2 * | 5/2010 | Chae | ................... | G02F 1/13394 |
| | | | | 349/106 |
| 8,184,243 B2 * | 5/2012 | Kim | ................... | G02F 1/133514 |
| | | | | 349/106 |
| 2005/0122445 A1 | 6/2005 | Park et al. | | |
| 2008/0316413 A1 | 12/2008 | Cho | | |
| 2012/0188494 A1 * | 7/2012 | Yoshida | ............ | G02F 1/133514 |
| | | | | 349/106 |
| 2013/0222747 A1 * | 8/2013 | Hisada | .............. | G02F 1/134336 |
| | | | | 349/106 |
| 2014/0300845 A1 * | 10/2014 | Tamaki | ............. | G02F 1/133514 |
| | | | | 349/65 |

FOREIGN PATENT DOCUMENTS

| | | |
|---|---|---|
| KR | 10-2005-0064358 A | 6/2005 |
| KR | 10-2007-0070328 A | 7/2007 |
| KR | 10-0752215 B1 | 8/2007 |
| KR | 10-2008-0077734 A | 8/2008 |
| KR | 10-2010-0077979 A | 7/2010 |
| KR | 10-2011-0109443 A | 10/2011 |
| KR | 10-2012-0066323 A | 6/2012 |
| KR | 10-2012-0134222 A | 12/2012 |
| KR | 10-2013-0031155 A | 3/2013 |
| WO | WO 2014/002982 A1 | 1/2014 |

OTHER PUBLICATIONS

English machine translation of Int'l Publication WO 2014/002982 dated Jan. 3, 2014, (23 pages).

\* cited by examiner

LIQUID CRYSTAL DISPLAY

CROSS-REFERENCE TO RELATED APPLICATION

This application claims priority to and the benefit of Korean Patent Application No. 10-2014-0098506 filed in the Korean Intellectual Property Office on Jul. 31, 2014, Korean Patent Application No. 10-2014-0165454 filed in the Korean Intellectual Property Office on Nov. 25, 2014, and Korean Patent Application No. 10-2014-0175233 filed in the Korean Intellectual Property Office on Dec. 8, 2014, the entire content of each of which is incorporated herein by reference.

BACKGROUND

1. Field

One or more aspects of embodiments of the present invention relate to a liquid crystal display, and more particularly, to a liquid crystal display including a white pixel.

2. Description of the Related Art

As one of the most widely currently used flat panel displays, a liquid crystal display (LCD) typically includes two display panels on which field generating electrodes such as a pixel electrode and a common electrode are formed, and a liquid crystal layer positioned between the two display panels. The liquid crystal display can display an image by generating an electric field on the liquid crystal layer by applying a voltage to the field generating electrodes, determining alignment directions of liquid crystal molecules of the liquid crystal layer using the generated field, and controlling polarization of incident light.

Since a liquid crystal display is not self-emissive, a light source is required. In this case, the light source may be either a separately provided artificial light source or a natural light source. The artificial light source used in the liquid crystal display typically includes a light emitting diode (LED), a cold cathode fluorescent lamp (CCFL), and an external electrode fluorescent lamp (EEFL). The artificial light source can be positioned at a back surface or a side surface of the liquid crystal display to supply light. Herein, the light source may be a white light source for emitting white light.

In general, a color filter is employed for the liquid crystal display to facilitate the display of red, green, and blue colors. Recently, a liquid crystal display including white pixels, in addition to red, green, and blue pixels, is being developed to increase the luminance thereof.

However, in the liquid crystal display including the white pixels, there can be a step (or a separation along the thickness direction) between the white pixels at which no color filter is formed and the other pixels at which corresponding color filters are formed.

Further, color coordinates of light that is supplied from a light source and passes through the white pixels are different from those of the light in which separate beams first pass through the red pixels, the green pixels, and the blue pixels, and then are combined together.

The above information disclosed in this Background section is only for enhancement of understanding of the background of the invention and therefore it may contain information that does not form the prior art that is already known in this country to a person of ordinary skill in the art.

SUMMARY

One or more aspects of embodiments of the present invention are directed to a liquid crystal display having a substantially flat top surface without steps (or substantially without a separation along the thickness direction) between white pixels and other pixels.

One or more aspects of embodiments of the present invention are directed to a liquid crystal display capable of preventing or substantially reducing the color shift generated at white pixels.

In one or more embodiments of the present invention, a liquid crystal display includes a first color pixel area, a second color pixel area, a third color pixel area, and a white pixel area; a first substrate and a second substrate facing the first substrate; a first color filter disposed in each of the first color pixel area and the white pixel area on the first substrate or the second substrate; a second color filter disposed in the second color pixel area on the first substrate or the second substrate; a third color filter disposed in the third color pixel area on the first substrate or the second substrate; and a liquid crystal layer between the first substrate and the second substrate, wherein each of the first, second, third, and white pixel areas includes a plurality of domains, each of two adjacent domains having a boundary between them, and the first color filter is disposed at at least one of the boundaries between the domains in the white pixel area.

The liquid crystal display may further include a pixel electrode in each of the first, second, third, and white pixel areas, and the first color filter may be overlapped with the pixel electrode in the white pixel area.

The first color filter may have a width that is greater than that of a stem portion of the pixel electrode in the white pixel area.

A width of the first color filter in the white pixel area may range from 5 μm to 25 μm.

An area of the first color filter in the white pixel area may be 50% or less of the white pixel area.

The first color filter is a green color filter, and an area of the first color filter in the white pixel area may be 50% or less of the white pixel area.

The first color filter may be a red color filter or a blue color filter, and an area of the first color filter in the white pixel area may be 20% or less of the white pixel area.

The first color filter may be a green color filter, and an area of the first color filter in the white pixel area may range from 17% to 26% of the white pixel area.

The first color filter may be a blue color filter, and an area of the first color filter in the white pixel area may range from 12% to 17% of the white pixel area.

The white pixel area may further include the second color filter.

The second color filter in the white pixel area may be disposed at at least one of the boundaries between the domains.

The first color filter may extend in a first direction and the second color filter may extend in a second direction different from the first direction.

The first color filter and the second color filter may be overlapped with each other.

The first color filter and the second color filter may cross each other, and may be overlapped with each other at a portion at which they cross each other.

The first color may be a green color filter, and an area of the first color filter in the white pixel area may range from 17% to 26% of the white pixel area, while the second color may be a blue color filter, and an area of the second color filter in the white pixel area may range from 12% to 17% of the white pixel area.

The third color filter may be further disposed in the white pixel area.

The first color filter, the second color filter, and the third color filter may be overlapped with each other in the white pixel area.

The first color filter, the second color filter, and the third color filter may be overlapped with each other at a center portion of the white pixel area.

The liquid crystal display may further include an overcoat on the first color filter, the second color filter, and the third color filter.

A width of the first color filter in the white pixel area may range from 19 µm to 29 µm.

The liquid crystal display may further include an overcoat on the first color filter, the second color filter, and the third color filter, and a thickness of the overcoat may range from 2.9 µm to 4.7 µm.

The first color filter in the white pixel area may have a width of 29 µm.

The liquid crystal display may further include an overcoat on the first color filter, the second color filter, and the third color filter, and a thickness of the overcoat may range from 3.3 µm to 3.4 µm.

One or more embodiments of the present invention provides a liquid crystal display including: a first color pixel area, a second color pixel area, a third color pixel area, and a white pixel area; a first substrate and a second substrate facing the first substrate; a first color filter disposed in each of the first color pixel area and the white pixel area on the first substrate or the second substrate; a second color filter disposed in the second color pixel area on the first substrate or the second substrate; a third color filter disposed in the third color pixel area on the first substrate or the second substrate; a light-blocking member disposed at at least one of the boundaries between any of the first, second, third, and white pixel areas; and a liquid crystal layer between the first substrate and the second substrate, wherein each of the first, second, third, and white pixel areas includes a plurality of domains, each two adjacent domains having a boundary between them, and the light-blocking member is disposed at at least one of the boundaries between the domains in the white pixel area.

The liquid crystal display may further include a pixel electrode in each of the first, second, third, and white pixel areas, and the light-blocking member may be overlapped with the pixel electrode in the white pixel area, and the light-blocking member may have a width that is greater than that of the pixel electrode.

A width of the light-blocking member in the white pixel area may range from 5 µm to 11 µm.

The liquid crystal display may further include an overcoat on the first color filter, the second color filter, and the third color filter, and a thickness of the overcoat may range from 3.4 µm to 4.7 µm.

The light-blocking member in the white pixel area may have a width of 8 µm.

The liquid crystal display may further include an overcoat disposed on the first color filter, the second color filter, and the third color filter, and the overcoat may have a thickness of 4.1 µm.

One or more embodiments of the present invention provide a liquid crystal display including: a first color pixel area, a second color pixel area, a third color pixel area, and a white pixel area; a first substrate and a second substrate facing the first substrate; a first color filter disposed in the first color pixel area on the first substrate or the second substrate; a second color filter disposed in the second color pixel area on the first substrate or the second substrate; a third color filter disposed in the third color pixel area on the first substrate or the second substrate; and a liquid crystal layer between the first substrate and the second substrate, wherein at least two of the first color filter, the second color filter, and the third color filter may be further disposed in the white pixel area, and at least two of the first color filter, the second color filter, and the third color filter are overlapped with each other in the white pixel area.

The first color filter and the second color filter may be overlapped with each other in the white pixel area.

The first color filter and the second color filter may cross each other in the white pixel area, and may be overlapped with each other at a portion at which they cross each other.

The liquid crystal display may further include a pixel electrode disposed in each of the first, second, third, and white pixel areas on the first substrate or the second substrate, and the first color filter and the second color filter may be overlapped with the pixel electrode in the white pixel area.

The first color filter may be a green color filter, and the second color filter may be a blue color filter.

An area of the first color filter in the white pixel area may range from 17% to 26% of the white pixel area, and an area of the second color filter in the white pixel area may range from 12% to 17% of the white pixel area.

The pixel electrode may include a first subpixel electrode and a second subpixel electrode, and the first color filter and the second color filter may be overlapped with the second subpixel electrode in the white pixel area.

A data voltage that is applied to the second subpixel electrode may be lower than a data voltage that is applied to the first subpixel electrode.

The first color filter may be a green color filter, and the second color filter may be a blue color filter.

The first color filter, the second color filter, and the third color filter may be overlapped with each other in the white pixel area.

The first color filter and the second color filter may cross each other in the white pixel area, and the third color filter may be disposed at a portion at which the first color filter and the second color filter cross each other.

The liquid crystal display may further include a pixel electrode disposed in each of the first, second, third, and white pixel areas, and the first color filter and the second color filter may be overlapped with the pixel electrode in the white pixel area.

A thickness of a portion at which the first color filter, the second color filter, and the third color filter are overlapped with each other in the white pixel area may be the same as a cell gap of the liquid crystal display.

The first color filter and the third color filter in the white pixel area may have a bent L-shape, and the first color filter and the third color filter may be symmetric to each other, with a symmetric axis therebetween, and may be overlapped with each other at the symmetric axis.

The second color filter in the white pixel area may be disposed at the symmetric axis.

The white pixel area may have a rectangular shape including two short sides and two long sides, and the symmetric axis may be at a center portion of the white pixel area and may extend along a direction parallel with the short sides.

A thickness of a portion at which the first color filter, the second color filter, and the third color filter are overlapped with each other in the white pixel area may be the same as a cell gap of the liquid crystal display.

One or more embodiments of the present invention provide a liquid crystal display including: a first color pixel area, a second color pixel area, a third color pixel area, and a white pixel area; a first substrate and a second substrate facing the first substrate; a first color filter disposed in each of the first color pixel area and the white pixel area on the first substrate or the second substrate; a second color filter disposed in the second color pixel area on the first substrate or the second substrate; a third color filter disposed in the third color pixel area on the first substrate or the second substrate; a pixel electrode and a common electrode on the first substrate; and a liquid crystal layer between the first substrate and the second substrate, wherein each of the first, second, third, and white pixel areas includes a plurality of domains, each two adjacent domains having a boundary between them, and the first color filter is disposed at at least one of the boundaries between domains in the white pixel area.

The pixel electrode may include a plurality of slits.

The plurality of domains may include a first domain and a second domain, and a direction of extension of the slits in the first domain may be different from a direction of extension of the slits in the second domain.

One or more embodiments of the present invention provide a liquid crystal display including: a first color pixel area, a second color pixel area, a third color pixel area, and a white pixel area; a first substrate and a second substrate facing the first substrate; a first color filter disposed in each of the first color pixel area and the white pixel area on the first substrate or the second substrate; a second color filter disposed in the second color pixel area on the first substrate or the second substrate; a third color filter disposed in the third color pixel area on the first substrate or the second substrate; and a liquid crystal layer between the first substrate and the second substrate, wherein the first color filter is entirely disposed in the white pixel area, and a thickness of the first color filter in the white pixel area is smaller than a thickness of the first color filter in the first color pixel area.

The first color filter may be a green color filter or a blue color filter.

The first color filter may be a green color filter, and a thickness ratio of the first color filter in the white pixel area to the first color filter in the first color pixel area may be in a range of 0% to 20%.

The first color filter may be a green color filter, and a thickness ratio of the first color filter in the white pixel area to the first color filter in the first color pixel area may be in a range of 5% to 10%, inclusive.

The first color filter may be a blue color filter, and a thickness ratio of the first color filter in the white pixel area to the first color filter in the first color pixel area may be in a range of 0% to 10%.

The first color filter may be a blue color filter, and a thickness ratio of the first color filter in the white pixel area to the first color filter in the first color pixel area may be in a range of 1% to 5%, inclusive.

The second color filter may be in each of the second color pixel area and the white pixel area.

The first color filter may be a green color filter, and the second color filter may be a blue color filter.

A thickness ratio of the first color filter in the white pixel area to the first color filter in the first color pixel area may be in a range of 0% to 20%, and a thickness ratio of the second color filter in the white pixel area to the second color filter in the second color pixel area may be in a range of 0% to 10%, inclusive.

A thickness ratio of the first color filter in the white pixel area to the first color filter in the first color pixel area may be in a range of 5% to 10%, inclusive, and a thickness ratio of the second color filter in the white pixel area to the second color filter in the second color pixel area may be in a range of 1% to 5%, inclusive.

The second color filter may be entirely disposed in the white pixel area, and the thickness of the second color filter in the white pixel area may be smaller than the thickness of the first color filter in the second color pixel area.

The second color filter may be on the first color filter in the white pixel area.

One or more embodiments of the present invention provide a liquid crystal display including: a first color pixel area, a second color pixel area, a third color pixel area, and a white pixel area; a first substrate and a second substrate facing each other; a first color filter disposed in each of the first color pixel area and the white pixel area on the first substrate or the second substrate; a second color filter disposed in the second color pixel area on the first substrate or the second substrate; a third color filter disposed in the third color pixel area on the first substrate or the second substrate; and a liquid crystal layer between the first substrate and the second substrate, wherein an area ratio of the first color filter in the white pixel area to the white pixel area is in a range of 0% to 25%.

The first color filter may be a green color filter or a blue color filter.

The first color filter may be a green color filter, and an area ratio of the first color filter in the white pixel area to the white pixel area may be in a range of 10% to 25%, inclusive.

The first color filter may be a blue color filter, and an area difference between the first color filter in the white pixel area and the white pixel area may be in a range of 8% to 15%, inclusive.

The second color filter may be disposed in each of the second color pixel area and the white pixel area.

The first color filter may be a green color filter, and the second color filter may be a blue color filter.

An area ratio of the second color filter in the white pixel area to the white pixel area may be in a range of 0% to 20%, inclusive.

An area ratio of the first color filter in the white pixel area to the white pixel area may be in a range of 10% to 25%, inclusive, and an area ratio of the second color filter in the white pixel area to the white pixel area may be in a range of 8% to 15%, inclusive.

The liquid crystal display according to one or more embodiments of the present invention can reduce the size of the steps (or separations along the thickness direction) between the color pixels by forming the color filters in the white pixel.

Further, generation of the color shift in the white pixel can be prevented or substantially reduced by adjusting an area ratio of the color filters that are formed in the white pixel.

DETAILED DESCRIPTION

Figure 1:
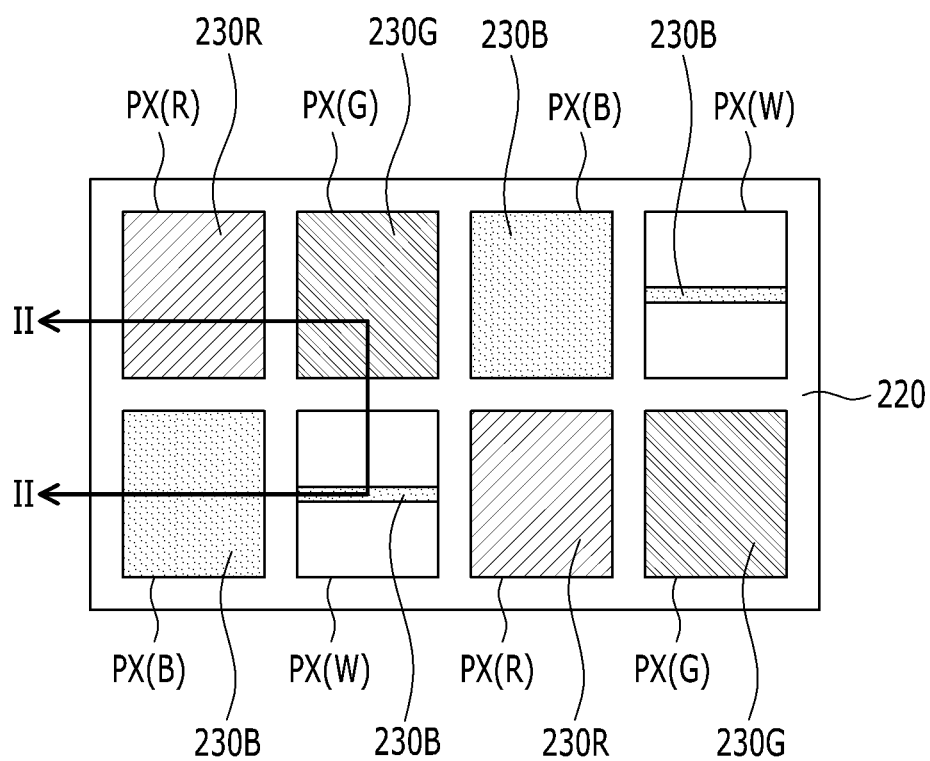
FIG. 1 is a top plan schematic view illustrating a liquid crystal display according to one or more embodiments of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Expressions such as "at least one of" and "one of," when preceding a list of elements, modify the entire list of elements and do not modify the individual elements of the list. Further, the use of "may" when describing embodiments of the present invention refers to "one or more embodiments of the present invention."

As used herein, the terms "use," "using," and "used" may be considered synonymous with the terms "utilize," "utilizing," and "utilized," respectively. Also, the term "exemplary" is intended to refer to an example or illustration. In addition, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

First, a liquid crystal display according to one or more embodiments of the present invention will be described with reference to FIG. 1 and FIG. 2.

Figure 2:
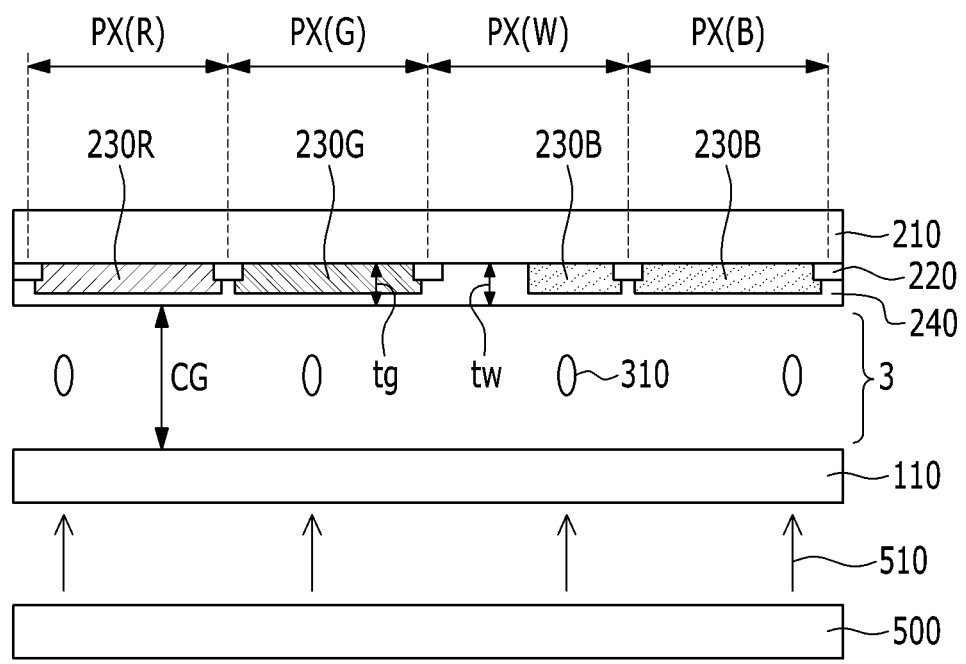
FIG. 2 is a cross-sectional schematic view of the liquid crystal display according to one or more embodiments of the present invention taken along the line II-II of FIG. 1.

FIG. 1 is a top plan schematic view illustrating a liquid crystal display according to one or more embodiments of the present invention, and FIG. 2 is a cross-sectional schematic view of the liquid crystal display according to the embodiments of the present invention taken along the line II-II of FIG. 1.

The liquid crystal display according to the present embodiments includes a first substrate 110 and a second substrate 210 facing the first substrate 110, and a liquid crystal layer 3 between the first substrate 110 and the second substrate 210.

The first substrate 110 and the second substrate 210 may be each independently formed of glass, plastic, and/or the like. The liquid crystal layer 3 may include a plurality of liquid crystal molecules 310, and may be formed as a positive type or a negative type.

A light source 500 may be disposed (or positioned) at a rear (or bottom) surface of the first substrate 110. The light source 500 may include a light emitting diode (LED) to supply light 510. An orientation of the liquid crystal molecules 310 of the liquid crystal layer 3 is determined according to an electric filed generated between the first substrate 110 and the second substrate 210, and an amount of light that passes through the liquid crystal layer 3 is varied according to the orientation of the liquid crystal molecules 310. A plurality of color filters 230R, 230G, and 230B are disposed on the second substrate 210. When the light passing through the liquid crystal layer 3 passes through the color filters 230R, 230G, and 230B, some of the light passes through the color filters, while the rest of the light is absorbed into the filters.

The liquid crystal display may include a plurality of pixel areas, and the pixels areas may be divided into a first color pixel area PX(R), a second color pixel area PX(G), a third color pixel area PX(B), and a fourth color pixel area PX(W). The first color pixel area PX(R), the second color pixel area PX(G), and the third color pixel area PX(B) respectively display different colors, and their colors may be combined into a white color. The fourth color pixel area PX(W) may display a white color. For example, the first color pixel area PX(R), the second color pixel area PX(G), the third color pixel area PX(B), and the fourth color pixel area PX(W) may respectively display red, green, blue, and white colors.

However, embodiments of the present invention are not limited thereto. For example, the first color pixel area PX(R), the second color pixel area PX(G), the third color pixel area PX(B), and the fourth color pixel area PX(W) may respectively display cyan, magenta, yellow, and white colors.

In some embodiments, the color filters 230R, 230G, and 230B are positioned in the respective pixel areas on the second substrate 210. Specifically, the first color filter 230R, the second color filter 230G, and the third color filter 230B are respectively disposed in the first color pixel area PX(R), the second color pixel area PX(G), and the third color pixel area PX(B). The first color filter 230R may serve as a red filter for exclusively permitting red light (of the white light emitted from the light source) to pass therethrough. The second color filter 230G may serve as a green filter for exclusively permitting green light (of the white light emitted from the light source) to pass therethrough. The first color filter 230R may serve as a blue filter for exclusively permitting blue light (of the white light emitted from the light source) to pass therethrough.

A color pattern may be formed in the fourth color pixel area PX(W), and the color pattern may include at least one of the first color filter 230R, the second color filter 230G, and the third color filter 230B. As shown in FIG. 1 and FIG. 2, the third color filter 230B is disposed (or positioned) in the fourth color pixel area PX(W). However, embodiments of the present invention are not limited thereto. For example, the first color filter 230R or the second color filter 230G may be disposed in the fourth color pixel area PX(W) instead of the third color filter 230B. The location of the filters may be varied depending on the desired effect. For example, the green filter and/or the blue filter may be formed in the fourth color pixel area PX(W) to prevent a yellowish phenomenon thereof (e.g., to prevent or reduce a yellowish appearance of the images displayed by the liquid crystal display). In some embodiments, the color pattern that is disposed in the fourth color pixel area PX(W) may be a light-blocking member 220, which will be described later. In some embodiments, the light-blocking member 220 and at least one of the first color filter 230R, the second color filter 230G, and the third color filter 230B may be disposed together in the fourth color pixel area PX(W). For example, the second color filter 230G and the light-blocking member 220 may be formed in the fourth color pixel area PX(W).

Each of the pixel areas PX(R), PX(G), PX(B), and PX(W) may be formed in a rectangular shape having two short sides and two long sides. At the first color pixel area PX(R), the second color pixel area PX(G), and the third color pixel area PX(B), each of the first color filter 230R, the second color filter 230G, and the third color filter 230B may be formed in a substantially quadrangular shape, which may be similar to the shapes of the pixel areas PX(R), PX(G), and PX(B), respectively.

The third color filter 230B may be also disposed at a region of the fourth color pixel area PX(W). In the fourth color pixel area PX(W), the third color filter 230B may be formed to have a bar-like shape extending in one direction. For example, in the fourth color pixel area PX(W), the third color filter 230B is disposed at the center of the fourth color pixel area PX(W), between the two short sides thereof, to extend in a direction that is in parallel to the short sides. However, the shape of the third color filter 230B may be changed in various ways without being limited thereto.

The third color filter 230B disposed in the fourth color pixel area PX(W) and the third color filter 230B disposed in the third color pixel area PX(B) may be both formed in the same process act. Accordingly, the third color filter 230B disposed in the fourth color pixel area PX(W) and the third color filter 230B disposed in the third color pixel area PX(B) may be formed to have the same thickness. However, embodiments of the present invention are not limited thereto. In some embodiments, the third color filter 230B disposed in the fourth color pixel area PX(W) and the third color filter 230B disposed in the third color pixel area PX(B) may have different thicknesses, even when both filters are formed in the same process act. For example, by using (or utilizing) a halftone mask or a slit mask, the third color filter 230B disposed in the fourth color pixel area PX(W) can be formed to have a smaller thickness than that of the third color filter 230B disposed in the third color pixel area PX(B). Alternatively, the third color filters 230B disposed in the fourth color pixel area PX(W) and the third color pixel area PX(B) may be respectively formed in different process acts.

In some embodiments, color coordinates of a white light displayed from the fourth color pixel area PX(W) (in which no color filter is formed) may be different from color coordinates of a white color obtained by combining light emitted from the pixel areas PX(R), PX(G), and PX(B). In other words, a color shift may be generated in the white light displayed by the fourth color pixel area PX(W). In embodiments of the present invention, it is possible to enable color coordinates of the white light passing through the fourth color pixel area PX(W) to approach color coordinates of the white light obtained after separate beams of light pass through the pixel areas PX(R), PX(G), and PX(B) and are combined, by forming the first color filter 230R, the second color filter 230G, and the third color filter 230B in the fourth color pixel area PX(W), and adjusting the ratio of the pixel areas PX(R), PX(G), and PX(B).

The light-blocking member 220 may be further disposed (or positioned) at the boundaries between the first color pixel area PX(R), the second color pixel area PX(G), the third color pixel area PX(B), and the fourth color pixel area PX(W). The light-blocking member 220 may be disposed at the boundaries between the pixel areas PX(R), PX(G), PX(B), and PX(W) to prevent or reduce color mixture, light leakage, and/or the like.

An overcoat 240 may be further disposed on the first color filter 230R, the second color filter 230G, the third color filter 230B, and the light-blocking member 220. The overcoat 240 may serve to planarize a top surface of the second substrate 210.

When no color filter is formed in the fourth color pixel area PX(W) to display a white color, it may be difficult perform the planarization due to steps (or separations along the thickness direction) formed between the fourth color pixel area PX(W) and the other pixel areas. As a result, a cell gap CG (as illustrated in FIG. 2) may be larger in the region where the fourth color pixel area PX(W) is positioned than that of the regions where pixel areas PX(R), PX(G), and PX(B) are positioned. However, in embodiments of the present invention, the steps (or separations along the thickness direction) between the fourth color pixel area PX(W) and the other pixel areas can be removed (or substantially removed) by forming at least one of the first color filter 230R, the second color filter 230G, and the third color filter 230B in the fourth color pixel area PX(W), thereby accomplishing easy planarization. Accordingly, the cell gap CG of the fourth color pixel area PX(W) can be similar to that of the pixel areas PX(R), PX(G), and PX(B).

A thickness "tw" of the overcoat 240 disposed in the fourth color pixel area PX(W) may be substantially the same as a thickness "tg" of the overcoat 240 disposed in each of the pixel areas PX(R), PX(G), and PX(B). In some embodiments, a difference between the thickness "tw" of the overcoat 240 disposed in the fourth color pixel area PX(W) and the thickness "tg" of the overcoat 240 disposed in each of the pixel areas PX(R), PX(G), and PX(B) may be within a range of 10% of the thickness "tg" thereof. Here, the thickness "tw" and/or "tg" of the overcoat 240 may be a distance from the top surface of the second substrate 210 (the surface of the second substrate 210 facing the liquid crystal layer) to a top surface of the overcoat 240 (the surface of the overcoat 240 facing the liquid crystal layer), or a distance from a gap between the color filters 230R, 230G, and 230B to a layer disposed below the color filters 230R, 230G, and 230B. Herein, the layer disposed below the color filters 230R, 230G, and 230B may be a passivation layer disposed above the thin film transistor.

In some embodiments, none of the first color filter 230R, the second color filter 230G, and the third color filter 230B is formed at a white-light region of the fourth color pixel area PX(W). Since no color filter is disposed at the white-light region, white light can be displayed by enabling all wavelength bands of a visual ray region (or visible spectrum) to pass through the white-light region. However, embodiments of the present invention are not limited thereto. For example, a white color filter may be disposed in the fourth color pixel area PX(W).

In this case, the white color filter may be formed of a transparent photoresist that can permit all the wavelength bands of the visual ray region to pass therethrough.

Next, a liquid crystal display according to one or more embodiments of the present invention will be described in more detail with reference to FIG. 3 to FIG. 5.

Figure 3:
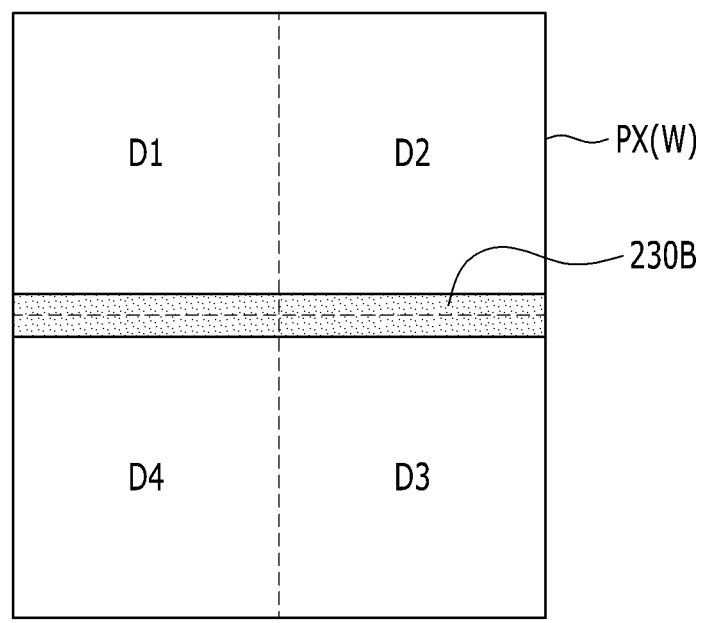
FIG. 3 is a top plan schematic view illustrating a domain included in a fourth color pixel area of a liquid crystal display according to one or more embodiments of the present invention.
Figure 4:
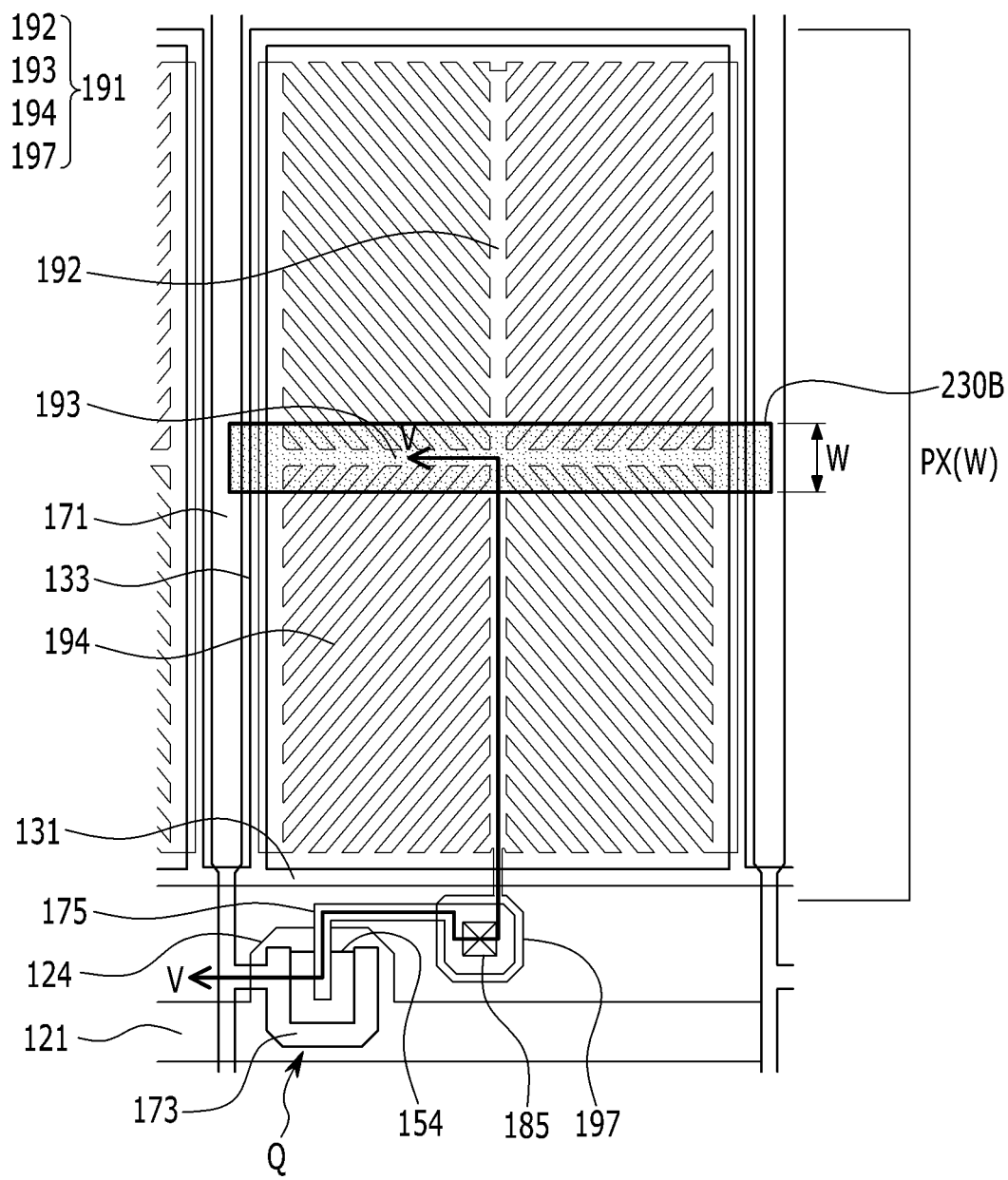
FIG. 4 is a top plan schematic view illustrating a fourth color pixel of a liquid crystal display according to one or more embodiments of the present invention.
Figure 5:
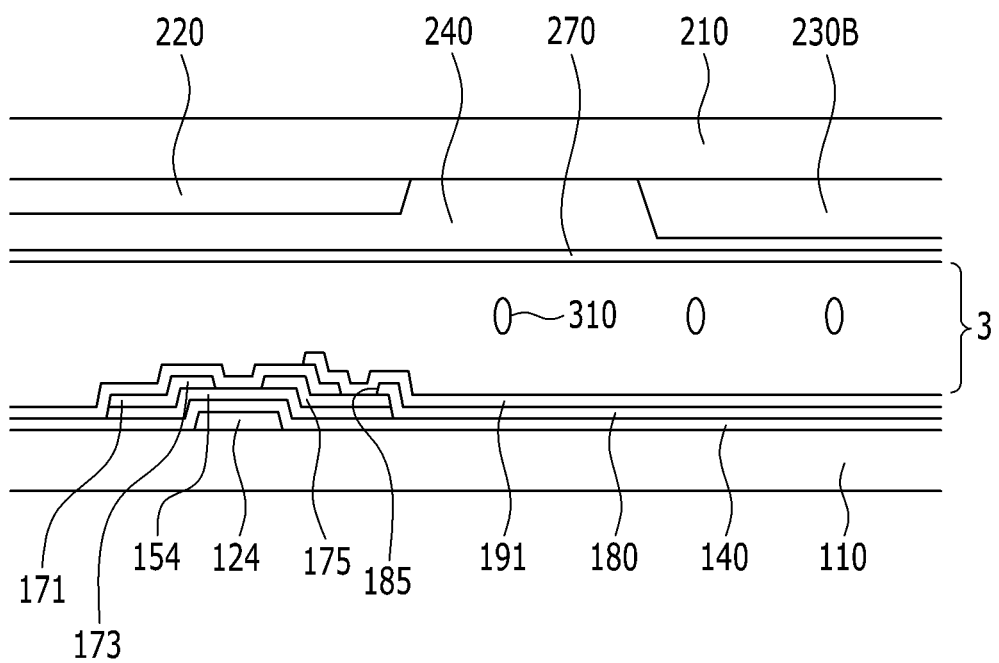
FIG. 5 is a cross-sectional schematic view illustrating a fourth color pixel of the liquid crystal display according to one or more embodiments of the present invention taken along the line V-V of FIG. 4.

FIG. 3 is a top plan schematic view illustrating a domain included in a fourth color pixel area of a liquid crystal display according to one or more embodiments of the present invention, FIG. 4 is a top plan schematic view illustrating a fourth color pixel of a liquid crystal display according to one or more embodiments of the present invention, and FIG. 5 is a cross-sectional schematic view illustrating a fourth color pixel of the liquid crystal display according to the embodiments of the present invention taken along the line V-V of FIG. 4.

As shown in FIG. 3, the fourth color pixel area PX(W) of the liquid crystal display includes 4 domains (i.e., a first domain D1, a second domain D2, a third domain D3, and a fourth domain D4). Specifically, the fourth color pixel area PX(W) is divided into 4 domains by one horizontal line (or horizontal reference line) and one vertical line (or vertical reference line). Here, a domain disposed at an upper side with respect to the horizontal line and at a left side with respect to the vertical line is referred to as the first domain, and a domain disposed at the upper side with respect to the horizontal line and at a right side with respect to the vertical line is referred to as the second domain. Similarly, a domain disposed at a lower side with respect to the horizontal line and at the right side with respect to the vertical line is referred to as the third domain, and a domain disposed at the lower side with respect to the horizontal line and at left side with respect to the vertical line is referred to as the fourth domain.

Alternatively, the domains may be divided according to a direction in which the liquid crystal molecules 310 are inclined (or tilted). In an initial state, the liquid crystal molecules 310 are disposed in a direction that is perpendicular to the first substrate 110. However, when an electric field is generated in the liquid crystal layer 3, the liquid crystal molecules 310 are inclined at a predetermined (or set) angle. In this case, the liquid crystal molecules 310 positioned at a first domain D1, a second domain D2, a third domain D3, and a fourth domain D4 may be inclined in different directions. The liquid crystal molecules 310 positioned at the first domain D1 may be inclined in an upper left direction with regard to the vertical line and the horizontal line, and the liquid crystal molecules 310 positioned at the second domain D2 may be inclined in an upper right direction with regard to the vertical line and the horizontal line. The liquid crystal molecules 310 positioned at the third domain D3 may be inclined in a lower right direction with regard to the vertical line and the horizontal line, and the liquid crystal molecules 310 positioned at the fourth domain D4 may be inclined in a lower left direction with regard to the vertical line and the horizontal line This criterion for dividing the domains is merely an example, and the domains may be divided according to another criterion.

Each of the first color pixel area PX(R), the second color pixel area PX(G), and the third color pixel area PX(B) may include 4 domains.

In some embodiments, the third color filter 230B is formed in the fourth color pixel area PX(W) and is disposed at the boundaries between the domains D1, D2, D3, and D4. Specifically, the third color filter 230B may be disposed at a boundary between the first domain D1 and the fourth domain D4, and a boundary between the second domain D2 and the third domain D3. In this case, the third color filter 230B is extending along and is overlapped with the horizontal line serving as the reference for dividing the fourth color pixel area PX(W) into the domains D1 and D2, and D3 and D4.

The boundaries between the domains D1, D2, D3, and D4 may be a dark portion (e.g., light transmittance may be low at the boundaries between the domains). By disposing the third color filter 230B in the boundary region between the domains, the overall reduction in transmittance may be reduced or minimized.

As shown in FIG. 4 and FIG. 5, a gate line 121 and a storage electrode line 131 are formed on the first substrate 110.

In some embodiments, the gate line 121 mainly extends in a horizontal direction (substantially parallel to the horizontal reference line of FIG. 3), and transmits a gate signal. A gate electrode 124 is formed to protrude from the gate line 121.

The storage electrode line 131 extends in a direction that is parallel with the gate line 121 (i.e., a horizontal direction), to transfer a predetermined (or set) voltage (e.g., a common voltage). A storage electrode 133 is formed to extend from the storage electrode line 131. The storage electrode 133 may be formed to have such a shape so as to surround an edge of the fourth color pixel area PX(W).

A gate insulating layer 140 is formed on the gate line 121, the gate electrode 124, the storage electrode line 131, and the storage electrode 133. The gate insulating layer 140 may be formed of any suitable inorganic insulating material, such as a silicon nitride (SiNx) and/or a silicon oxide (SiOx). In addition, the gate insulating layer 140 may be formed as a single layer or as a multilayer.

In some embodiments, a semiconductor 154 is formed on the gate insulating layer 140. The semiconductor 154 is overlapped with the gate electrode 124. The semiconductor 154 may be formed of amorphous silicon, polycrystalline silicon, and/or a metal oxide, but is not limited thereto.

An ohmic contact member may be further formed on the semiconductor 154. The ohmic contact may be made of a silicide or of a material such as n+ hydrogenated amorphous silicon in which an n-type impurity such as phosphorus is doped with a high concentration.

A data line 171, a source electrode 173, and a drain electrode 175 are formed on the semiconductor 154. The source electrode 173 protrudes from the data line 171, and the drain electrode 175 is separated from the source electrode 173. The source electrode 173 and the drain electrode 175 overlap with the gate electrode 124.

The gate electrode 124, the source electrode 173, and the drain electrode 175 form one thin film transistor Q together with the semiconductor 154, and a channel of the thin film transistor Q is formed in a semiconductor (e.g., a portion of the semiconductor 154) disposed between the source electrode 173 and the drain electrode 175.

A passivation layer 180 is formed on the data line 171, the source electrode 173, the drain electrode 175, and an exposed portion of the semiconductor 154. A contact hole 185 is formed in the passivation layer 180 to expose at least a part of the drain electrode 175.

A pixel electrode 191 is formed on the passivation layer 180. The pixel electrode 191 may be formed of a transparent metal oxide such as indium tin oxide (ITO) and/or indium zinc oxide (IZO), but is not limited thereto.

A general shape of the pixel electrode 191 is substantially a quadrangle. The pixel electrode 191 includes a cross-shaped stem including a horizontal stem portion 193 (substantially parallel to the gate line 121), and a vertical stem portion 192 crossing the horizontal stem portion 193. In some embodiments, the pixel electrode 191 includes a micro-branch portion 194 that extends from the horizontal stem portion 193 and the vertical stem portion 192. An extension 197 is further formed to extend from the quadrangular pixel electrode 191. The extension 197 is physically and electrically connected to the drain electrode 175 through the contact hole 185 to receive a data voltage from the drain electrode 175.

The fourth color pixel area PX(W) is divided into four domains D1, D2, D3, and D4 by the horizontal stem portion 193 and the vertical stem portion 192 of the pixel electrode 191. The micro-branch portion 194 obliquely (or indirectly) extends from the horizontal stem portion 193 and the vertical stem portion 192. For example, at the first domain D1, the micro-branch portion 194 extends upward from the horizontal stem portion 193 and left from the vertical stem portion 192. At the second domain D2, the micro-branch portion 194 extends upward from the horizontal stem portion 193 and right from the vertical stem portion 192. At the third domain D3, the micro-branch portion 194 extends down from the horizontal stem portion 193 and right from the vertical stem portion 192. At the fourth domain D4, the micro-branch portion 194 extends down from the horizontal stem portion 193 and left from the vertical stem portion 192. When the electric field is generated in the liquid crystal layer 3, the direction in which the liquid crystal molecules 310 are inclined may be determined according to the direction of formation of the micro-branch portion 194.

Each micro-branch portion 194 may form an angle of about 45 or about 135 degrees with respect to the gate line 121 or the horizontal stem portion 193. The extending directions of the micro-branch portions 194 of any two adjacent domains may be perpendicular to each other.

The pixel electrode 191 may further include an outer stem that surrounds an outer circumference of the fourth color pixel area PX(W).

In the fourth pixel area PX(W), the third color filter 230B is formed on the second substrate 210 to face the first substrate 110 (e.g., the third color filter 230B is formed on the side of the second substrate 210 facing the first substrate 110). In some embodiments, the third color filter 230B is extending along and is overlapped with the horizontal stem portion 193 of the pixel electrode 191. The horizontal stem portion 193 serves to divide the fourth color pixel area PX(W) in half, with the domains D1 and D2 located in the upper half of the pixel and domains D3 and D4 located in the lower half of the pixel, as illustrated in FIG. 4, and is disposed (or positioned) at the boundary between the domains D1 and D2, and the domains D3 and D4. Accordingly, the third color filter 230B is disposed at the boundary between the domains D1 and D2, and the domains D3 and D4.

As described above, the liquid crystal molecules 310 positioned at the domains D1, D2, D3, and D4 may be inclined (or tilted) in different directions when the electric field is generated in the liquid crystal layer 3. Here, the inclination directions (or the directions of tilt) of the liquid crystal molecules 310 positioned at (or near) the boundaries between the domains D1, D2, D3, and D4 may be unclear. As a result, the transmittance of the boundary regions between the domains D1, D2, D3, and D4 is often relatively lower than that of the central regions of the domains D1, D2, D3, and D4. Accordingly, if the third color filter 230B is formed at the central regions of the domains D1, D2, D3, and D4 of the fourth color pixel area PX(W), the overall transmittance may decrease. However, when the third color filter 230B is formed at the boundaries between domains D1, D2, D3, and D4 of the fourth color pixel area PX(W) (for example, extending along the boundary between domains D1 and D4 and the boundary between domains D2 and D3), as described in one or more embodiments of the present invention, it is possible to minimize the reduction in transmittance.

Further, since the boundaries between the domains D1, D2, D3, and D4 are positioned at the central region of the pixel (i.e. the horizontal and vertical lines are each positioned in the center between the two respective sides of the pixel), it is easy to perform planarization. For example, if the third color filter 230B having a bar shape and extending in the horizontal direction is formed in the central regions of the first domain D1 and the second domain D2, the overcoat 240 may be flatly (or substantially flatly) formed at the first domain D1 and the second domain D2, but the flatness of the overcoat 240 in the third domain D3 and the fourth domain D4 can be reduced. However, when the third color filter 230B is positioned at the boundary line between the domains D1, D2, D3, and D4 (for example, extending along the boundary between domains D1 and D4 and the boundary between domains D2 and D3), as described in the present embodiments, the overcoat 240 can be flatly formed across the entire area of the fourth color pixel area PX(W).

A width W of the third color filter 230B may range from about 5 μm to about 25 μm. In embodiments where the third color filter 230B is formed to extend along and overlap the horizontal stem portion 193 of the pixel electrode 191, a pattern of a metal wire may be formed to have a width of about 5 μm. For example, the third color filter 230B may be formed to have a width that is wider than the width of the horizontal stem portion 193 of the pixel electrode 191. If the third color filter 230B is formed to have a width that is narrower than that of the horizontal stem portion 193 of the pixel electrode 191, the light passing through the fourth color pixel area PX(W) may not pass through the third color filter 230B, and the color coordinate shift effect may not be achieved. In contrast, if the width of the third color filter 230B is too wide, the reduction in transmittance may be increased. Accordingly, in embodiments of the present invention, the width W of the third color filter 230B may be equal to or smaller than about 25 μm.

In some embodiments, the light-blocking member 220 is formed at the edge of the fourth color pixel area PX(W), and the overcoat 240 is formed on the third color filter 230B and the light-blocking member 220.

A common electrode 270 is formed on the overcoat 240 (e.g., on the side of the overcoat 240 facing the first substrate 110). The common electrode 270 may be formed of a transparent metal oxide such as indium tin oxide (ITO) and/or indium zinc oxide (IZO), but is not limited thereto.

A predetermined (or set) voltage (e.g., a common voltage) is applied to the common electrode 270. Accordingly, when a data voltage is applied to the pixel electrode 191, an electric field is generated between the pixel electrode 191 and the common electrode 270, and the liquid crystal molecules 310 of the liquid crystal layer 3 disposed therebetween are arranged in a predetermined (or set) direction, according to the generated electric field.

Hitherto, the fourth color pixel area PX(W) according to one or more embodiments of the present invention has been described. Each of the pixel areas PX(R), PX(G), and PX(B) has a similar (or substantially similar) structure as that of the fourth color pixel area PX(W). However, unlike the fourth color pixel area PX(W) where the third color filter 230B is disposed only in the boundary regions between the domains of the fourth color pixel area PX(W), the first color filter 230R is disposed in most of the first pixel area PX(R), the second color filter 230G is disposed in most of the second pixel area PX(G), and the third color filter 230B is disposed in most of the third pixel area PX(B).

In one or more embodiments of the present invention, when the electric field is generated in the liquid crystal layer 3, the direction in which the liquid crystal molecules 310 are inclined is determined according to a formation direction of the micro-branch portion 194, and thus the pixel is divided into the domains D1, D2, D3, and D4, according to the inclination direction of the liquid crystal molecules 310. However, embodiments of the present invention are not limited thereto.

In a liquid crystal display according to one or more embodiments of the present invention, the pixel electrode and the common electrode may be formed on the same substrate, and a horizontal electric field may be generated in the liquid crystal layer 3. In this case, each of the pixel electrode and the common electrode may be formed to have a bar shape (e.g., to be a bar electrode), and the pixel electrode and the common electrode may be alternately disposed. Alternatively, any one of the pixel electrode and the common electrode may be formed as a planar-shaped electrode (e.g., a planar electrode), and the other electrode may be formed to have a bar shape. Here, the pixel electrode and/or the common electrode may be bent at least one time within one pixel area. In this case, the liquid crystal molecules positioned at opposite sides with respect to the bending point of the electrode may be arranged in different directions. Accordingly, one pixel area may be divided into a plurality of domains according to the arrangement directions of the liquid crystal molecules. Since the arrangement of the liquid crystal molecules is not uniform at boundaries between the domains, the reduction in transmittance may be minimized by forming a color filter in the boundary regions between the domains.

Hitherto, the embodiments where each of the color filters 230R, 230G, and 230B is disposed on the second substrate 210 have been described, but embodiments of the present invention are not limited thereto. For example, each of the color filters 230R, 230G, and 230B may be disposed on the first substrate 110. This embodiment will be described with reference to FIG. 6.

Figure 6:
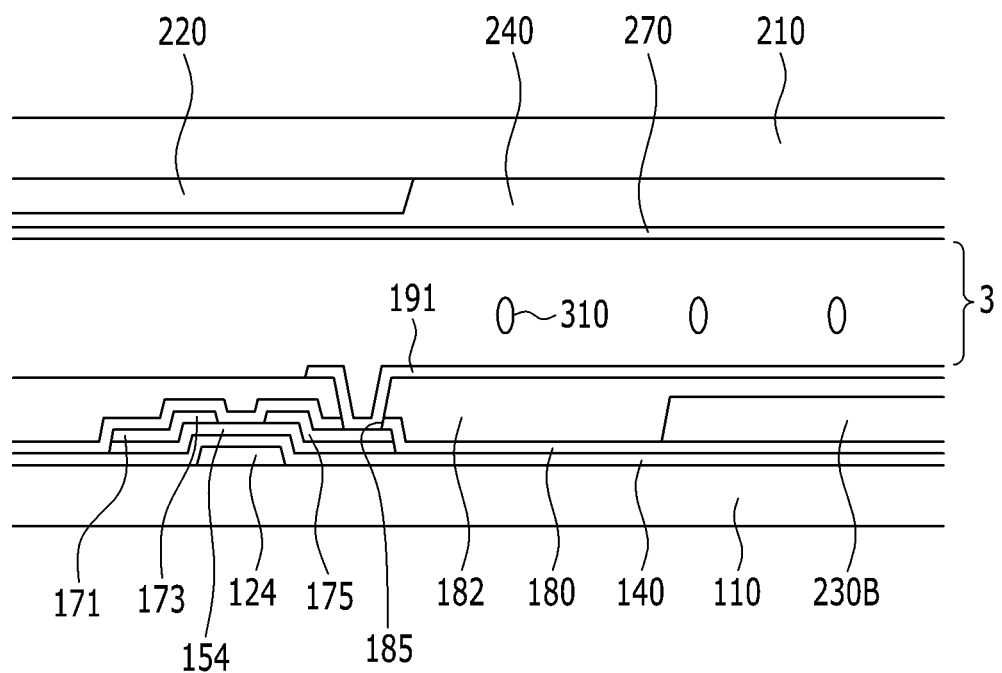
FIG. 6 is a cross-sectional schematic view of a liquid crystal display according to one or more embodiments of the present invention.

FIG. 6 is a cross-sectional schematic view of a liquid crystal display according to one or more embodiments of the present invention. FIG. 6 illustrates a cross-section of the fourth color pixel area PX(W).

As shown in FIG. 6, the gate electrode 124, the semiconductor 154, the source electrode 173, the drain electrode 175, and the passivation layer 180 are formed on the first substrate 110, and the third color filter 230B (in the fourth color pixel area PX(W)) is disposed (or positioned) on the passivation layer 180.

Other overcoat 182 is further formed on the passivation layer 180 and the third color filter 230B, and the pixel electrode 191 may be formed on the other overcoat 182.

The contact hole 185 is formed in the passivation layer 180 and the other overcoat 182, and the pixel electrode 191 is connected to the drain electrode 175 through the contact hole 185.

The light-blocking member 220, the overcoat 240, and the common electrode 270 are formed on the second substrate 210.

Here, the structure of each of the pixel areas PX(R), PX(G), and PX(B) is similar (or substantially similar) to that of the fourth color pixel area PX(W). For example, in the first pixel area PX(R), the first color filter 230R may be disposed on the first substrate 110, in the second pixel area PX(G), the second color filter 230G may be disposed on the first substrate 110, and in the third pixel area PX(B), the third color filter 230B may be disposed on the first substrate 110.

In some embodiments of the present invention, the light-blocking member 220 is formed on the second substrate 210, but the embodiments are not limited thereto. For example, the light-blocking member 220 may be formed on the first substrate 110. In this case, the light-blocking member 220 may be formed on the passivation layer 180, and the other overcoat 182 may be formed on the passivation layer 180, the third color filter 230B, and the light-blocking member 220.

In some embodiments, each of the pixel areas PX(R), PX(G), PX(B), and PX(W) is divided into four domains D1, D2, D3, and D4 by the horizontal stem portion 193 and the vertical stem portion 192 of the pixel electrode 191, but the embodiments are not limited thereto. The domains may be divided by various means, for example, with cutouts and/or protrusions. This embodiment will be described with reference to FIG. 7 and FIG. 8.

Figure 7:
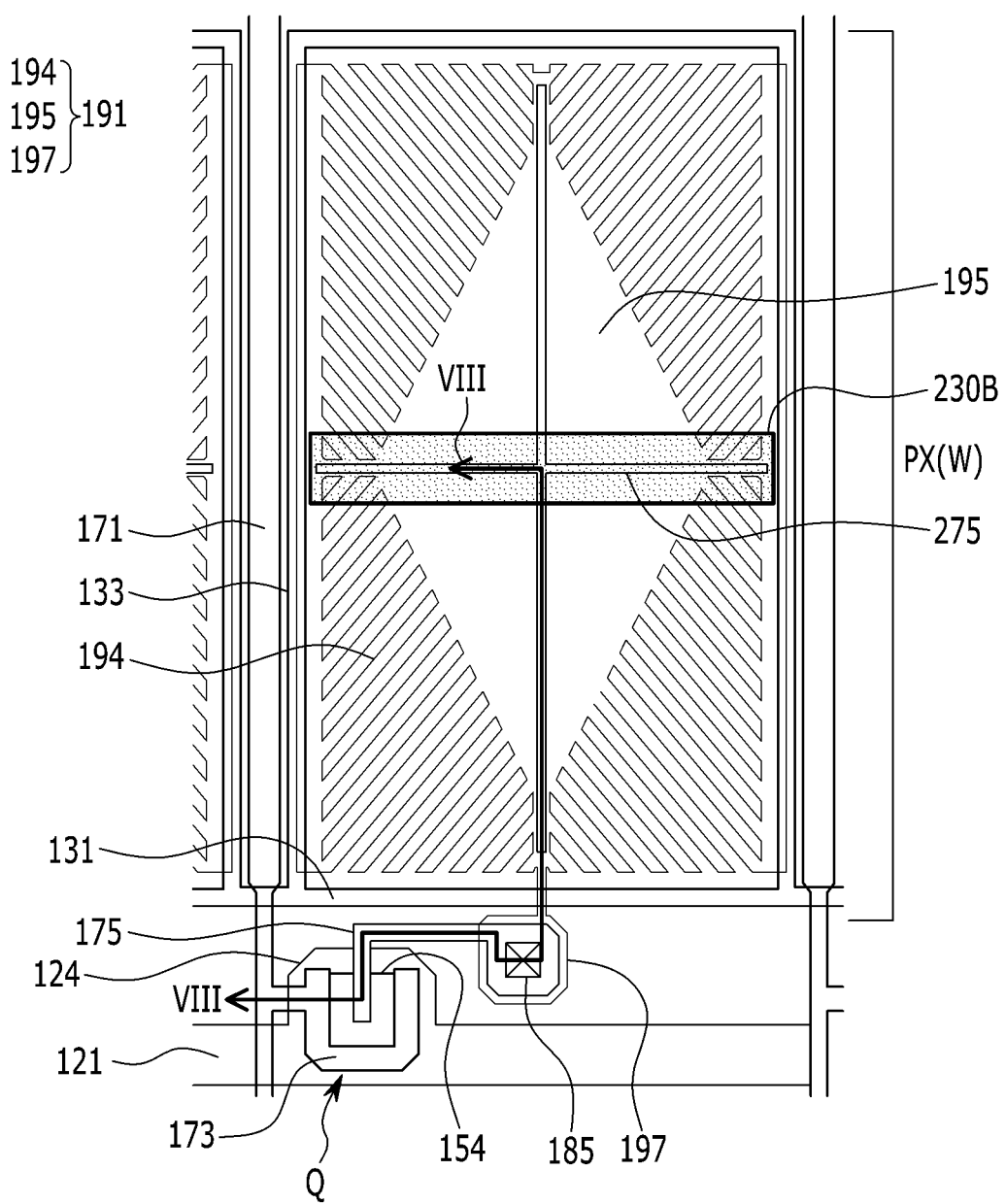
FIG. 7 is a top plan schematic view illustrating a fourth color pixel of a liquid crystal display according to one or more embodiments of the present invention.
Figure 8:
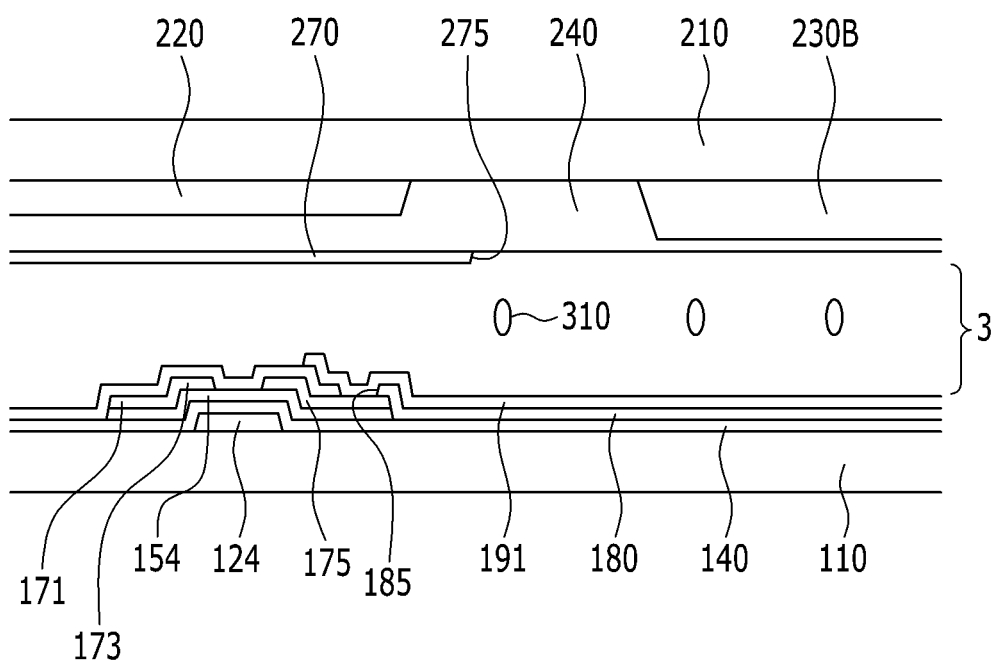
FIG. 8 is a cross-sectional schematic view of the liquid crystal display according to one or more embodiments of the present invention taken along the line VIII-VIII of FIG. 7.

FIG. 7 is a top plan schematic view illustrating a fourth color pixel of a liquid crystal display according to one or more embodiments of the present invention, and FIG. 8 is a cross-sectional schematic view of the liquid crystal display according to the embodiments of the present invention taken along the line VIII-VIII of FIG. 7.

Figure 9:
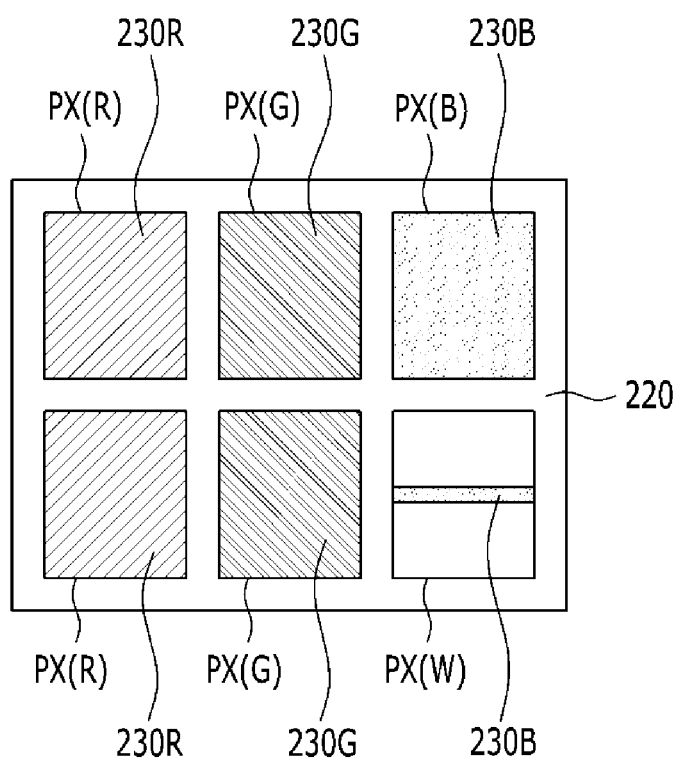
FIG. 9 is a top plan schematic view illustrating a liquid crystal display according to one or more embodiments of the present invention.

Referring to FIGS. 7 and 9, the pixel electrode 191 includes a partial plate electrode 195 disposed at the center thereof, and a plurality of micro-branch portions 194 that are disposed to obliquely protrude from the partial plate electrode 195. The partial plate electrode 195 may be formed to have a rhombic or hexagonal shape with four to six sides, but is not limited thereto. The micro-branch portion 194 may form an angle of about 90 degrees with the respective sides of the partial plate electrode 195.

A cutout 275 is formed in the common electrode 270 to have a cross-like shape, and functions as a liquid crystal control mechanisms. An intersection (a crossing region) of the cross-like structure of the cutout 275 is overlapped with the center of the rhombic shape of the partial plate electrode 195 of the pixel electrode 191. In some embodiments, the cutout 275 serves to improve the controllability of the liquid crystal molecules 310.

The fourth color pixel area PX(W) is divided into four domains D1, D2, D3, and D4 by the cross-like cutout 275 of the common electrode 270. The third color filter 230B is disposed in the fourth color pixel area PX(W), and partially overlaps the cross-like cutout 275. For example, the cross-like cutout 275 may include a horizontal portion and a vertical portion, and the third color filter 230B may overlap the horizontal portion. In the embodiments where the cutout 275 serves to divide the fourth color pixel area PX(W) into the domains D1, D2, D3, and D4, the cutout 275 is disposed (or positioned) at the boundaries between the domains D1, D2, D3, and D4. As a result, the third color filter 230B is disposed in at least one of the boundary regions between the domains D1, D2, D3, and D4.

Referring back to FIG. 1, the first color pixel area PX(R), the second color pixel area PX(G), the third color pixel area PX(B), and the fourth color pixel area PX(W) are sequentially disposed next to each other to form a line (along a line direction), and the third color pixel area PX(B), the fourth color pixel area PX(W), the first color pixel area PX(R), and the second color pixel area PX(G) are sequentially disposed next to each other to form another line (along another line direction), such that the first color pixel area PX(R) and the third color pixel area PX(B) are vertically adjacent to each other, and the second color pixel area (PX(G) and the fourth color pixel area PX(W) are vertically adjacent to each other. However, the arrangement of each of the pixel areas PX(R), PX(G), PX(B), and PX(W) may be embodied in various ways without being limited thereto. An arrangement of the pixel areas PX(R), PX(G), PX(B), and PX(W) according to one or more embodiments of the present invention will be described with reference to FIG. 9.

FIG. 9 is a top plan schematic view illustrating a liquid crystal display according to one or more embodiments of the present invention.

As shown in FIG. 9, the first color pixel area PX(R) and the second color pixel area PX(G) are horizontally adjacent to each other. The first color pixel areas PX(R) are vertically adjacent to each other, and the second color pixel areas PX(G) are vertically adjacent to each other.

The second color pixel area PX(G) is also horizontally adjacent to the third color pixel area PX(B) or the fourth color pixel area PX(W). Accordingly, one part of the second color pixel area PX(G) is horizontally adjacent to the first color pixel area PX(R) and the third color pixel area PX(B), and the other part of the second color pixel area PX(G) is horizontally adjacent to the first color pixel area PX(R) and the fourth color pixel area PX(W).

In the embodiment of FIG. 1, a ratio of an area occupied by the fourth color pixel area PX(W) to the whole area of the liquid crystal display is about 1/4. In contrast, in the embodiment of FIG. 9, a ratio of an area occupied by the fourth color pixel area PX(W) to the whole area of the liquid crystal display may be about 1/6. Further, in the embodiment of FIG. 9, the ratio of an area occupied by the fourth color pixel area PX(W) to the whole area of the liquid crystal display can be increased to about 1/4 by adjusting a length ratio of one side of each of the pixel areas PX(R), PX(G), PX(B), and PX(B).

Next, a liquid crystal display according to one or more embodiments of the present invention will be described with reference to FIG. 10 and FIG. 11.

Figure 10:
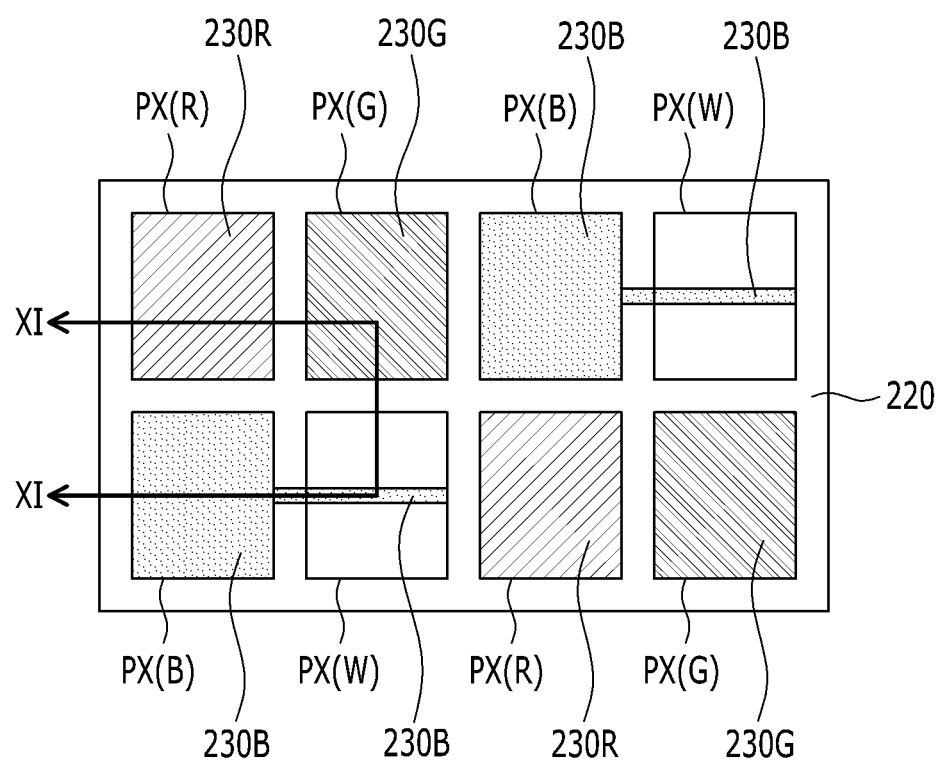
FIG. 10 is a top plan schematic view illustrating a liquid crystal display according to one or more embodiments of the present invention.
Figure 11:
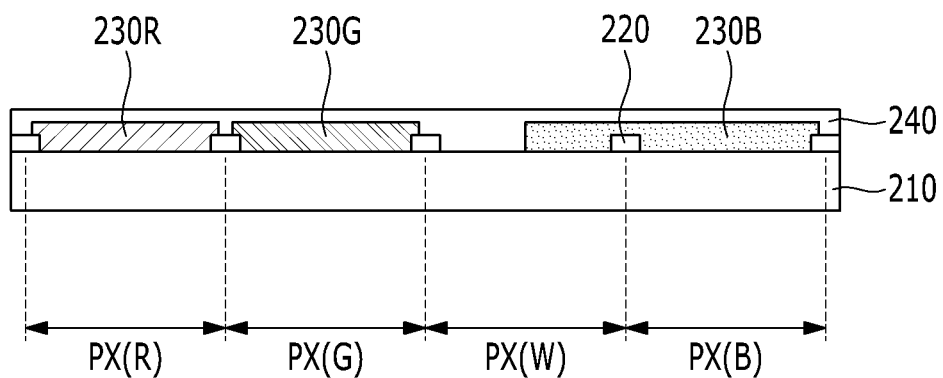
FIG. 11 is a cross-sectional schematic view of the liquid crystal display according to one or more embodiments of the present invention taken along the line XI-XI of FIG. 10.

Since the liquid crystal display according to the embodiment of the present invention illustrated in FIG. 10 and FIG. 11 is substantially the same as the liquid crystal display according to the embodiment of the present invention illustrated in FIG. 1 to FIG. 5, the duplicative description thereof will not be provided. The embodiment of FIGS. 10 and 11 is different from the above-described embodiments in that the color filter disposed (or positioned) in the fourth color pixel area is connected to the color filter of an adjacent pixel area.

FIG. 10 is a top plan schematic view illustrating a liquid crystal display according to one or more embodiments of the present invention, and FIG. 11 is a cross-sectional schematic view of the liquid crystal display according to the embodiments of the present invention taken along the line XI-XI of FIG. 10.

In FIG. 11, the illustration of the first substrate, the liquid crystal layer, the light source, and/or the like is omitted, and these elements can be understood by referring to FIG. 1. For convenience of illustration, in FIG. 11, a surface of the second substrate 210 on which the color filters 230R, 230G, and 230B are positioned (i.e. the surface of the second substrate 210 facing the first electrode 110) is illustrated as being directed or facing upward.

The first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and the color pattern may include at least one of the first color filter 230R, the second color filter 230G, and the third color filter 230B.

In some embodiments, the third color filter 230B may be disposed in the fourth color pixel area PX(W) and may be connected to the third color filter 230B disposed in the third color pixel area PX(B). In other words, the third color filter 230B disposed in the fourth color pixel area PX(W) may protrude from the third color filter 230B disposed in the third color pixel area PX(B).

Next, a liquid crystal display according to one or more embodiments of the present invention will be described with reference to FIG. 12 to FIG. 14.

Figure 12:
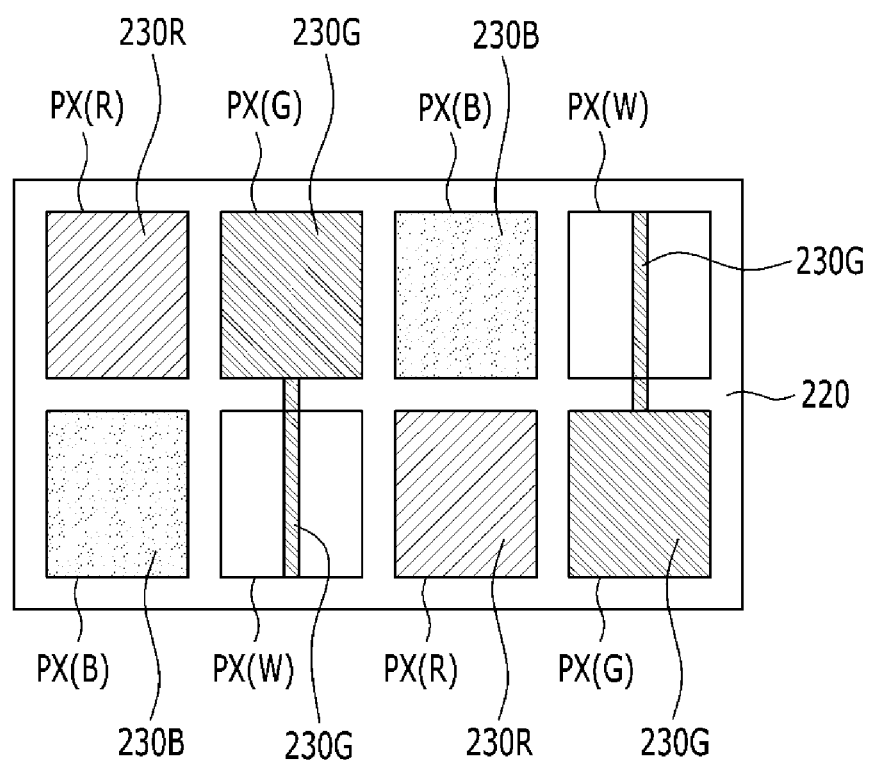
FIG. 12 is a top plan schematic view illustrating a liquid crystal display according to one or more embodiments of the present invention.
Figure 13:
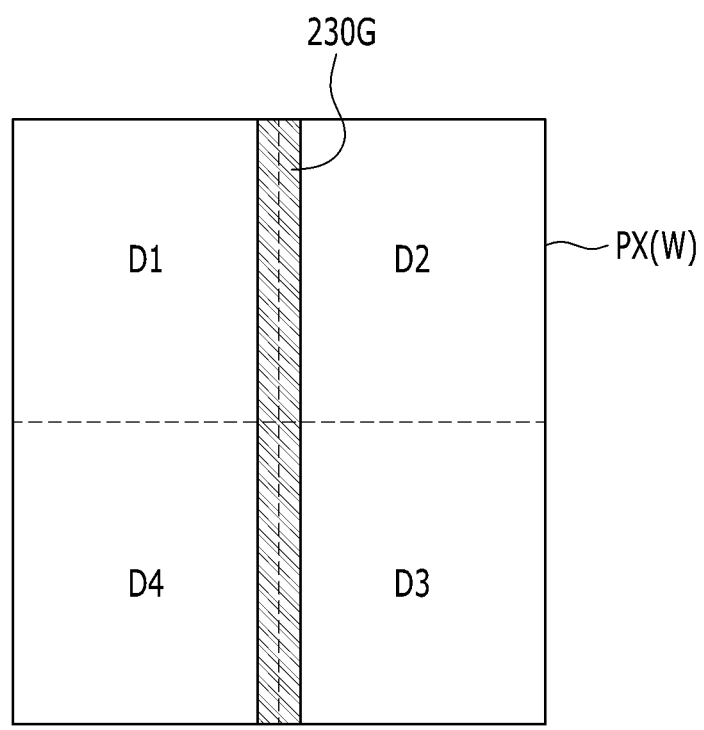
FIG. 13 is a top plan schematic view illustrating a domain included in a fourth color pixel area of a liquid crystal display according to one or more embodiments of the present invention.
Figure 14:
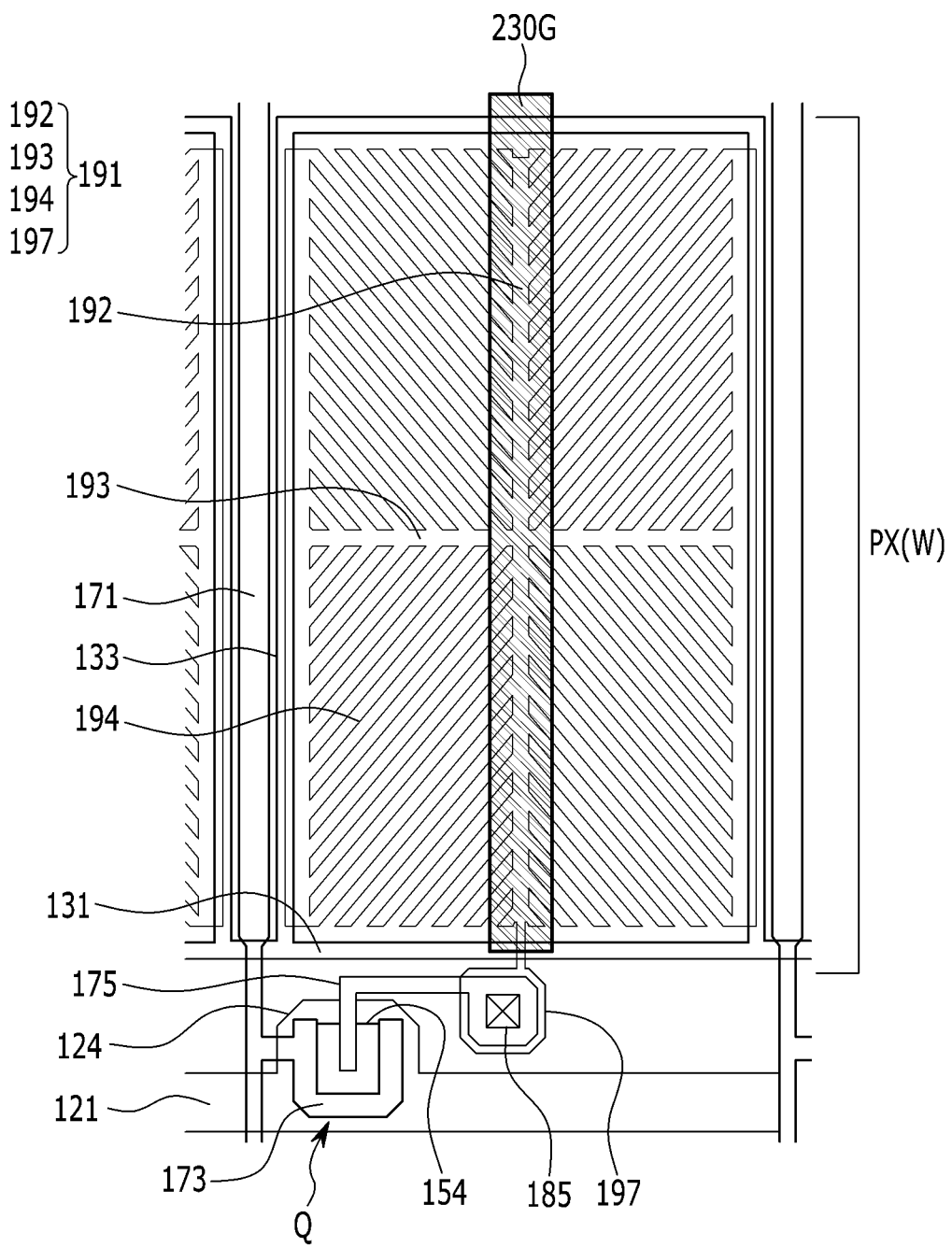
FIG. 14 is a top plan schematic view illustrating a domain included in a fourth color pixel area of a liquid crystal display according to one or more embodiments of the present invention.

Since the liquid crystal display according to the embodiment of the present invention illustrated in FIG. 12 to FIG. 14 is substantially the same as the liquid crystal display according to the embodiment of the present invention illustrated in FIG. 1 to FIG. 5, the duplicative description thereof will not be provided. The difference between the embodiment of FIG. 12 to FIG. 14 and the above-described embodiments is a direction of extension of the color filter disposed in the fourth color pixel area, and hereinafter, will be described in more detail.

FIG. 12 is a top plan schematic view illustrating a liquid crystal display according to one or more embodiments of the present invention, FIG. 13 is a top plan schematic view illustrating a domain included in a fourth color pixel area of a liquid crystal display according to one or more embodiments of the present invention, and FIG. 14 is a top plan schematic view illustrating a domain included in a fourth color pixel area of a liquid crystal display according to one or more embodiments of the present invention.

As shown in FIG. 12, the first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and the color pattern may include at least one of the first color filter 230R, the second color filter 230G, and the third color filter 230B.

In some embodiments, the second color filter 230G may be disposed in the fourth color pixel area PX(W). For example, the second color filter 230G may be disposed in a region of the fourth color pixel area PX(W). In the fourth color pixel area PX(W), the second color filter 230G may be formed to have a bar-like shape that extends in one direction. For example, in the fourth color pixel area PX(W), the second color filter 230G is disposed in the center between two long sides of the fourth color pixel area PX(W) to extend in a direction that is in parallel with the long sides. However, the shape of the second color filter 230G may be changed in various ways without being limited thereto.

In some embodiments, the second color filter 230G disposed in the fourth color pixel area PX(W) is connected to the second color filter 230G disposed in the second color pixel area PX(G) has been described, but embodiments of the present invention are not limited thereto. For example, the second color filter 230G may be disposed in the fourth color pixel area PX(W), but may not be connected to the second color filter 230G disposed in the second color pixel area PX(G).

As shown in FIG. 13, the fourth color pixel area PX(W) includes the first domain D1, the second domain D2, the third domain D3, and the fourth domain D4, and the second color filter 230G is disposed at boundaries between the domains D1, D2, D3, and D4. For example, the second color filter 230G is disposed at a boundary between the first domain D1 and the second domain D2, and a boundary between the third domain D3 and the fourth domain D4. In this case, the second color filter 230G overlaps the vertical line serving as the reference for dividing the fourth color pixel area PX(W) into the domains D1, D2, D3, and D4.

As shown in FIG. 14, the pixel electrode 191 includes a horizontal stem portion 193 and a vertical stem portion 192 crossing each other (and substantially perpendicular to each other), and a micro-branch portion 194 extending therefrom. The fourth color pixel area PX(W) is divided into four domains D1, D2, D3, and D4 by the horizontal stem portion 193 and the vertical stem portion 192 of the pixel electrode 191. The second color filter 230G is positioned to overlap with the vertical stem portion 192 of the pixel electrode 191.

Next, a liquid crystal display according to one or more embodiments of the present invention will be described with reference to FIG. 15 and FIG. 16.

Figure 15:
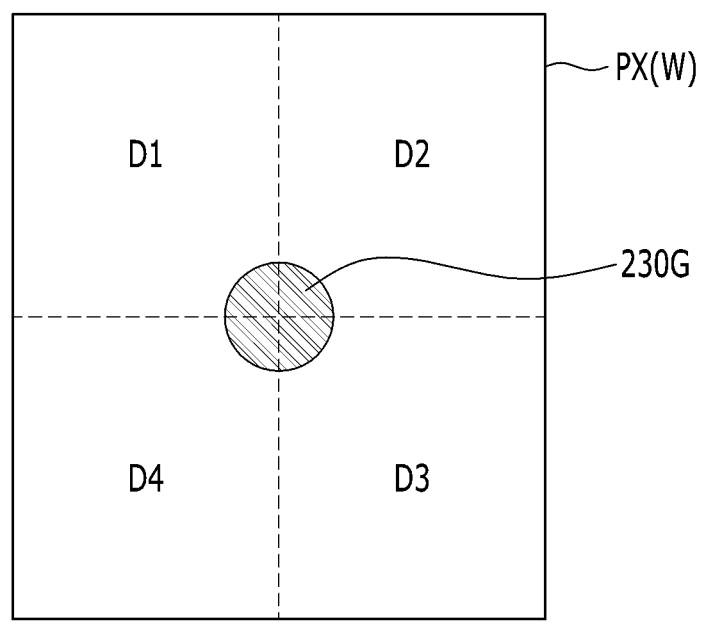
FIG. 15 is a top plan schematic view illustrating a domain included in a fourth color pixel area of a liquid crystal display according to one or more embodiments of the present invention.
Figure 16:
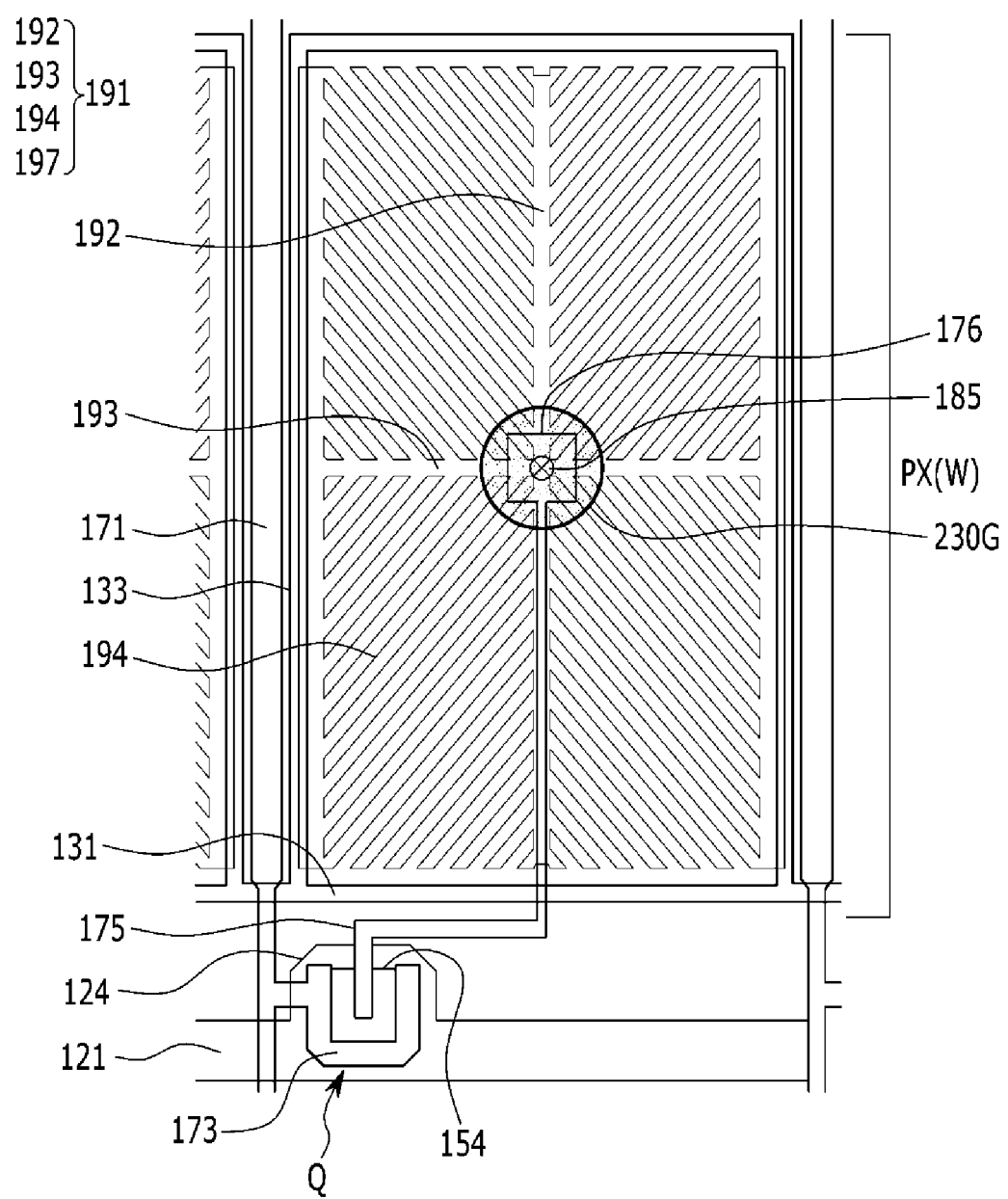
FIG. 16 is a top plan schematic view illustrating a fourth color pixel of a liquid crystal display according to one or more embodiments of the present invention.

Since the liquid crystal display according to the embodiment of the present invention illustrated in FIG. 15 and FIG. 16 is substantially the same as the liquid crystal display according to the embodiment of the present invention illustrated in FIG. 1 to FIG. 5, the duplicative description thereof will not be provided. The difference between the embodiment of FIG. 15 and FIG. 16 and the above-described embodiments is the position of the color filter disposed in the fourth color pixel area, that hereinafter, will be described in more detail.

FIG. 15 is a top plan schematic view illustrating a domain included in a fourth color pixel area of a liquid crystal display according to one or more embodiments of the present invention, and FIG. 16 is a top plan schematic view illustrating a fourth color pixel of a liquid crystal display according to one or more embodiments of the present invention.

As shown in FIG. 15, a color pattern may be formed in the fourth color pixel area PX(W), and the color pattern may include at least one of the first color filter 230R, the second color filter 230G, and the third color filter 230B.

In some embodiments, the second color filter 230G may be disposed in the fourth color pixel area PX(W). The second color filter 230G may be disposed in a region of the fourth color pixel area PX(W), for example, at the center of the fourth color pixel area PX(W).

Here, the fourth color pixel area PX(W) includes the first domain D1, the second domain D2, the third domain D3, and the fourth domain D4, and the second color filter 230G is disposed at the boundaries between the domains D1, D2, D3, and D4. For example, the second color filter 230G may overlap an intersection or a crossing region of the horizontal line and the vertical line serving as the references for dividing the fourth color pixel area PX(W) into the domains D1, D2, D3, and D4. Accordingly, the second color filter 230G may partially overlap each of the first domain D1, the second domain D2, the third domain D3, and the fourth domain D4.

As shown in FIG. 16, the drain electrode 175 includes a surrounded region that is surrounded by the source electrode 173, and the surrounded region of the drain electrode 175 may further includes an extension 176 extending from the surrounded region into the fourth color pixel area PX(W). The extension 176 may be disposed at the center of the fourth color pixel area PX(W). In some embodiments, the contact hole 185 is formed to expose the extension 176 of the drain electrode 175, and the pixel electrode 191 is connected to the extension 176 of the drain electrode 175.

The pixel electrode 191 includes a horizontal stem portion 193 and a vertical stem portion 192 disposed to cross each other (e.g., to be substantially perpendicular to each other), and a micro-branch portion 194 extending therefrom. The fourth color pixel area PX(W) is divided into four domains D1, D2, D3, and D4 by the horizontal stem portion 193 and the vertical stem portion 192 of the pixel electrode 191.

The second color filter 230G positioned in the fourth color pixel area PX(W) may be overlapped with the extension 176 of the drain electrode 175. The second color filter 230G may also be overlapped with the contact hole 185. The second color filter 230G may be disposed at a portion of intersection of the horizontal stem portion 193 and the vertical stem portion 192 of the pixel electrode 191.

In some embodiments, the drain electrode 175 is made of an opaque metal, and the reduction in transmittance can be minimized by disposing the second color filter 230G of the fourth color pixel area PX(W) to overlap with the drain electrode 175.

Although in FIGS. 15 and 16, the second color filter 230G is illustrated to have a circular shape, it may be formed to have various shapes, for example, a quadrangular shape or an ellipsoidal shape, without being limited thereto. Alternatively, the second color filter 230G may be formed to have a bar-like shape, and may be disposed at a region at which the drain electrode 175 and the pixel electrode 191 are overlapped with each other, for example, where the drain electrode 175 is overlapped with a lower half of the vertical stem portion of the pixel electrode 191.

In the above-described embodiments, each of the pixel areas PX(R), PX(G), and PX(B) has a similar (or substantially similar) structure as that of the fourth color pixel area PX(W).

Next, a liquid crystal display according to one or more embodiments of the present invention will be described with reference to FIG. 17A to FIG. 20.

Since the liquid crystal display according to the embodiment of the present invention illustrated in FIG. 17A to FIG. 20 is substantially the same as the liquid crystal display according to the embodiment of the present invention illustrated in FIG. 1 to FIG. 5, the duplicative description thereof will not be provided. The embodiment illustrated in FIG. 17A to FIG. 20 is different from the above-described embodiments in that each pixel area is divided into a plurality of subpixels, and hereinafter, this difference will be described in more detail.

Figure 17A:
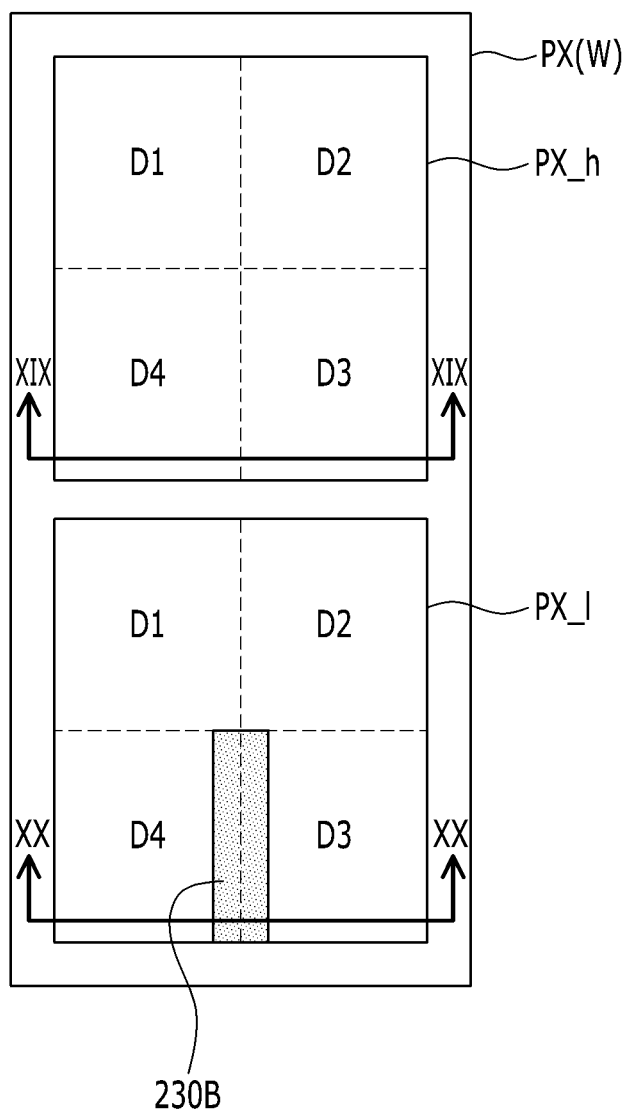
FIG. 17A to FIG. 17F are top plan schematic views illustrating a domain included in a fourth color pixel area of a liquid crystal display according to one or more embodiments of the present invention.
Figure 17B:
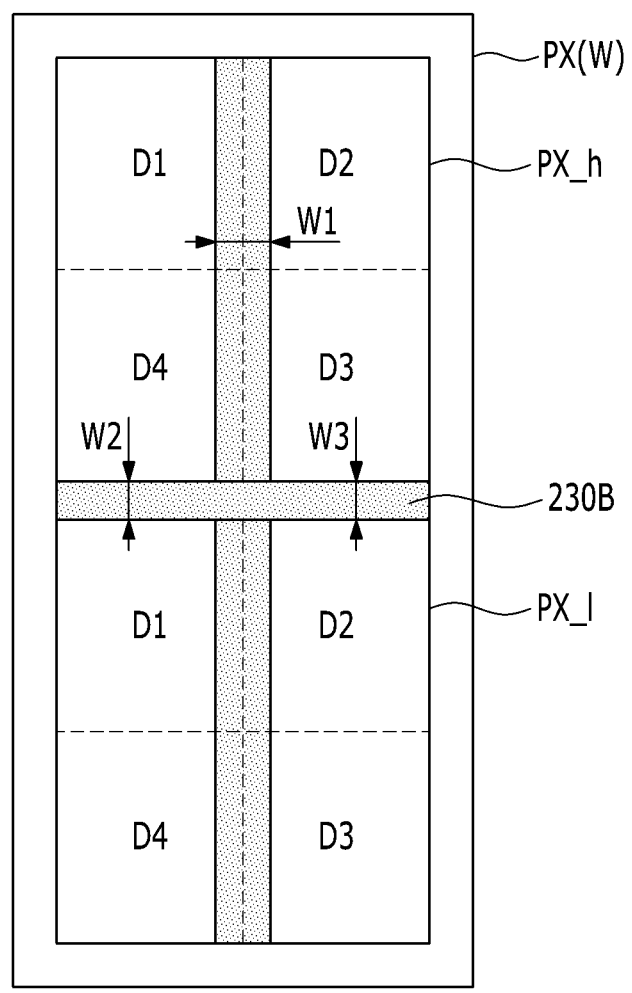
Figure 17C:
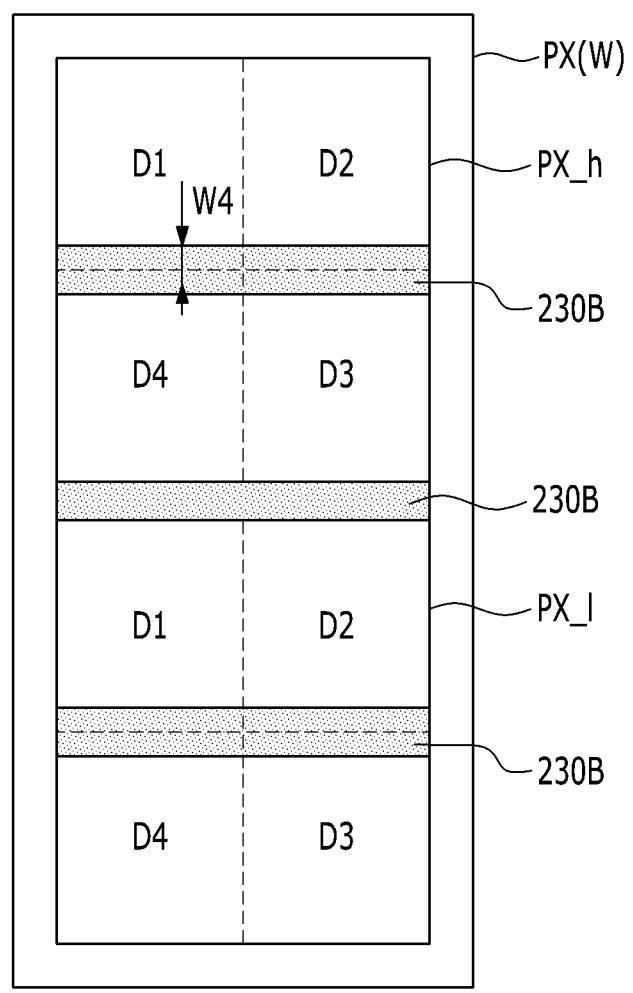
Figure 17D:
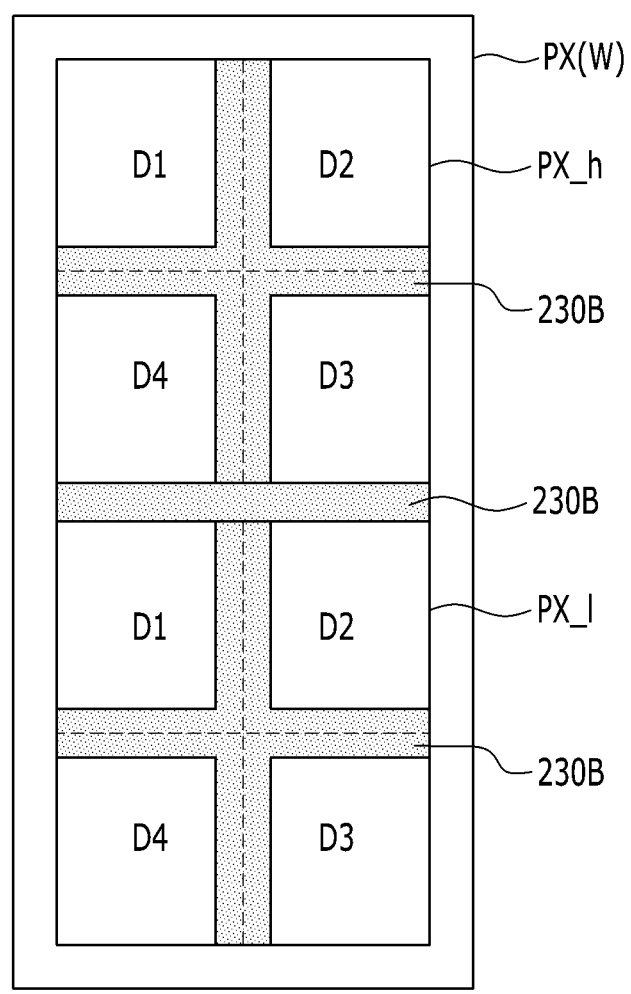
Figure 17E:
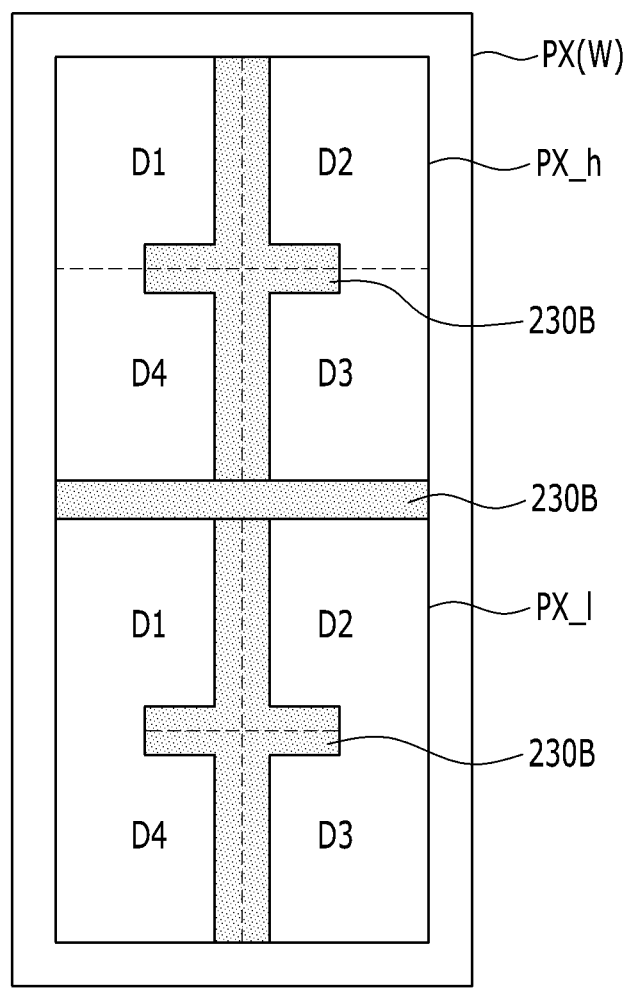
Figure 17F:
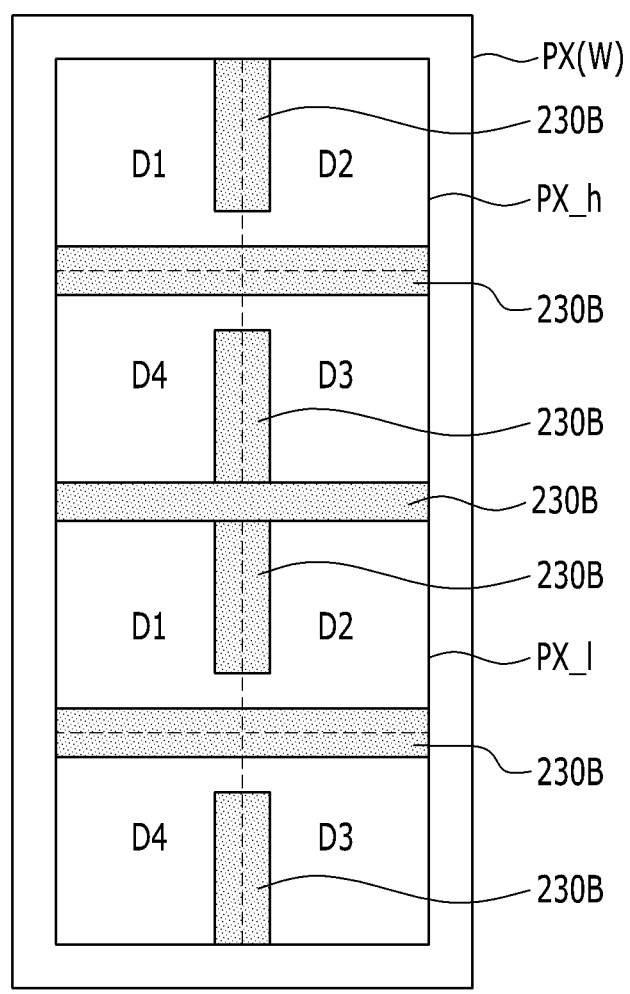
Figure 18:
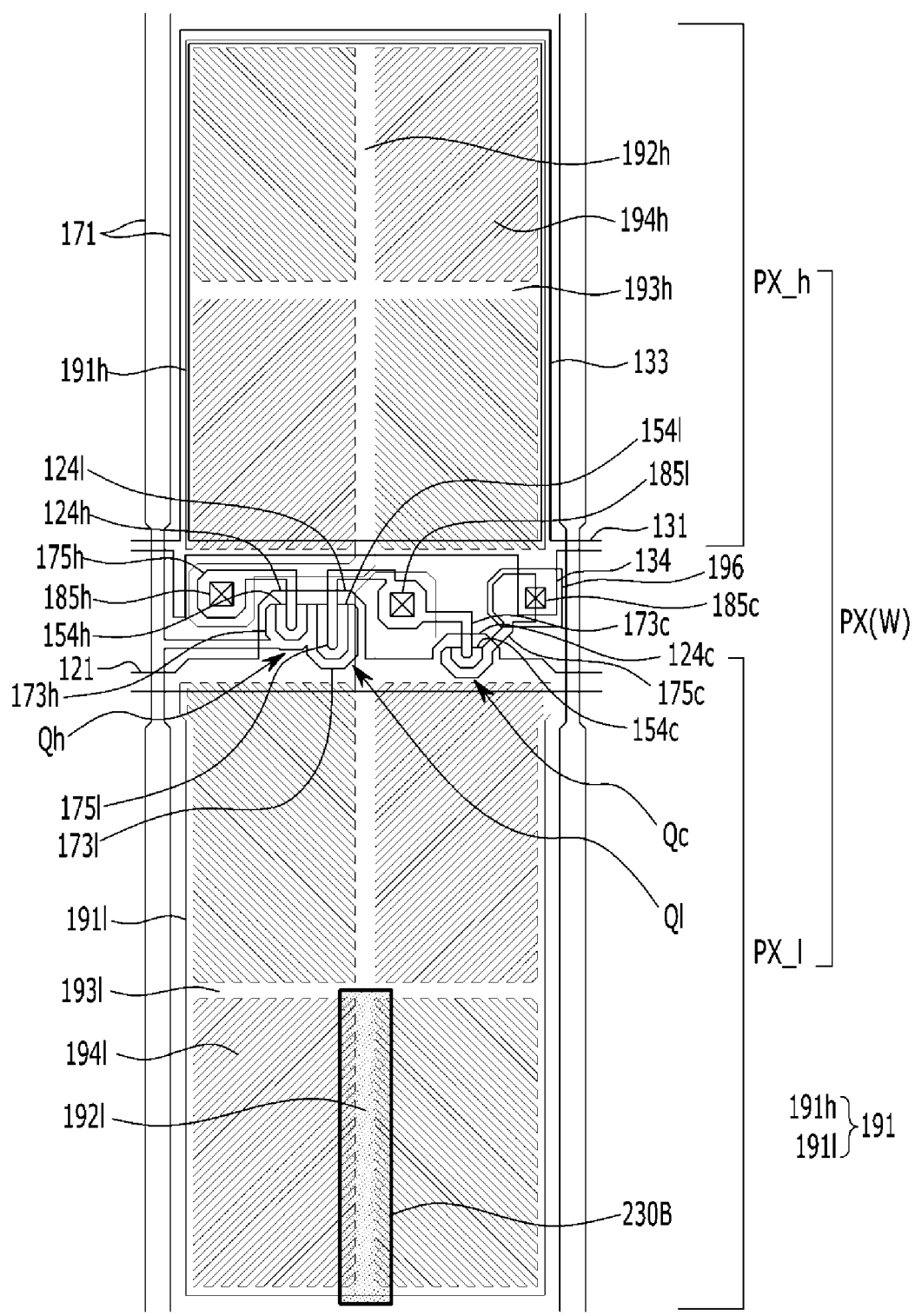
FIG. 18 is a top plan schematic view illustrating a domain included in a fourth color pixel area of a liquid crystal display according to one or more embodiments of the present invention.
Figure 19:
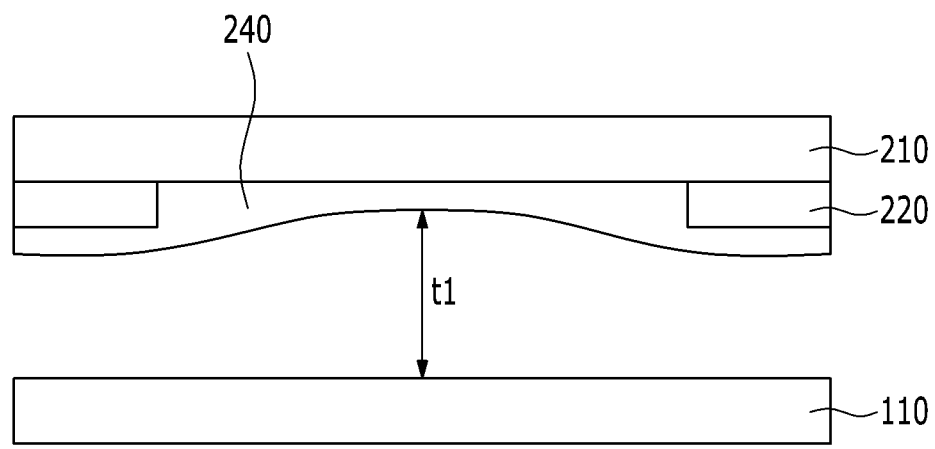
FIG. 19 is a cross-sectional schematic view of the liquid crystal display according to the embodiments of the present invention taken along the line XIX-XIX of FIG. 17A.
Figure 20:
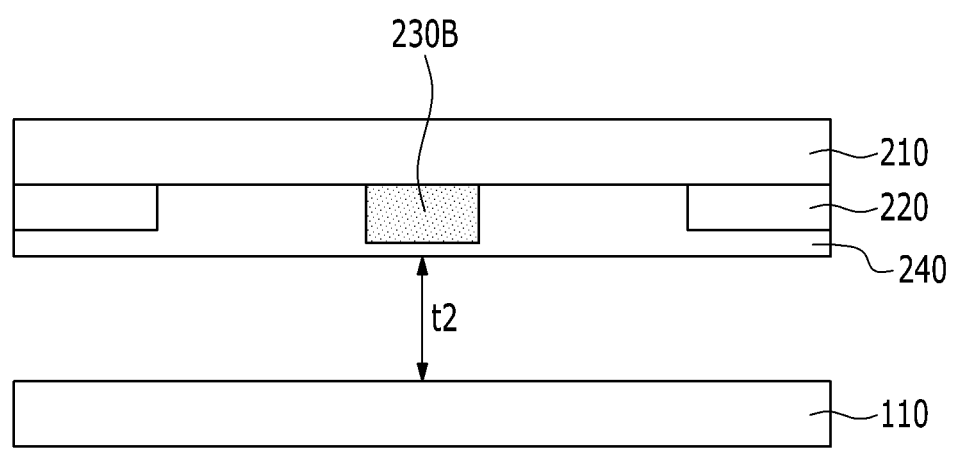
FIG. 20 is a cross-sectional schematic view of the liquid crystal display according to the embodiments of the present invention taken along the line XX-XX of FIG. 17A.

FIG. 17A to FIG. 17F are top plan schematic views illustrating a domain included in a fourth color pixel area of a liquid crystal display according to one or more embodiments of the present invention, and FIG. 18 is a top plan schematic view illustrating a domain included in a fourth color pixel area of a liquid crystal display according to one or more embodiments of the present invention. FIG. 19 is a cross-sectional schematic view of the liquid crystal display according to the embodiments of the present invention taken along the line XIX-XIX of FIG. 17A, and FIG. 20 is a cross-sectional schematic view of the liquid crystal display according to the embodiments of the present invention taken along the line XX-XX of FIG. 17A.

As shown in FIG. 17A, the fourth color pixel area PX(W) may include a plurality of subpixel areas, each of the subpixel areas including a first subpixel area PX_h and a second subpixel area PX_l. Each of the first subpixel area PX_h and the second subpixel area PX_l includes a first domain D1, a second domain D2, a third domain D3, and a fourth domain D4.

A color pattern may be formed in the fourth color pixel area PX(W), and the color pattern may include at least one of the first color filter 230R, the second color filter 230G, and the third color filter 230B. For example, the third color filter 230B may be disposed in the fourth color pixel area PX(W). In the fourth color pixel area PX(W), the third color filter 230B may be disposed in at least one of the first subpixel area PX_h and the second subpixel area PX_l. For example, the third color filter 230B may be disposed in the second subpixel area PX_l of the fourth color pixel area PX(W), at boundaries between the domains D1, D2, D3, and D4 included in the second subpixel area PX_l of the fourth color pixel area PX(W). For example, the third color filter 230B may be disposed at a boundary between the third domain D3 and the fourth domain D4 included in the second subpixel area PX_l of the fourth color pixel area PX(W). Here, the third color filter 230B overlaps with a part of the vertical line serving as a reference for dividing a subpixel area into the domains D1, D2, D3, and D4.

However, the present embodiments are not limited thereto, and the positions of the color patterns in the fourth color pixel area may be changed in various ways. Hereinafter, various positions of the color patterns will be described with reference to FIG. 17B to FIG. 17F.

As shown in FIG. 17B, a color pattern disposed (or positioned) in the fourth color pixel area PX(W) may include the third color filter 230B disposed between the first subpixel area PX_h and the second subpixel area PX_l. A region formed between the first subpixel area PX_h and the second subpixel area PX_l serves as a region at which a thin film transistor and/or the like are disposed, and corresponds to a non-display area. Accordingly, when the color pattern is disposed between the first subpixel area PX_h and the second subpixel area PX_l, the reduction of an aperture ratio can be minimized.

Further, the third color filter 230B may be disposed at a boundary between the first domain D1 and the second domain D2 of the first subpixel area PX_h and at a boundary between the third domain D3 and the fourth domain D4 thereof, and at a boundary between the first domain D1 and the second domain D2 of the second subpixel area PX_l and at a boundary between the third domain D3 and the fourth domain D4 thereof.

Herein, when the third color filter 230B is disposed at the boundary between the first domain D1 and the second domain D2 of the first subpixel area PX_h and at the boundary between the third domain D3 and the fourth domain D4 thereof, and at the boundary between the first domain D1 and the second domain D2 of the second subpixel area PX_l and at the boundary between the third domain D3 and the fourth domain D4 thereof, a width W1 of the third color filter 230B may range from about 5 μm to about 25 μm. In some embodiments, the third color filter 230B may be disposed between the first subpixel area PX_h and the second subpixel area PX_l. When the third color filter 230B is disposed between the first subpixel area PX_h and the second subpixel area PX_l, a width W2 of the third color filter 230B may be substantially the same as a width W3 of the non-display area in which a thin film transistor and/or the like are disposed, which may be in a range from about 25 µm to about 100 µm.

As shown in FIG. 17C, a color pattern disposed in the fourth color pixel area PX(W) may include the third color filter 230B, and the third color filter 230B may be disposed between the first subpixel area PX_h and the second subpixel area PX_l. Further, the third color filter 230B may be disposed at a boundary between the first domain D1 and the fourth domain D4 and a boundary between the second domain D2 and the third domain D3 of each of the first subpixel area PX_h and the second subpixel area PX_l.

Herein, when the third color filter 230B disposed at a boundary between the first domain D1 and the fourth domain D4 and a boundary between the second domain D2 and the third domain D3 of each of the first subpixel area PX_h and the second subpixel area PX_l, a width W4 of the third color filter 230B may range from about 5 µm to about 25 µm.

As shown in FIG. 17D, a color pattern disposed in the fourth color pixel area PX(W) may include the third color filter 230B, and the third color filter 230B may be disposed between the first subpixel area PX_h and the second subpixel area PX_l. In addition, the third color filter 230B may be disposed at boundaries between the domains D1, D2, D3, and D4 of the first subpixel area PX_h and the second subpixel area PX_l.

As shown in FIG. 17E, a color pattern disposed in the fourth color pixel area PX(W) may include the third color filter 230B, and the third color filter 230B may be disposed between the first subpixel area PX_h and the second subpixel area PX_l. In addition, the third color filter 230B may be disposed at a boundary between the first domain D1 and the second domain D2, and a boundary between the third domain D3 and the fourth domain D4, of each of the first subpixel area PX_h and the second subpixel area PX_l. In addition, the third color filter 230B may be disposed at a portion of the boundary between the first domain D1 and the fourth domain D4, and at a portion of the boundary between the second domain D2 and the third domain D3, of each of the first subpixel area PX_h and the second subpixel area PX_l.

In this case, the third color filter 230B disposed in each of the subpixel areas PX_h and PX_l may be formed to have a substantially cross-like shape, where a vertical portion of the cross-like shape may be formed to have a length that is similar to that of a vertical side of each of the subpixel areas PX_h and PX_l, and a horizontal portion of the cross-like shape may be formed to have a length that is shorter than that of a horizontal side of each of the subpixel areas PX_h and PX_l. The horizontal portion of the cross-like shape of the third color filter 230B may be disposed at the center of each of the subpixel areas PX_h and PX_l.

As shown in FIG. 17F, a color pattern disposed in the fourth color pixel area PX(W) may include the third color filter 230B, and the third color filter 230B may be disposed between the first subpixel area PX_h and the second subpixel area PX_l. The third color filter 230B may be disposed at or near a boundary between the first domain D1 and the fourth domain D4, and a boundary between the second domain D2 and the third domain D3, of each of the first subpixel area PX_h and the second subpixel area PX_l. In addition, the third color filter 230B may be disposed at a portion of the boundary between the first domain D1 and the second domain D2, and a portion of the boundary between the third domain D3 and the fourth domain D4, of each of the first subpixel area PX_h and the second subpixel area PX_l.

In this case, the third color filter 230B disposed in each of the subpixel areas PX_h and PX_l may be formed to have a substantially cross-like shape, where a horizontal portion of the cross-like shape may be formed to have a length that is similar to that of a horizontal side of each of the subpixel areas PX_h and PX_l, and a vertical portion of the cross-like shape may be formed to have a length that is shorter than that of a vertical side of each of the subpixel areas PX_h and PX_l. The horizontal portion and the vertical portion of the cross-like shape may be separated from each other.

In the descriptions of FIG. 17A to FIG. 17F, the third color filter is disposed in one fourth color pixel area. However, the third color filter may also be disposed in an adjacent color pixel area. In this case, the third color filters disposed in the adjacent fourth color pixel areas may have different widths.

Hereinafter, the fourth color pixel area shown in FIG. 17A will be described in more detail. FIG. 18 is a more detailed view of the fourth color pixel area shown in FIG. 17A.

As shown in FIG. 18, a gate line 121 and a storage electrode line 131 are formed on a first substrate (not shown).

The gate line 121 extends substantially in a horizontal direction to transmit a gate signal. A first gate electrode 124h and a second gate electrode 124l extend from the gate line 121 and are connected to each other. A third gate electrode 124c protrudes from the gate line 121 to be separated from the first gate electrode 124h and the second gate electrode 124l. The first to third gate electrodes 124h, 124l, and 124c are connected to the same gate line 121 to receive the same gate signal.

The storage electrode line 131 extends in the same direction as the gate line 121, and a predetermined (or set) voltage is applied to the storage electrode line 131. A storage electrode 133 and a protrusion 134 protrude from the storage electrode line 131. The storage electrode 133 may be formed to surround a first subpixel electrode 191h to be described later, and the protrusion 134 may protrude toward the gate line 121.

In some embodiments, a gate insulating layer (not shown) is formed on the gate line 121, the first to third gate electrodes 124h, 124l, and 124c, the storage electrode line 131, the storage electrode 133, and the protrusion 134. The gate insulating layer may include an inorganic insulating material such as silicon nitride (SiNx) and/or silicon oxide (SiOx). The gate insulating layer may be formed as a single layer or as a multilayer.

A first semiconductor 154h, a second semiconductor 154l, and a third semiconductor 154c are formed on the gate insulating layer. The first semiconductor 154h is positioned on the first gate electrode 124h, the second semiconductor 154l is positioned on the second gate electrode 124l, and third semiconductor 154c is positioned on the third gate electrode 124c.

On the data line 171, a first source electrode 173h, a first drain electrode 175h, a second source electrode 173l, a second drain electrode 175l, a third source electrode 173c, and a third drain electrode 175c are respectively formed on the first to third semiconductors 154h, 154l, and 154c and the gate insulating layer.

The first to third semiconductors 154h, 154l, and 154c may be respectively formed on the first to third gate electrodes 124h, 124l, and 124c, and may also each independently be formed below the data line 171. The second semiconductor 154l and the third semiconductor 154c may be connected (or coupled) to each other. However, embodiments of the present invention are not limited thereto. For example, the first to third semiconductors 154h, 154l, and 154c may be formed only on the first to third gate electrodes 124h, 124l, and 124c, and the second semiconductor 154l and the third semiconductor 154c may be separated from each other.

In some embodiments, the data line 171 transfers a data signal and extends in a substantially vertical direction to cross the gate line 121.

The first source electrode 173h protrudes from the data line 171 on the first gate electrode 124h. The first source electrode 173h may have a bent C-shape on the first gate electrode 124h.

The first drain electrode 175h is spaced apart from the first source electrode 173h on the first gate electrode 124h. A channel is formed at an exposed part of the first semiconductor layer 154h between the first source electrode 173h and the first drain electrode 175h.

The second source electrode 173l protrudes from the data line 171 on the second gate electrode 124l. The second source electrode 173l may have a bent C-shape on the second gate electrode 124l.

The second drain electrode 175l is spaced apart from the second source electrode 173l on the second gate electrode 124l. A channel is formed on an exposed part of the second semiconductor layer 154l between the second source electrode 173l and the second drain electrode 175l.

The third source electrode 173c is connected to the second drain electrode 175l, and is formed on the third gate electrode 124c.

The third drain electrode 175c is formed on the third gate electrode 124c and is spaced apart from the third source electrode 173c. A channel is formed at an exposed portion of the third semiconductor layer 154c positioned between the third source electrode 173c and the third drain electrode 175c.

The first gate electrode 124h, the first semiconductor 154h, the first source electrode 173h, and the first drain electrode 175h constitute a first thin film transistor Qh. Further, the second gate electrode 124l, the second semiconductor 154l, the second source electrode 173l, and the second drain electrode 175l constitute a second thin film transistor Ql, and the third gate electrode 124c, the third semiconductor 154c, the third source electrode 173c, and the third drain electrode 175c constitute a third thin film transistor Qc.

In some embodiments, a passivation layer is formed on the data line 171, the first to third source electrodes 173h, 173l, and 173c, and the first to third drain electrodes 175h, 175l, and 175c.

The passivation layer has a first contact hole 185h for exposing a portion of the first drain electrode 175h, a second contact hole 185l for exposing a portion of the second drain electrode 175l, and a third contact hole 185c for exposing portions of the protrusion 134 and the third drain electrode 175c.

A first subpixel electrode 191h and a second subpixel electrode 191l are formed on the passivation layer. The first subpixel electrode 191h is formed in the first subpixel area PX_h, and the second subpixel electrode 191l is formed in the second subpixel area PX_l. In addition, a bridge electrode 196 is formed on the passivation layer.

The first subpixel electrode 191h is connected to the first drain electrode 175h through the first contact hole 185h, and the second subpixel electrode 191l is connected to the second drain electrode 175l through the second contact hole 185l. The bridge electrode 196 is electrically connected to the protrusion 134 that protrudes from the storage line 131 and the third drain electrode 175c through the third contact hole 185c. As a result, the third drain electrode 175c is connected to the storage electrode line 131.

A data voltage is applied to the first subpixel electrode 191h and the second subpixel electrode 191l from the first drain electrode 175h and second drain electrode 175l, respectively. In addition, a portion of the data voltage applied to the second drain electrode 175l is also applied to the third source electrode 173c, such that the voltage applied to the second subpixel electrode 191l may be smaller than the voltage applied to the first subpixel electrode 191h. Here, the data voltage applied to the first subpixel electrode 191h and the second subpixel electrode 191l is positive. When the data voltage applied to the first subpixel electrode 191h and the second subpixel electrode 191l is negative, the voltage applied to the first subpixel electrode 191h may be smaller than the voltage applied to the second subpixel electrode 191l.

An area of the second subpixel electrode 191l may be approximately (about) one to two times that of the first subpixel electrode 191h.

In some embodiments, the first subpixel electrode 191h and the second subpixel electrode 191l are next to each other in a vertical direction, the overall shape thereof is quadrangular, and each subpixel electrode includes a cross-like stem having a horizontal stem portion 193h (or 193l) and a vertical stem portion 192h (or 192l) intersecting (crossing) the respective horizontal stem portion. The pixel electrode 191 includes a micro-branch portion 194 that extends from the respective horizontal stem portion 193h (or 193l) and the respective vertical stem portion 192h (or 192l).

The first subpixel area PX_h and the second subpixel area PX_l of the fourth color pixel area PX(W) are respectively divided into four domains D1, D2, D3, and D4 by the horizontal stem portions 193h and 193l and the vertical stem portions 192h and 192l.

In the fourth color pixel area PX(W), the third color filter 230B may be formed on the same substrate as the pixel electrode 191 or on the substrate facing the pixel electrode 191. The third color filter 230B is partially overlapped with the vertical stem portion 192l of the second subpixel electrode 191l in the second subpixel area PX_l of the fourth color pixel area PX(W). The vertical stem portion 192l serves to divide the second subpixel area PX_l into the domains D1, D2, D3, and D4, and is therefore positioned at the boundaries between the domains D1, D2, D3, and D4. Accordingly, the third color filter 230B is disposed at boundaries between the domains D1, D2, D3, and D4 (e.g., at a boundary between the third domain D3 and the fourth domain D4 of the second subpixel area PX_l of the fourth color pixel area PX(W)).

In the above-described embodiments, each of the pixel areas PX(R), PX(G), and PX(B) has a similar (or substantially similar) structure as the fourth color pixel area PX(W).

Referring to FIG. 19 and FIG. 20, a first cross-section of the first subpixel area PX_h in which no third color filter 230B is formed and a second cross-section of the second subpixel area PX_l in which the third color filter 230B is formed are illustrated. In some embodiments, a cell gap t1 of the first subpixel area PX_h in which no third color filter 230B is formed is relatively larger than a cell gap t2 of the second subpixel area PX_l in which the third color filter 230B is formed. As such, it is possible to adjust a wavelength of light passing through the fourth color pixel area PX(W) by setting different cell gaps in one pixel area.

Next, a liquid crystal display according to one or more embodiments of the present invention will be described with reference to FIG. 21 to FIG. 23.

Figure 21:
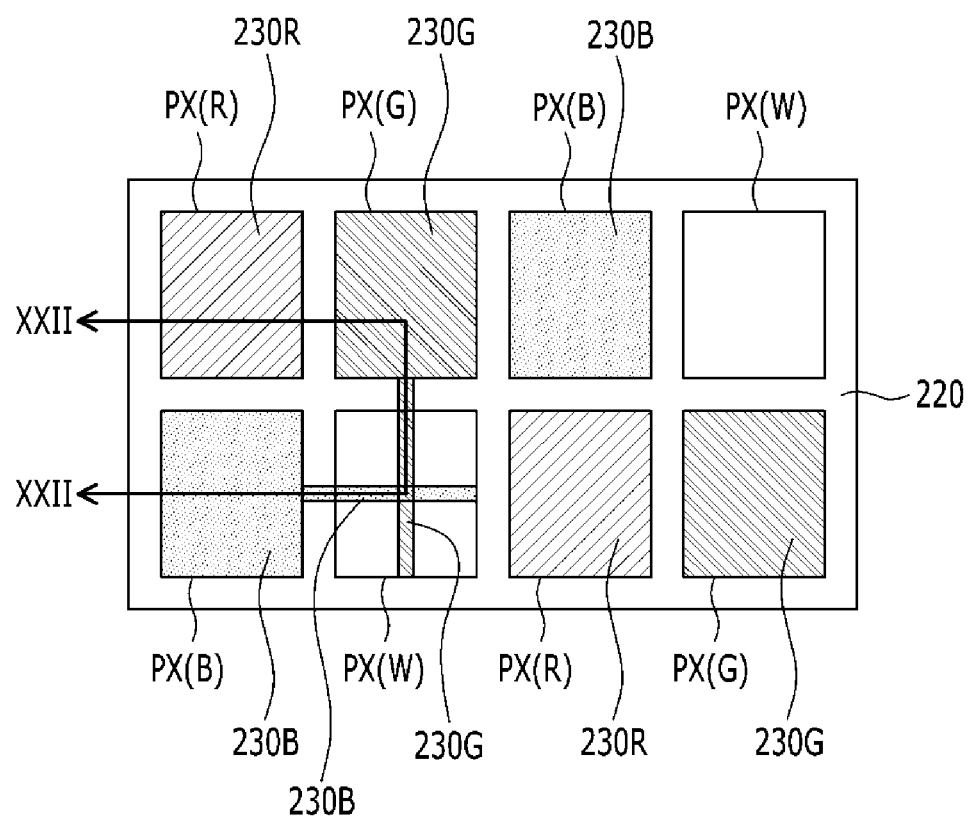
FIG. 21 is a top plan schematic view illustrating a liquid crystal display according to one or more embodiments of the present invention.
Figure 22:
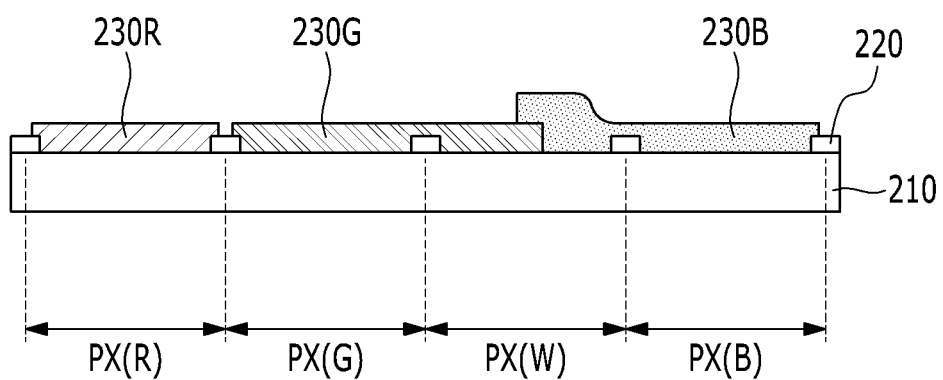
FIG. 22 is a cross-sectional schematic view of the liquid crystal display according to the embodiments of the present invention taken along the line XXII-XXII of FIG. 21.
Figure 23:
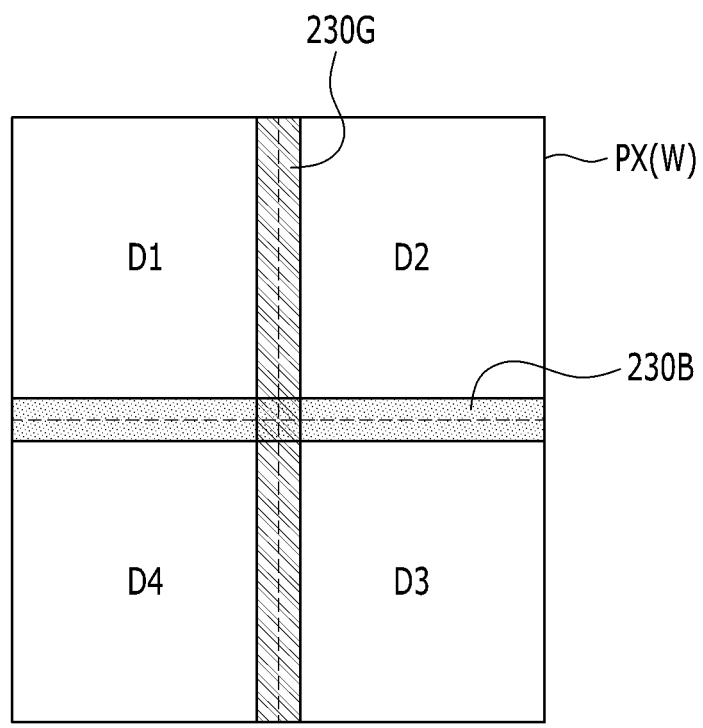
FIG. 23 is a top plan schematic view illustrating a domain included in a fourth color pixel area of a liquid crystal display according to one or more embodiments of the present invention.

Since the liquid crystal display according to the embodiment illustrated in FIG. 21 to FIG. 23 is substantially the same as the liquid crystal display according to the embodiment of the present invention illustrated in FIG. 1 to FIG. 5, the duplicative description thereof will not be provided. The embodiment illustrated in FIG. 21 to FIG. 23 is different from the above-described embodiments in that two color filters are disposed (or positioned) in the fourth pixel area, and hereinafter, will be described in more detail.

FIG. 21 is a top plan schematic view illustrating a liquid crystal display according to one or more embodiments of the present invention, FIG. 22 is a cross-sectional schematic view of the liquid crystal display according to the embodiments of the present invention taken along the line XXII-XXII of FIG. 21, and FIG. 23 is a top plan schematic view illustrating a domain included in a fourth color pixel area of a liquid crystal display according to one or more embodiments of the present invention.

As shown in FIG. 21 and FIG. 22, the first color filter 230R, the second color filter 230G, and the third color filter 230B are respectively disposed in the first color pixel area PX(R), the second color pixel area PX(G), and the third color pixel area PX(B). Further, a color pattern may be formed in the fourth color pixel area PX(W), and the color pattern may include at least one of the first color filter 230R, the second color filter 230G, and the third color filter 230B.

In some embodiments, two of the first color filter 230R, the second color filter 230G, the third color filter 230B, and the light-blocking member 220 may be disposed in the fourth color pixel area PX(W). For example, the second color filter 230G and the third color filter 230B may be disposed in the fourth color pixel area PX(W). However, the combination of the color filters disposed in the fourth color pixel area PX(W) is not limited thereto. For example, the first color filter 230R and the second color filter 230G may be disposed in the fourth color pixel area PX(W), or the first color filter 230R and third color filter 230B may be disposed in the fourth color pixel area PX(W).

In the fourth color pixel area PX(W), the second color filter 230G and the third color filter 230B are overlapped with each other. For example, the second color filter 230G may extend in a first direction, and the third color filter 230B may extend in a second direction. The second color filter 230G and the third color filter 230B may cross each other, and the first direction and the second direction may be perpendicular to each other. The second color filter 230G and the third color filter 230B are overlapped with each other at a portion at which they cross each other.

In the fourth color pixel area PX(W), the second color filter 230G and the third color filter 230B that are overlapped with each other may serve as a spacer for maintaining a cell gap (referring to "CG" in FIG. 2). In other words, in the fourth color pixel area PX(W), the second color filter 230G and the third color filter 230B may be formed such that the thickness of the overlapped portion thereof corresponds to the cell gap. In some embodiments, the second color filter 230G and the third color filter 230B that are formed such that the thickness of the overlapped option thereof is smaller than the cell gap may serve as a sub-spacer. In addition, the thickness of the overlapped portion of the second color filter 230G and the third color filter 230B may be substantially the same as the thickness of one of the first color filter 230R, the second color filter 230G, and the third color filter 230B that are respectively disposed in the first color pixel area PX(R), the second color pixel area PX(G), and the third color pixel area PX(B). Here, the overlapped portion of the second color filter 230G and the third color filter 230B may be used as an auxiliary pattern for performing planarization.

However, the second color filter 230G and the third color filter 230B in the fourth color pixel area PX(W) may have a thickness that is different from that of each of the second color filter 230G and third color filter 230B that are respectively disposed in the second color pixel area PX(G) and the third color pixel area PX(B), in order to allow for adjustment of the thickness of the overlapped portion of the second color filter 230G and the third color filter 230B in the fourth color pixel area PX(W). Here, a halftone mask or a slit mask may be employed.

In the fourth color pixel area PX(W), the second color filter 230G and the third color filter 230B may be each formed to have a bar-like shape that extends in one direction.

Each of the pixel areas PX(R), PX(G), PX(B), and PX(W) may be formed in a rectangular shape having two short sides and two long sides. In the fourth color pixel area PX(W), the second color filter 230G may be disposed at the center of the fourth color pixel area PX(W) between the two long sides thereof and may extend in a direction that is parallel with the long sides, and the third color filter 230B may be disposed at the center of the fourth color pixel area PX(W) between the short sides thereof and may extend in a direction that is parallel with the short sides. However, the shapes and/or the extending directions of the second color filter 230G and third color filter 230B may be variously changed without being limited thereto.

The second color filter 230G and the third color filter 230B that are disposed in the fourth color pixel area PX(W) may be each independently connected to a color filter of another pixel area. For example, the second color filter 230G that is disposed in the fourth color pixel area PX(W) is connected to the second color filter 230G that is disposed in the second color pixel area PX(G), and the third color filter 230B that is disposed in the fourth color pixel area PX(W) is connected to the third color filter 230B that is disposed in the third color pixel area PX(B). However, embodiments of the present invention are not limited thereto. For example, the second color filter 230G and the third color filter 230B that are disposed in the fourth color pixel area PX(W) may not be connected to color filters of the other pixel areas.

As shown in FIG. 23, the fourth color pixel area PX(W) includes the first domain D1, the second domain D2, the third domain D3, and the fourth domain D4, and the second color filter 230G and the third color filter 230B are disposed at boundary regions between the domains D1, D2, D3, and D4. For example, the second color filter 230G may be disposed at a boundary between the first domain D1 and the second domain D2, and at a boundary between the third domain D3 and the fourth domain D4. The third color filter 230B may be disposed at a boundary between the first domain D1 and the fourth domain D4, and a boundary between the second domain D2 and the third domain D3. The second color filter 230G is overlapped with the vertical line serving as the reference for dividing the fourth color pixel area PX(W) into the domains D1, D4, and D2, D3, and the third color filter 230B is overlapped with the horizontal line serving as the reference for dividing the fourth color pixel area PX(W) into the domains D1, D2, and D3, D4. The second color filter 230G and the third color filter 230B are overlapped with each other at a portion at which the vertical line and the horizontal line cross each other.

Next, a liquid crystal display according to one or more embodiments of the present invention will be described with reference to FIG. 24 and FIG. 25.

Figure 24:
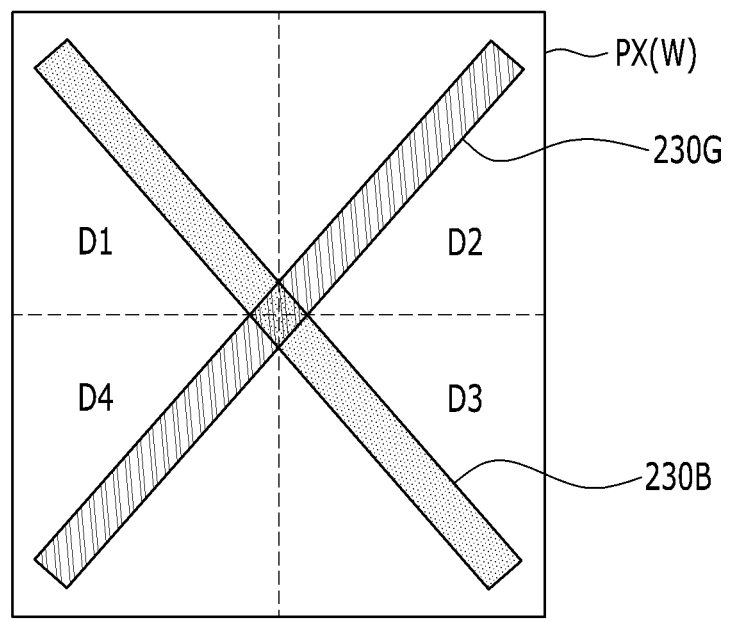
FIG. 24 is a top plan schematic view illustrating a domain included in a fourth color pixel area of a liquid crystal display according to one or more embodiments of the present invention.
Figure 25:
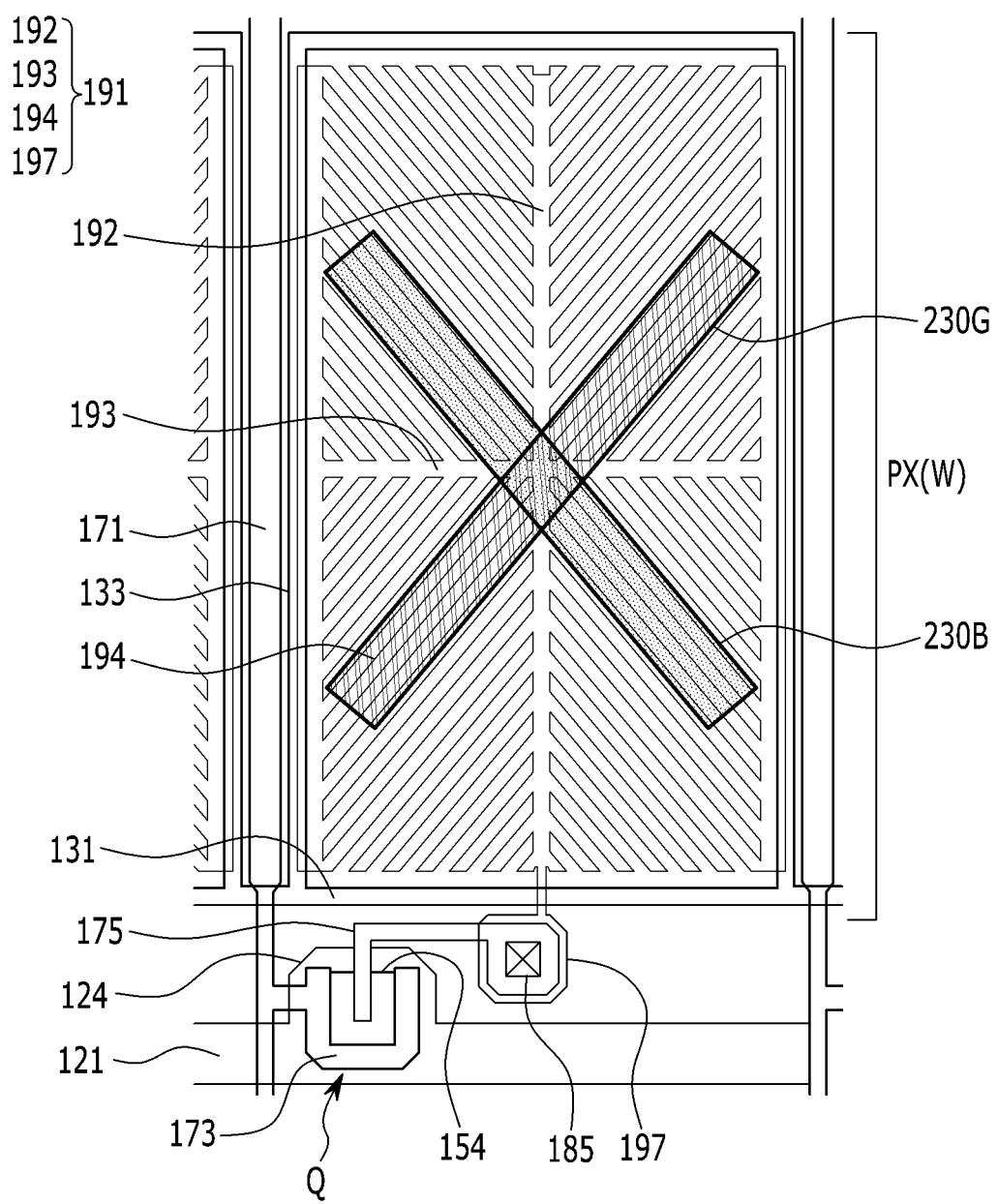
FIG. 25 is a top plan schematic view illustrating a domain included in a fourth color pixel area of a liquid crystal display according to one or more embodiments of the present invention.

Since the liquid crystal display according to the embodiment of the present invention illustrated in FIG. 24 and FIG. 25 is substantially the same as the liquid crystal display according to the embodiment of the present invention illustrated in FIG. 21 to FIG. 23, the duplicative description thereof will not be provided. The difference between the embodiment illustrated in FIG. 24 and FIG. 25 and the above-described embodiments is a position of the color filter in the fourth pixel area, that hereinafter, will be described in more detail.

FIG. 24 is a top plan schematic view illustrating a domain included in a fourth color pixel area of a liquid crystal display according to one or more embodiments of the present invention, and FIG. 25 is a top plan schematic view illustrating a domain included in a fourth color pixel area of a liquid crystal display according to one or more embodiments of the present invention.

As shown in FIG. 24, a color pattern may be formed in the fourth color pixel area PX(W), and the color pattern may include at least one of the first color filter 230R, the second color filter 230G, and the third color filter 230B.

For example, the second color filter 230G and the third color filter 230B may be disposed in the fourth color pixel area PX(W). However, embodiments of the present invention are not limited thereto. In some embodiments, in the fourth color pixel area PX(W), the first color filter 230R and the second color filter 230G may be disposed, or the first color filter 230R and the third color filter 230B may be disposed.

In the fourth color pixel area PX(W), the second color filter 230G and the third color filter 230B are overlapped with each other. The second color filter 230G and the third color filter 230B may cross each other, and may be overlapped with each other at a portion at which they cross each other.

The fourth color pixel area PX(W) may have a rectangular shape with two short sides and two long sides. The second color filter 230G and the third color filter 230B each form a predetermined (or set) angle with respect to at least one side of the fourth color pixel area PX(W). An angle between the second color filter 230G and at least one of the short sides of the fourth color pixel area PX(W) may be substantially the same as an angle between the third color filter 230B and at least one of the short sides of the fourth color pixel area PX(W).

The fourth color pixel area PX(W) includes a first domain D1, a second domain D2, a third domain D3, and a fourth domain D4. In some embodiments, the second color filter 230G is mainly disposed in the second domain D2 and the fourth domain D4, and the third color filter 230B is mainly disposed at the first domain D1 and the third domain D3.

As shown in FIG. 25, the pixel electrode 191 includes a horizontal stem portion 193, a vertical stem portion 192, and a micro-branch portion 194.

The second color filter 230G and the third color filter 230B each extend parallel to and are overlapped with the micro-branch portion 194. For example, the second color filter 230G extends in the direction parallel to and is overlapped with the micro-branch portion 194 that is disposed at the second domain D2 and the fourth domain D4. The third color filter 230B extends in the direction parallel to and is overlapped with the micro-branch portion 194 that is disposed at the first domain D1 and the third domain D3.

Next, a liquid crystal display according to one or more embodiments of the present invention will be described with reference to FIG. 26 to FIG. 28.

Figure 26:
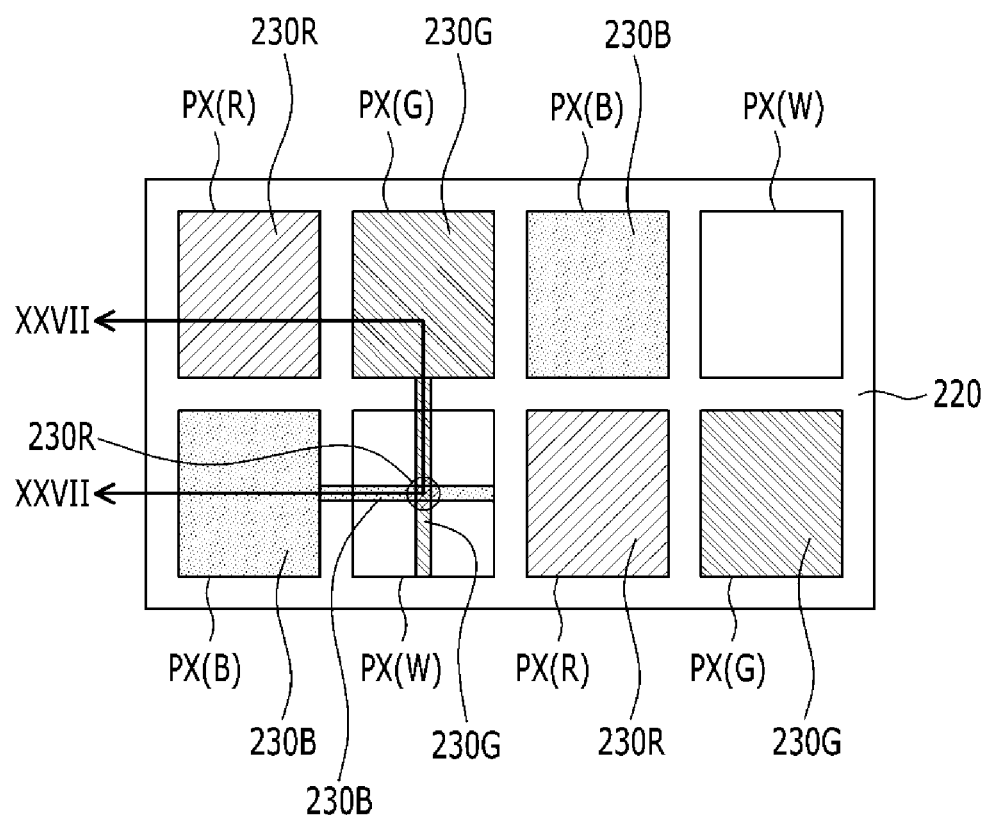
FIG. 26 is a top plan schematic view illustrating a fourth color pixel of a liquid crystal display according to one or more embodiments of the present invention.
Figure 27:
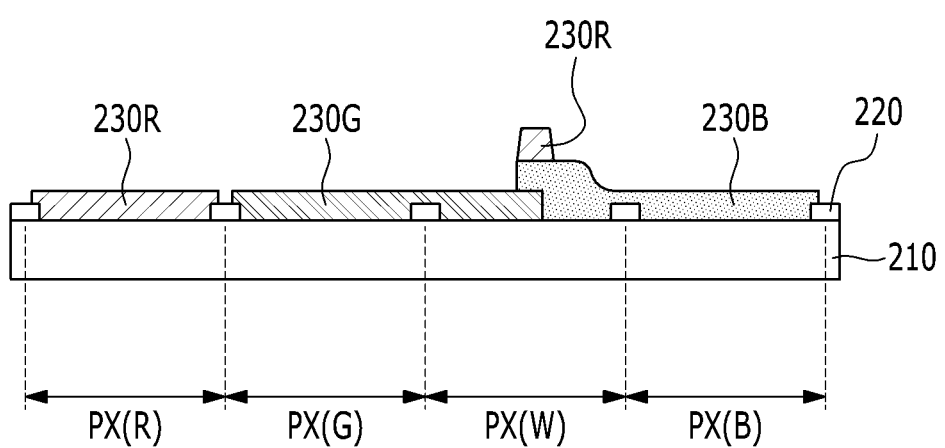
FIG. 27 is a cross-sectional schematic view of the liquid crystal display according to the embodiments of the present invention taken along the line XXVII-XXVII of FIG. 26.
Figure 28:
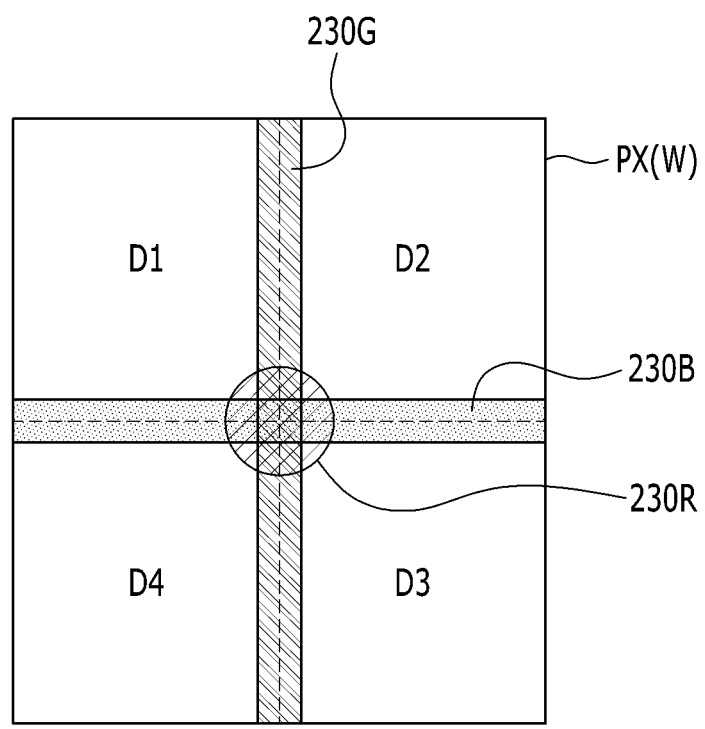
FIG. 28 is a top plan schematic view illustrating a domain included in a fourth color pixel area of a liquid crystal display according to one or more embodiments of the present invention.

Since the liquid crystal display according to the embodiment of the present invention illustrated in FIG. 26 to FIG. 28 is substantially the same as the liquid crystal display according to the embodiment of the present invention illustrated in FIG. 21 to FIG. 23, the duplicative description thereof will not be provided. The difference between the embodiment illustrated in FIG. 26 to FIG. 28 and the above-described embodiment is the color filters disposed in the fourth pixel area, that hereinafter, will be described in more detail.

FIG. 26 is a top plan schematic view illustrating a fourth color pixel of a liquid crystal display according to one or more embodiments of the present invention, FIG. 27 is a cross-sectional schematic view of the liquid crystal display according to the embodiments of the present invention taken along the line XXVII-XXVII of FIG. 26, and FIG. 28 is a top plan schematic view illustrating a domain included in a fourth color pixel area of a liquid crystal display according to one or more embodiments of the present invention.

As shown in FIG. 26 and FIG. 27, the first color filter 230R, the second color filter 230G, and the third color filter 230B are respectively disposed in the first color pixel area PX(R), the second color pixel area PX(G), and the third color pixel area PX(B). Further, a color pattern may be formed in the fourth color pixel area PX(W), and the color pattern may include at least one of the first color filter 230R, the second color filter 230G, and the third color filter 230B. For example, the first color filter 230R, the second color filter 230G, and the third color filter 230B may be disposed in the fourth color pixel area PX(W).

The second color filter 230G and the third color filter 230B may be overlapped with each other in the fourth color pixel area PX(W). The second color filter 230G may be formed to extend in a first direction, and the third color filter 230B may be formed in a second direction. The second color filter 230G and the third color filter 230B may cross each other and may be perpendicular to each other. The first color filter 230R may be disposed at a portion at which the second color filter 230G and the third color filter 230B cross each other. As a result, the first color filter 230R, the second color filter 230G, and the third color filter 230B may be overlapped with each other at the portion at which the second color filter 230G and the third color filter 230B cross each other.

In the fourth color pixel area PX(W), the first color filter 230R, the second color filter 230G, and the third color filter 230B that are overlapped with each other may serve as a spacer for maintaining a cell gap (referring to "CG" in FIG. 2). In other words, in the fourth color pixel area PX(W), the first color filter 230R, the second color filter 230G, and the third color filter 230B may be formed such that the thickness of the overlapped portion thereof corresponds to the cell gap. When the first color filter 230R, the second color filter 230G and the third color filter 230B are formed such that the thickness of the overlapped option thereof is smaller than the cell gap, the color filters may serve as sub-spacers. In addition, the thickness of the overlapped portion of the first color filter 230R, the second color filter 230G, and the third color filter 230B may be substantially the same as the thickness of one of the first color filter 230R, the second color filter 230G, and the third color filter 230B that are respectively disposed in the first color pixel area PX(R), the second color pixel area PX(G), and the third color pixel area PX(B). Here, the overlapped portion of the first color filter 230R, the second color filter 230G, and third color filter 230B may be used as an auxiliary pattern for performing planarization.

However, the first color filter 230R, the second color filter 230G and the third color filter 230B in the fourth color pixel area PX(W) may each be formed to have a thickness that is different from that of each of the second color filter 230G and the third color filter 230B that are respectively disposed in the second color pixel area PX(G) and the third color pixel area PX(B), in order to allow for adjustment of the thickness of the overlapped portion of the first color filter 230R, the second color filter 230G, and the third color filter 230B in the fourth color pixel area PX(W). Here, a halftone mask or a slit mask may be employed.

In the fourth color pixel area PX(W), the second color filter 230G and the third color filter 230B may each have a bar-like shape extending in (along) one direction, and the first color filter 230R may have a circular shape.

Each of the pixel areas PX(R), PX(G), PX(B), and PX(W) may be formed in a rectangular shape having two short sides and two long sides. In the fourth color pixel area PX(W), the second color filter 230G may be disposed (or positioned) in the center between the two long sides of the fourth color pixel area PX(W), in a direction that is parallel with the long sides, the third color filter 230B may be disposed in the center between the short sides of the fourth color pixel area PX(W), in a direction that is parallel with the short sides, and the first color filter 230R may be disposed in the center of the fourth color pixel area PX(W). However, the shapes and the extending directions of the first color filter 230R, the second color filter 230G, and the third color filter 230B are not limited thereto.

The second color filter 230G and the third color filter 230B that are disposed in the fourth color pixel area PX(W) may be each independently connected to a color filter of another pixel area. For example, the second color filter 230G that is disposed in the fourth color pixel area PX(W) may be connected to the second color filter 230G that is disposed in the second color pixel area PX(G), and the third color filter 230B that is disposed in the fourth color pixel area PX(W) may be connected to the third color filter 230B that is disposed in the third color pixel area PX(B). However, embodiments of the present invention are not limited thereto. In some embodiments, the second color filter 230G and the third color filter 230B that are disposed in the fourth color pixel area PX(W) may not be connected to color filters of the other pixel areas.

As shown in FIG. 28, the fourth color pixel area PX(W) includes the first domain D1, the second domain D2, the third domain D3, and the fourth domain D4, and the first color filter 230R, the second color filter 230G, and the third color filter 230B are disposed at boundary regions between the domains D1, D2, D3, and D4. For example, the second color filter 230G may be disposed at a boundary between the first domain D1 and the second domain D2, and at a boundary between the third domain D3 and the fourth domain D4. The third color filter 230B may be disposed at a boundary between the first domain D1 and the fourth domain D4, and a boundary between the second domain D2 and the third domain D3. The second color filter 230G is overlapped with the vertical line serving as the reference for dividing the fourth color pixel area PX(W) into the domains D1, D4, and D2, D3, and the third color filter 230B is overlapped with the horizontal line serving as the reference for dividing the fourth color pixel area PX(W) into the domains D1, D2, and D3, D4. The first color filter 230R may be disposed at a portion at in which the horizontal line and the vertical line are overlapped with each other. In some embodiments, the first color filter 230R, the second color filter 230G, and the third color filter 230B are overlapped with each other at a portion at which the vertical line and the horizontal line cross each other.

Next, a liquid crystal display according to one or more embodiments of the present invention will be described with reference to FIG. 29.

Figure 29:
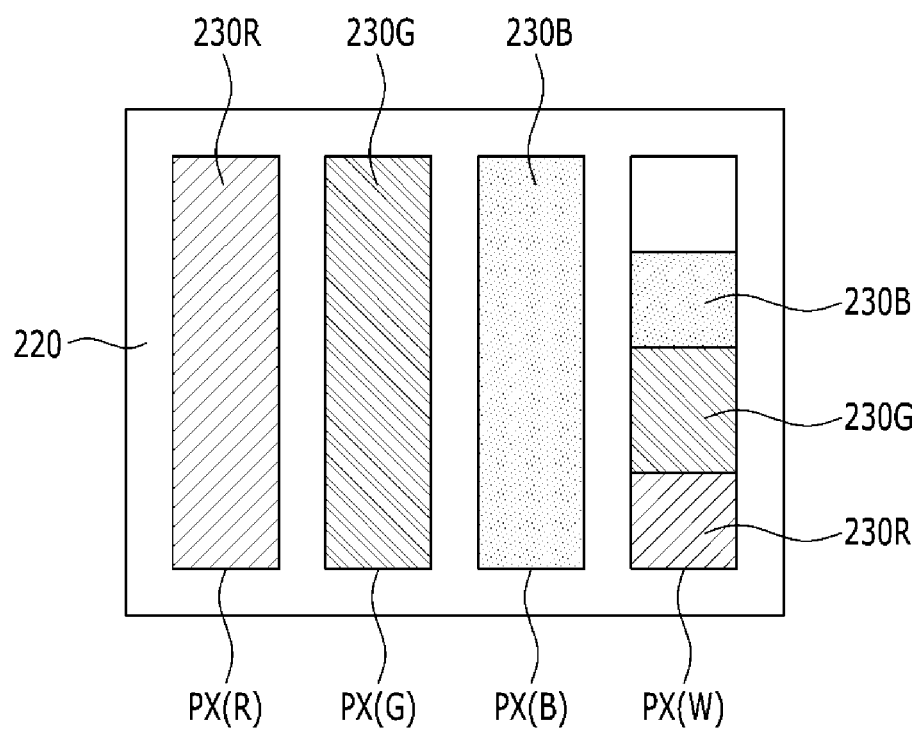
FIG. 29 is a top plan schematic view illustrating a liquid crystal display according to one or more embodiments of the present invention.

Since the liquid crystal display according to the embodiment of the present invention illustrated in FIG. 29 is substantially the same as the liquid crystal display according to the embodiment of the present invention illustrated in FIG. 26 to FIG. 28, the duplicative description thereof will not be provided. The embodiment illustrated in FIG. 29 is different from the above-described embodiments in that the color filters that are formed in the fourth pixel area are not overlapped with each other, and hereinafter, will be described in more detail.

FIG. 29 is a top plan schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B. As shown in FIG. 29, the first color filter 230R, the second color filter 230G, and the third color filter 230B may be disposed in the fourth color pixel area PX(W). However, embodiments of the present invention are not limited thereto. For example, one of the first color filter 230R, the second color filter 230G, the third color filter 230B, and the light-blocking member 220 may be disposed in the fourth color pixel area PX(W), or a combination of two thereof may be disposed therein.

Each of the pixel areas PX(R), PX(G), PX(B), and PX(W) may be formed in a rectangular shape having two short sides and two long sides. In the fourth color pixel area PX(W), the first color filter 230R, the second color filter 230G, and the third color filter 230B are disposed next to each other such that the boundaries between the color filters are parallel to the short sides of the fourth color pixel area PX(W). In some embodiments, the second color filter 230G is disposed between the first color filter 230R and the third color filter 230B, but embodiments of the present invention are not limited thereto. The disposing sequence of the color filters 230R, 230G, and 230B may be changed in various ways.

In some embodiments, the fourth color pixel area PX(W) includes a filter-free region in which none of the first color filter 230R, the second color filter 230G, and the third color filter 230B are disposed.

In the fourth color pixel area PX(W), the first color filter 230R, the second color filter 230G, the third color filter 230B, and the filter-free region in which no color filter is disposed may be the same size or different sizes. For example, in the fourth color pixel area PX(W), a blue filter may be formed at a relatively higher size ratio than that of the rest of the color filters, to prevent or reduce a yellowish phenomenon (or yellowish appearance).

Next, a liquid crystal display according to one or more embodiments of the present invention will be described with reference to FIG. 30.

Figure 30:
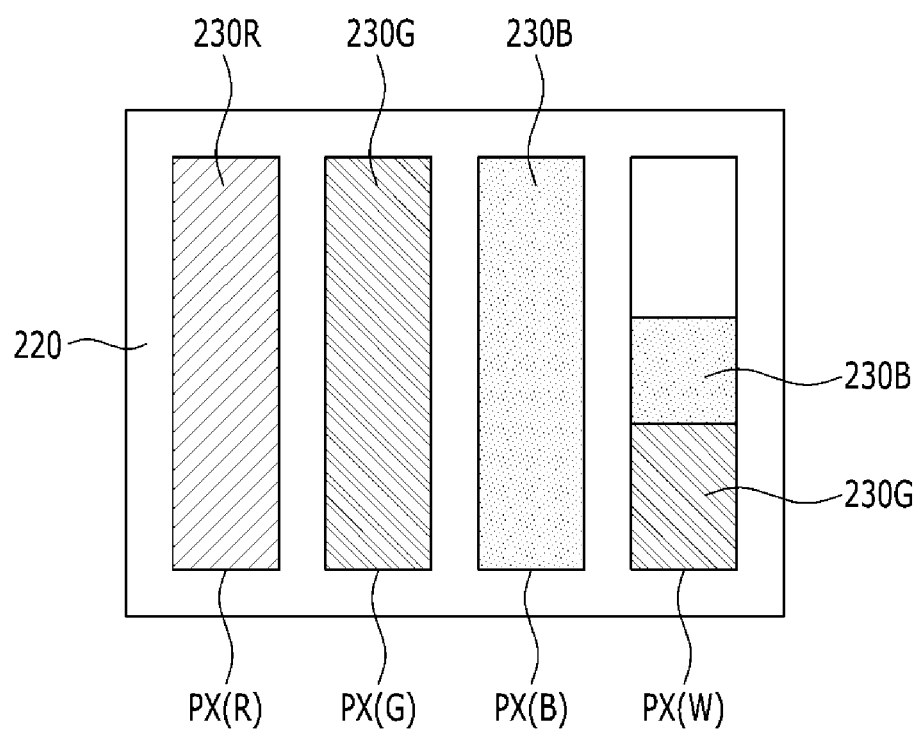
FIG. 30 is a top plan schematic view illustrating a liquid crystal display according to one or more embodiments of the present invention.

Since the liquid crystal display according to the embodiment of the present invention illustrated in FIG. 30 is substantially the same as the liquid crystal display according to the embodiment of the present invention illustrated in FIG. 29, the duplicative description thereof will not be provided. The embodiment illustrated in FIG. 30 is different from the above-described embodiment in that only two color filters are disposed in the fourth pixel area, and hereinafter, will be described in more detail.

FIG. 30 is a top plan schematic view illustrating a liquid crystal display according to one or more embodiments of the present invention.

A color pattern may be formed at (or in) the fourth color pixel area PX(W), and the color pattern may include at least one of the first color filter 230R, the second color filter 230G, and the third color filter 230B.

In the embodiment illustrated in FIG. 30, only the second color filter 230G and the third color filter 230B are disposed in the fourth color pixel area PX(W). However, the combination of the color filters that are formed in the fourth color pixel area PX(W) may vary. For example, the first color filter 230R and the second color filter 230G may be disposed therein, or the first color filter 230R and the third color filter 230B may be disposed therein.

In the fourth color pixel area PX(W), the second color filter 230G, the third color filter 230B, and the filter-free region at which no color filter is disposed may be the same size or different sizes.

Next, a liquid crystal display according to one or more embodiments of the present invention will be described with reference to FIG. 31 to FIG. 33.

Figure 31:
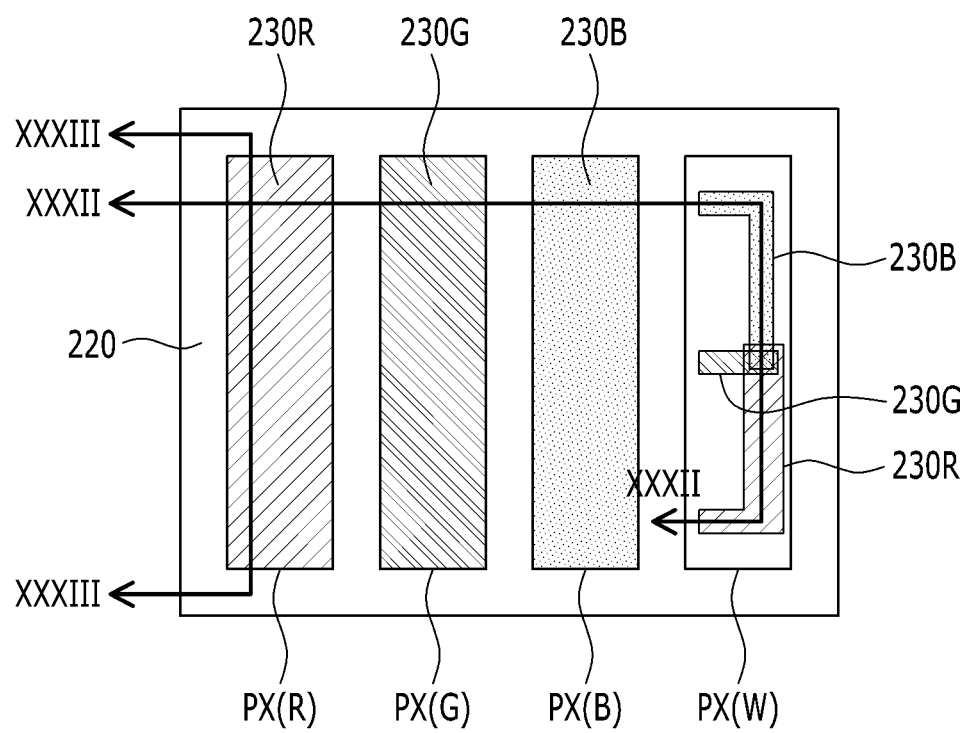
FIG. 31 is a top plan schematic view illustrating a liquid crystal display according to one or more embodiments of the present invention.
Figure 32:
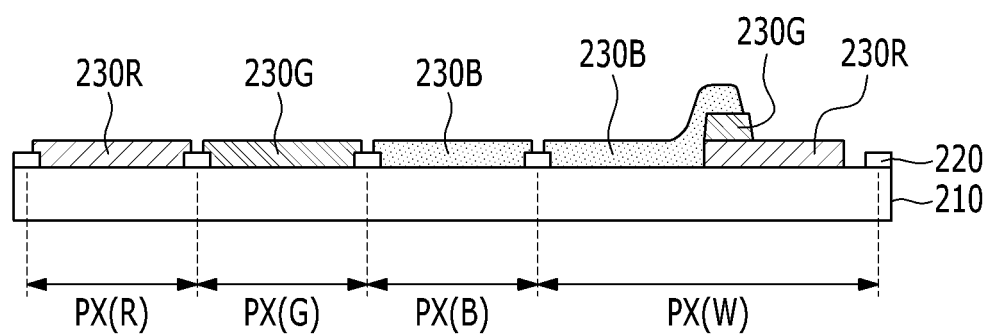
FIG. 32 is a cross-sectional schematic view of the liquid crystal display according to the embodiments of the present invention taken along the line XXXII-XXXII of FIG. 31.
Figure 33:
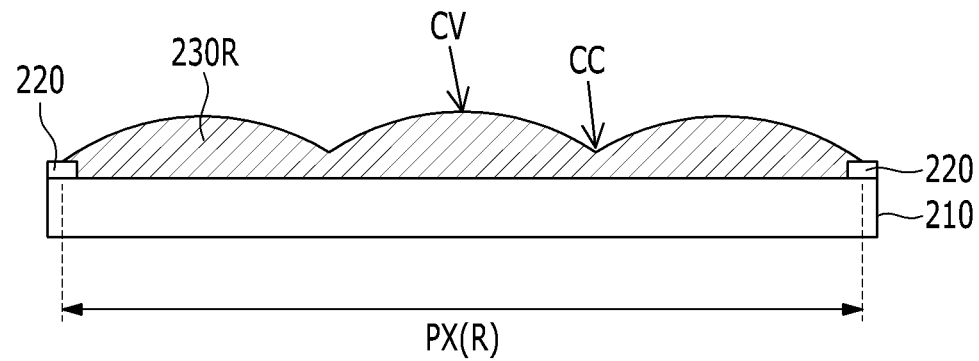
FIG. 33 is a cross-sectional schematic view of the liquid crystal display according to the embodiments of the present invention taken along the line XXXII-XXXII of FIG. 31.

Since the liquid crystal display according to the embodiment of the present invention illustrated in FIG. 31 to FIG. 33 is substantially the same as the liquid crystal display according to the embodiment of the present invention illustrated in FIG. 26 to FIG. 28, the duplicative description thereof will not be provided. The embodiment illustrated in FIG. 31 to FIG. 33 is different from the above-described embodiments in the position and shape of the color filters that are formed in the fourth pixel area, and hereinafter, will be described in more detail.

FIG. 31 is a top plan schematic view illustrating a liquid crystal display according to one or more embodiments of the present invention, FIG. 32 is a cross-sectional schematic view of the liquid crystal display according to the embodiments of the present invention taken along the line XXXII-XXXII of FIG. 31, and FIG. 33 is a cross-sectional schematic view of the liquid crystal display according to the embodiments of the present invention taken along the line XXXII-XXXII of FIG. 31.

As shown in FIG. 31 and FIG. 32, the first color filter 230R, the second color filter 230G, and the third color filter 230B are respectively disposed in the first color pixel area PX(R), the second color pixel area PX(G), and the third color pixel area PX(B).

A color pattern may be formed at (or in) the fourth color pixel area PX(W), and the color pattern may include at least one of the first color filter 230R, the second color filter 230G, and the third color filter 230B. For example, the first color filter 230R, the second color filter 230G, and the third color filter 230B may be disposed in the fourth color pixel area PX(W). Further, the first color filter 230R, the second color filter 230G, and the third color filter 230B may be overlapped with each other.

In some embodiments, the first color filter 230R and the third color filter 230B are each formed to have a bent L-shape. The first color filter 230R and the third color filter 230B are symmetrically formed (e.g., as mirror images of each other), and are overlapped with each other on a symmetric axis. When the fourth color pixel area PX(W) is formed in a rectangular shape having two short sides and two long sides, the symmetric axis is at the center of the fourth color pixel area PX(W) and extends in a direction that is parallel with the short sides of the fourth color pixel area PX(W). The first color filter 230R is formed to have an L-shape that is bent along to an lower side and a right side of the fourth color pixel area PX(W), and the third color filter 230B is formed to have an L-shape that is bent along to an upper side and the right side of the fourth color pixel area PX(W). The first color filter 230R and the third color filter 230B may be overlapped with each other in a central region of the right side of the fourth color pixel area PX(W).

The second color filter 230G may be disposed at the symmetric axis. Specifically, the second color filter 230G may be disposed at the center between the upper side and the lower side of the fourth color pixel area PX(W), and may be overlapped with the first color filter 230R and the third color filter 230B at the central portion of the right side of the fourth color pixel area PX(W). The first color filter 230R, the second color filter 230G, and the third color filter 230B may be formed such that the thickness of the overlapped portion thereof is substantially the same as a cell gap (referring to "CG" in FIG. 2), thus serving as a spacer. When the first color filter 230R, the second color filter 230G, and the third color filter 230B are formed such that the thickness of the overlapped option thereof is smaller than the cell gap, the color filters may serve as sub-spacers. In addition, the thickness of the overlapped portion of the first color filter 230R, the second color filter 230G, and the third color filter 230B in the fourth color pixel area PX(W) may be substantially the same as that of one of the first color filter 230R, the second color filter 230G, and the third color filter 230B that are respectively disposed in the first color pixel area PX(R), the second color pixel area PX(G), and the third color pixel area PX(B). Here, the overlapped portion of the first color filter 230R, the second color filter 230G, and the third color filter 230B may be used as an auxiliary pattern for performing planarization.

The formation of the color filters facing various directions may pose some difficulties. For example, the color filters may be formed to extend in a first direction (e.g., the horizontal direction) and a second direction (e.g., the vertical direction). Further, for convenience of the process, one color filter may be formed to be connected in one pixel. In some embodiments, the color filters are formed to have a bent L-shape such that they are overlapped with each other at a portion at which they cross each other.

As shown in FIG. 33, in the first color pixel area PX(R), an upper surface of the first color filter 230R includes convex portions CV and recess portions CC. When the upper surface of the first color filter 230R is flat, a path of light passing through the liquid crystal display which is frontally viewed (or viewed from the front) may be different from a path of light passing through the liquid crystal display which is laterally viewed (or viewed from the side). However, as described in embodiments of the present invention, the frontally viewed light path and the laterally viewed light path of the liquid crystal display can be adjusted to be the same by forming the upper surface of the first color filter 230R to have a shape including the convex portions CV and the recess portions CC, thereby improving the side visibility (or visibility of the liquid crystal display from a side angle).

In some embodiments, as shown in FIG. 33, the convex portions CV and the recess portions CC may alternate along the long sides of the first color pixel area PX(R). However, the convex portions CV and the recess portions CC may also be arranged to alternate along the short sides of the first color pixel area PX(R). In some embodiments, the convex portions CV and the recess portions CC may be arranged in a matrix form along the long sides and the short sides.

In FIG. 33, a cross-section of the first color pixel area PX(R) is illustrated. However, it should be understood that the upper surfaces of each of the second color filter 230G and the third color filter 230B may have similar convex portions CV and recess portions CC.

Next, a liquid crystal display according to one or more embodiments of the present invention will be described with reference to FIG. 34 and FIG. 35.

Figure 34:
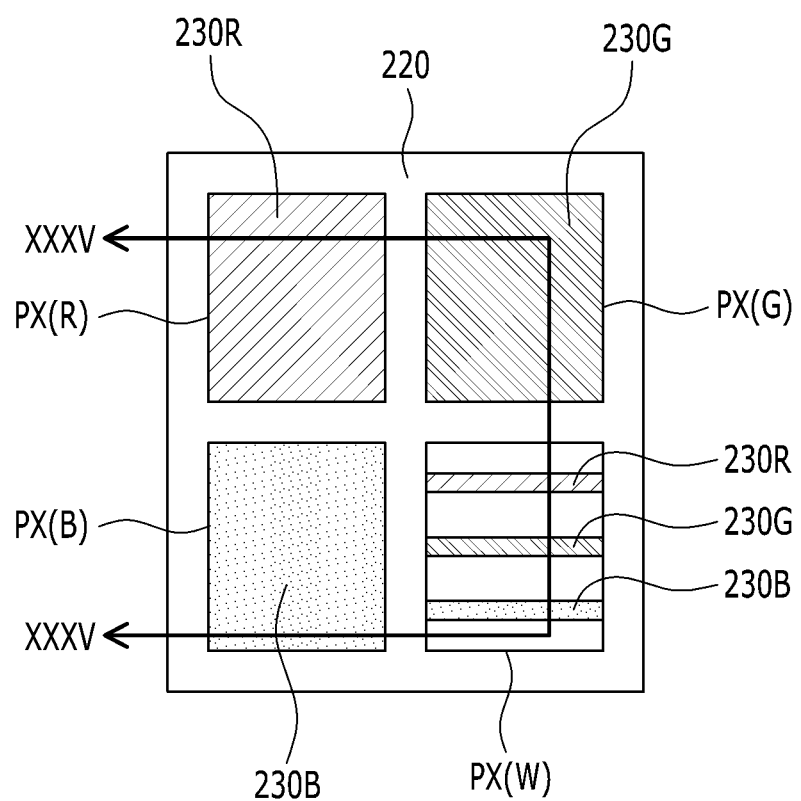
FIG. 34 is a top plan schematic view illustrating a liquid crystal display according to one or more embodiments of the present invention.
Figure 35:
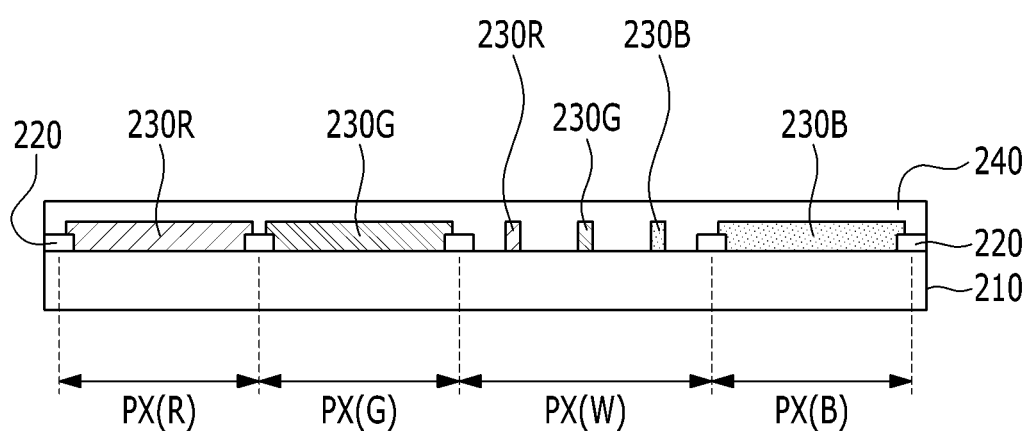
FIG. 35 is a cross-sectional schematic view of the liquid crystal display according to the embodiments of the present invention taken along the line XXXV-XXXV of FIG. 34.

Since the liquid crystal display according to the embodiment of the present invention illustrated in FIG. 34 and FIG. 35 is substantially the same as the liquid crystal display according to the embodiment of the present invention illustrated in FIG. 26 to FIG. 28, the duplicative description thereof will not be provided. The difference between the embodiment illustrated in FIG. 34 and FIG. 35 and the above-described embodiments, is the position of the color filters that are formed in the fourth pixel area, that hereinafter, will be described in more detail.

FIG. 34 is a top plan schematic view illustrating a liquid crystal display according to one or more embodiments of the present invention, and FIG. 35 is a cross-sectional schematic view of the liquid crystal display according to the exemplary embodiment of the present invention taken along the line XXXV-XXXV of FIG. 34.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B. For example, the first color filter 230R, the second color filter 230G, and the third color filter 230B may be disposed in the fourth color pixel area PX(W). The first color filter 230R, the second color filter 230G, and the third color filter 230B may be separated from each other by a predetermined (or set) distance, without overlapping with each other.

The fourth color pixel area PX(W) may be formed in a rectangular shape having two short sides and two long sides. The first color filter 230R, the second color filter 230G, and the third color filter 230B may each extend in a direction that is parallel with the short sides of the fourth color pixel area PX(W).

The first color filter 230R, the second color filter 230G, and the third color filter 230B may have the same width, and distances between the adjacent color filters 230R, 230G, and 230B may be constant. However, embodiments of the present invention are not limited thereto. For example, the first color filter 230R, the second color filter 230G, and the third color filter 230B may have different widths, and distances between the adjacent color filters 230R, 230G, and 230B may be different. An area ratio of each of the first color filter 230R, the second color filter 230G, and the third color filter 230B in the fourth color pixel area PX(W) can be controlled by adjusting the respective widths of the first color filter 230R, the second color filter 230G, and the third color filter 230B. For example, a yellowish phenomenon (or a yellowish appearance) at the white pixel can be prevented or substantially reduced by increasing the widths of the green filter and/or the blue filter.

Next, a liquid crystal display according to one or more embodiments of the present invention will be described with reference to FIG. 36.

Figure 36:
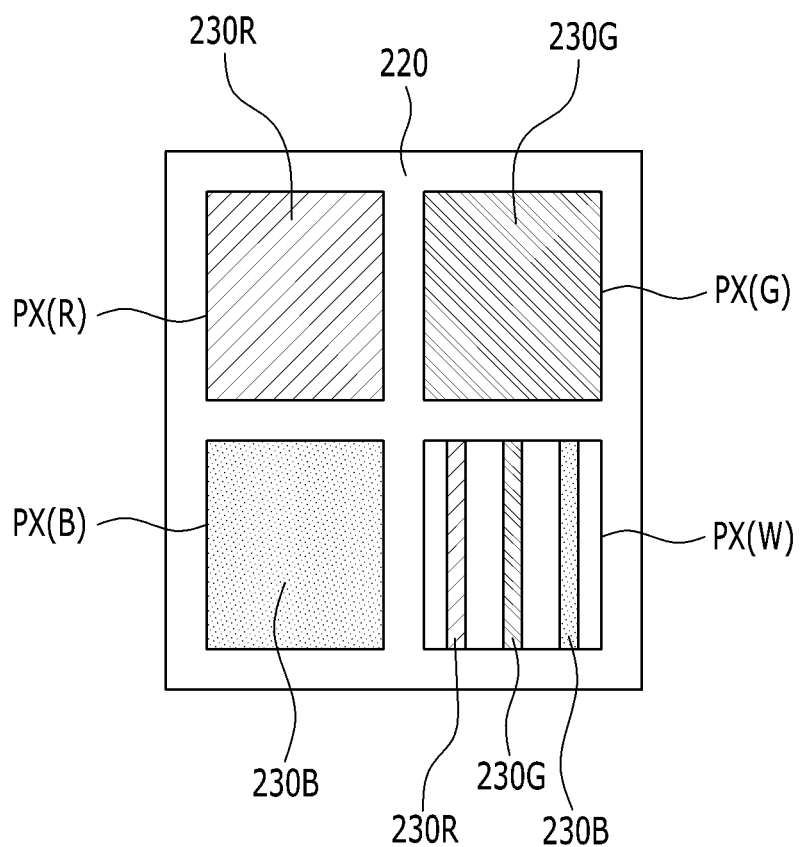
FIG. 36 is a top plan schematic view illustrating a liquid crystal display according to one or more embodiments of the present invention.

Since the liquid crystal display according to the embodiment of the present invention illustrated in FIG. 36 is substantially the same as the liquid crystal display according to the embodiment of the present invention illustrated in FIG. 34 and FIG. 35, the duplicative description thereof will not be provided. The difference between the embodiment illustrated in FIG. 36 and the above-described embodiments is the position of the color filters that are formed in the fourth pixel area, that hereinafter, will be described in more detail.

FIG. 36 is a top plan schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B. For example, the first color filter 230R, the second color filter 230G, and the third color filter 230B may be disposed in the fourth color pixel area PX(W). The first color filter 230R, the second color filter 230G, and the third color filter 230B may be separated from each other by a predetermined (or set) distance, without overlapping with each other.

The fourth color pixel area PX(W) may be formed in a rectangular shape having two short sides and two long sides. The first color filter 230R, the second color filter 230G, and the third color filter 230B may each extend in a direction that is parallel with the long sides of the fourth color pixel area PX(W).

The first color filter 230R, the second color filter 230G, and the third color filter 230B may have the same width, and distances between the adjacent color filters 230R, 230G, and 230B may be constant. However, embodiments of the present invention are not limited thereto. For example, the first color filter 230R, the second color filter 230G, and the third color filter 230B may have different widths, and distances between the adjacent color filters 230R, 230G, and 230B may be different.

According to the embodiment of FIG. 34, in the fourth color pixel area PX(W), the color filters 230R, 230G, and 230B extend in parallel with the short sides of the fourth color pixel area PX(W), and according to the embodiment of FIG. 36, the color filters 230R, 230G, and 230B extend in parallel with the long sides of the fourth color pixel area PX(W). As shown in FIG. 34, when the color filters 230R, 230G, and 230B are formed in parallel with the short sides of the fourth color pixel area PX(W), the color filters 230R, 230G, and 230B can be relatively wide as compared with the respective color filters of FIG. 36, and process stability can be improved.

As illustrated in FIG. 34 and FIG. 36, one first color filter 230R, one second color filter 230G, and one third color filter 230B are disposed in one fourth color pixel area PX(W), but embodiments of the present invention are not limited thereto. For example, a plurality of color filters 230R, 230G, and 230B may be disposed in one fourth color pixel area PX(W). As a result, the area ratio of the color filters 230R, 230G, and 230B can be controlled by adjusting the number of color filters 230R, 230G, and 230B, while identically setting the widths thereof (maintaining the widths of the color filters constant). Alternatively, both the width and the number of each of the color filters 230R, 230G, and 230B may be varied.

Next, a liquid crystal display according to one or more embodiments of the present invention will be described with reference to FIG. 37.

Figure 37:
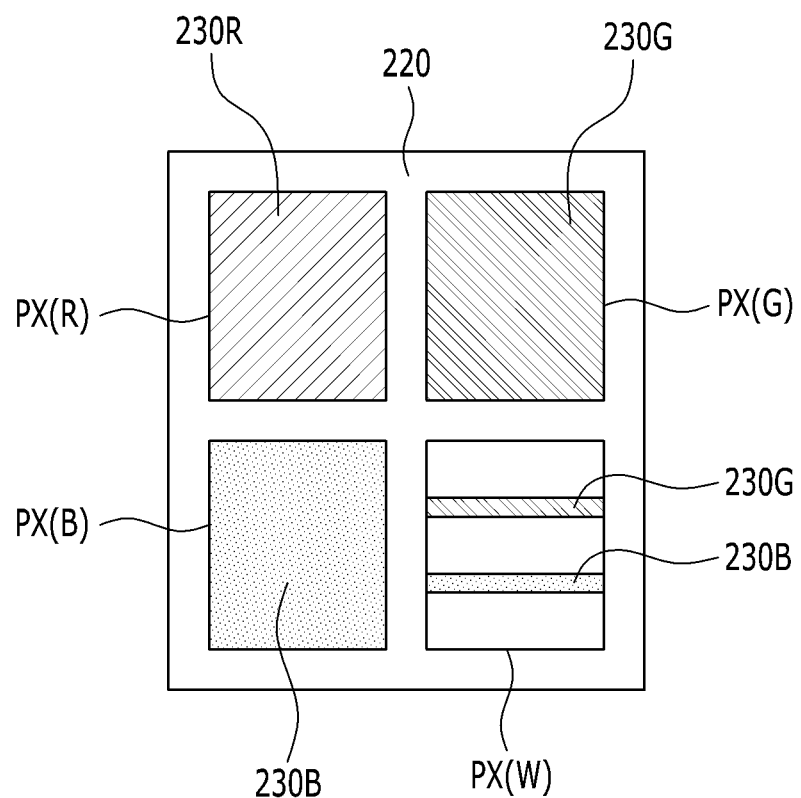
FIG. 37 is a top plan schematic view illustrating a liquid crystal display according to one or more embodiments of the present invention.

Since the liquid crystal display according to the embodiment of the present invention illustrated in FIG. 37 is substantially the same as the liquid crystal display according to the embodiment of the present invention illustrated in FIG. 34 and FIG. 35, the duplicative description thereof will not be provided. The embodiment illustrated in FIG. 37 is different from the above-described embodiments in that only two color filters are disposed in the fourth pixel area, and hereinafter, will be described in more detail.

FIG. 37 is a top plan schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B.

In some embodiments, only the second color filter 230G and the third color filter 230B are disposed in the fourth color pixel area PX(W). Here, the combination of the color filters that are formed in the fourth color pixel area PX(W) may be varied. For example, the first color filter 230R and the second color filter 230G may be disposed therein, or the first color filter 230R and the third color filter 230B may be disposed therein.

The second color filter 230G and the third color filter 230B are separated from each other by a predetermined (or set) distance without overlapping with each other.

The fourth color pixel area PX(W) may be formed in a rectangular shape having two short sides and two long sides. The second color filter 230G and the third color filter 230B may be each formed to extend in a direction that is parallel with the short sides of the fourth color pixel area PX(W).

Next, a liquid crystal display according to one or more embodiments of the present invention will be described with reference to FIG. 38.

Figure 38:
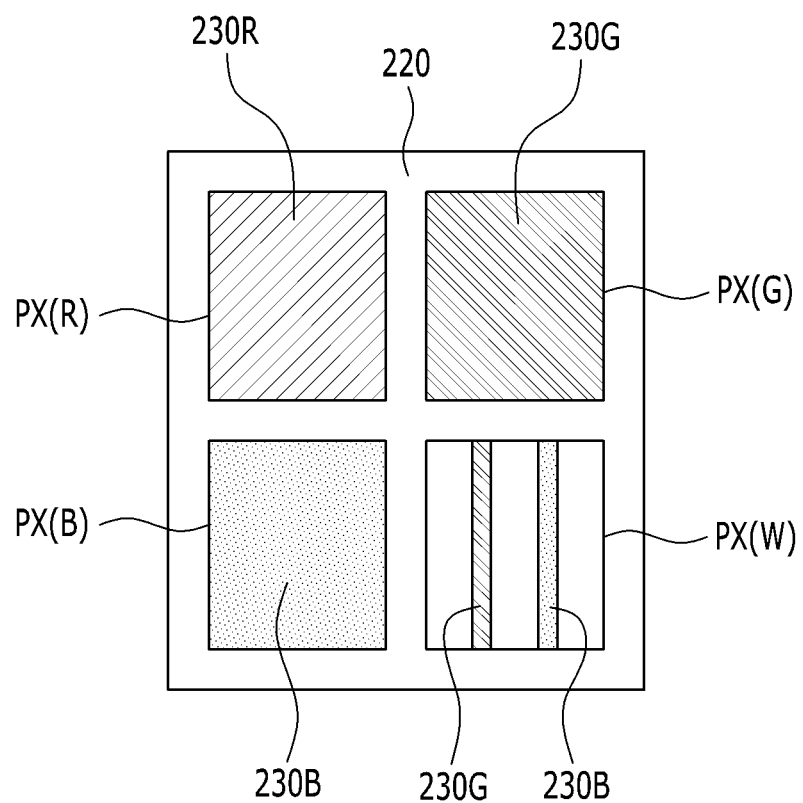
FIG. 38 is a top plan schematic view illustrating a liquid crystal display according to one or more embodiments of the present invention.

Since the liquid crystal display according to the embodiment of the present invention illustrated in FIG. 38 is substantially the same as the liquid crystal display according to the embodiment of the present invention illustrated in FIG. 36, the duplicative description thereof will not be provided. The embodiment illustrated in FIG. 38 is different from the above-described embodiment in that two color filters are disposed in the fourth pixel area, and hereinafter, will be described in more detail.

FIG. 38 is a top plan schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B.

In some embodiments, only the second color filter 230G and the third color filter 230B are disposed in the fourth color pixel area PX(W). Here, the combination of the color filters that are formed in the fourth color pixel area PX(W) may be varied. For example, the first color filter 230R and the second color filter 230G may be disposed therein, or the first color filter 230R and the third color filter 230B may be disposed therein.

The second color filter 230G and the third color filter 230B are separated from each other by a predetermined (or set) distance, without overlapping with each other.

The fourth color pixel area PX(W) may be formed in a rectangular shape having two short sides and two long sides. The second color filter 230G and the third color filter 230B are each formed in a direction that is parallel with the long sides of the fourth color pixel area PX(W).

Next, a liquid crystal display according to one or more embodiments of the present invention will be described with reference to FIG. 39 to FIG. 41.

Figure 39:
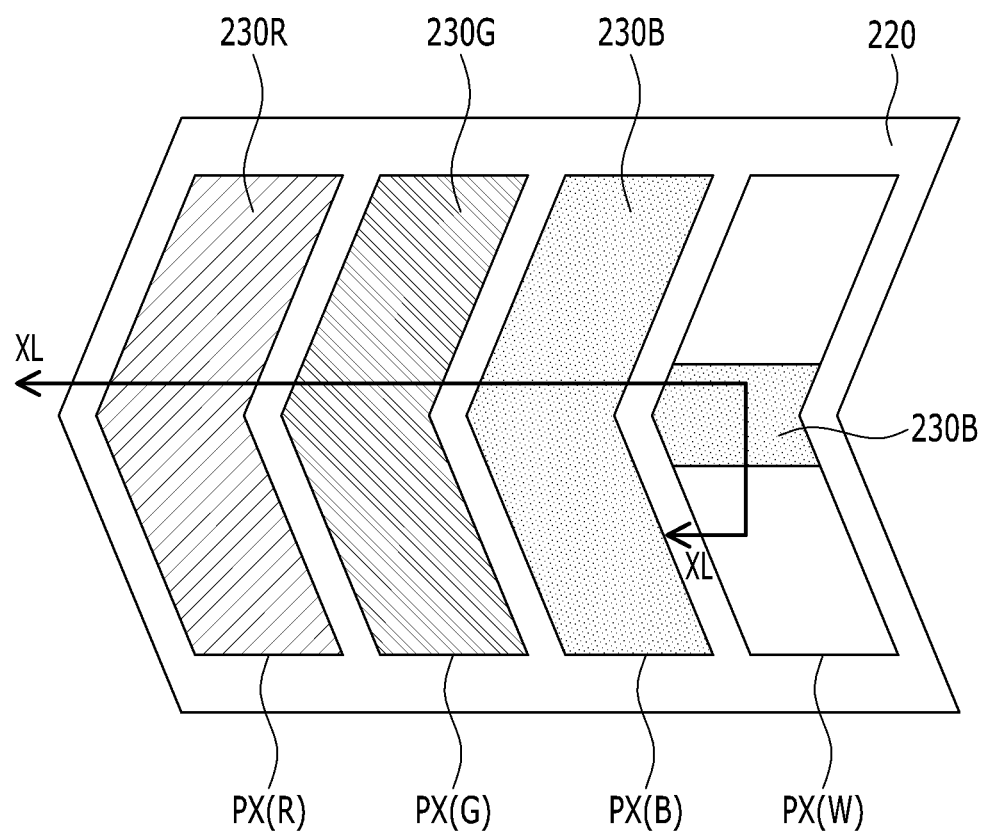
FIG. 39 is a top plan schematic view illustrating a liquid crystal display according to one or more embodiments of the present invention.
Figure 40:
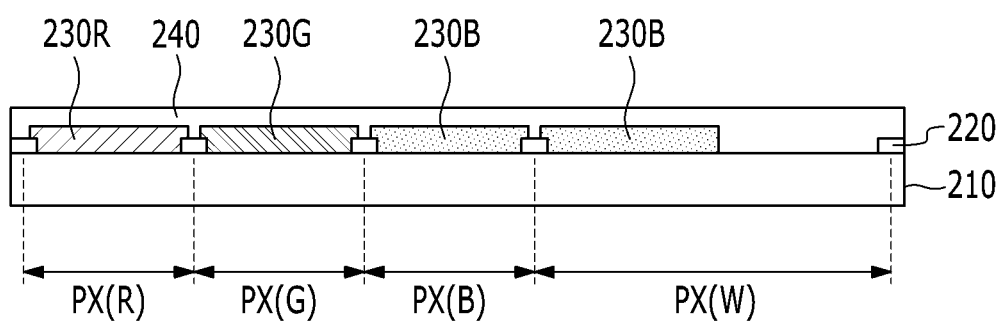
FIG. 40 is a cross-sectional schematic view of the liquid crystal display according to the embodiments of the present invention taken along the line XL-XL of FIG. 39.
Figure 41:
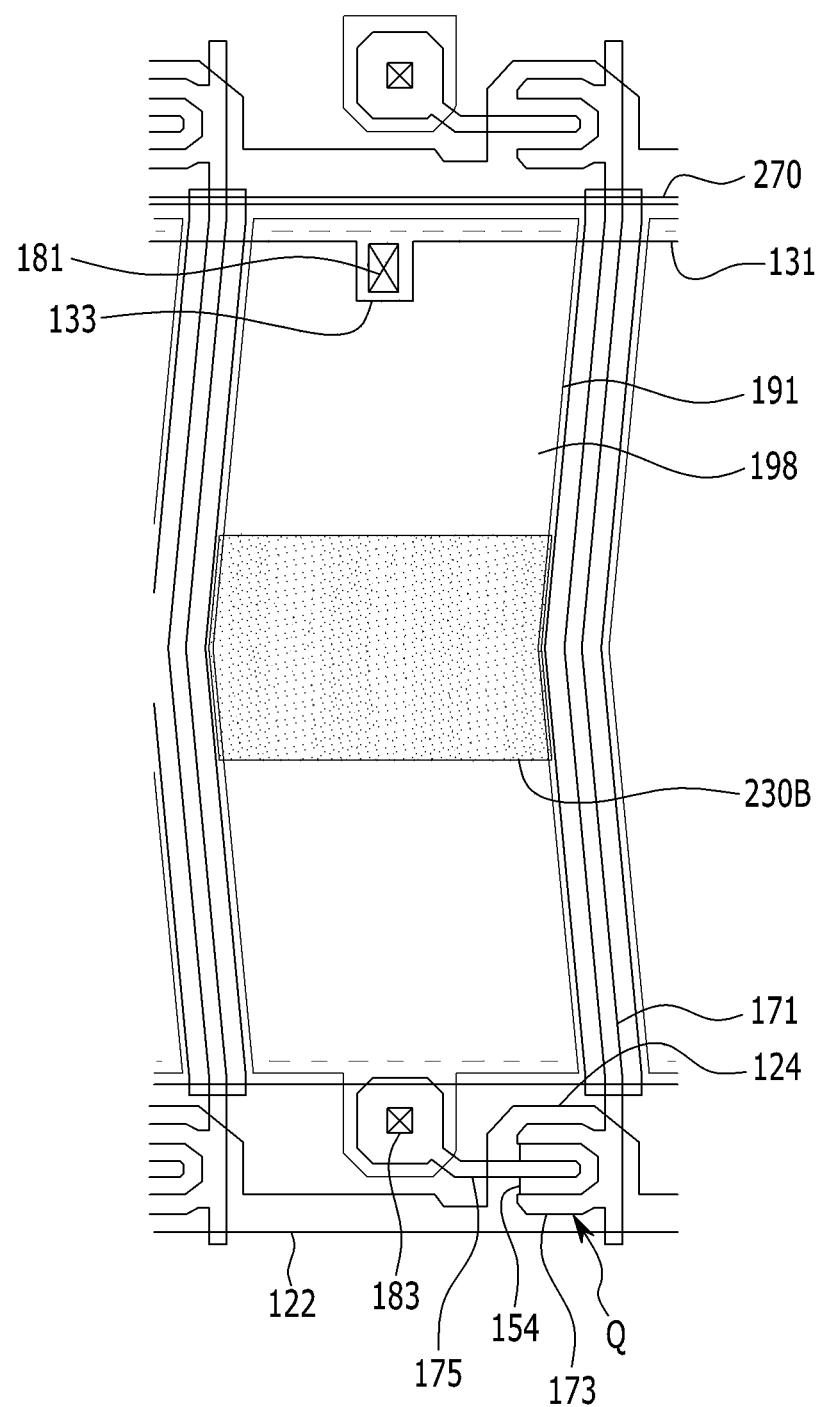
FIG. 41 is a plan schematic view illustrating one pixel of a liquid crystal display according to one or more embodiments of the present invention.

Since the liquid crystal display according to the embodiment of the present invention illustrated in FIG. 39 to FIG. 41 is substantially the same as the liquid crystal display according to the embodiment of the present invention illustrated in FIG. 26 to FIG. 28, the duplicative description thereof will not be provided. The difference between the embodiment illustrated in FIG. 39 to FIG. 41 and the above-described embodiments is the position of the color filters that are formed in the fourth pixel area, that hereinafter, will be described in more detail.

FIG. 39 is a top plan schematic view illustrating a liquid crystal display according to one or more embodiments of the present invention, FIG. 40 is a cross-sectional schematic view of the liquid crystal display according to the embodiments of the present invention taken along the line XL-XL of FIG. 39, and FIG. 41 is a plan schematic view illustrating one pixel of a liquid crystal display according to one or more embodiments of the present invention. FIG. 41 illustrates the fourth color pixel area.

As shown in FIG. 39 and FIG. 40, the first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and the color pattern may include at least one of the first color filter 230R, the second color filter 230G, and the third color filter 230B.

Each of the pixel areas PX(R), PX(G), PX(B), and PX(W) are formed to have a shape obtained by connecting two parallelograms to be symmetrical to each other. The two parallelograms may be positioned next to each other in (along) a vertical direction. Each of the pixel areas PX(R), PX(G), PX(B), and PX(W) may include two domains, and the two domains may correspond to the two parallelograms.

The third color filter 230B may be disposed in the fourth color pixel area PX(W). The third color filter 230B is formed to have a shape obtained by connecting two parallelograms to be symmetrical to each other and is aligned with the shape of the fourth color pixel area PX(W). The third color filter 230B may be disposed in a boundary region between the two parallelograms of the fourth color pixel area PX(W). In other words, the third color filter 230B may be disposed in a boundary region between the two domains of the fourth color pixel area PX(W).

In the fourth color pixel area PX(W) of the present embodiment, none of the color filters 230R, 230G, and 230B are disposed in a region other than the region in which the third color filter 230B is formed. However, embodiments of the present invention are not limited thereto. For example, the white color filter may be disposed in a region other than the region in which the third color filter 230B is disposed in the fourth color pixel area PX(W). In this case, the white color filter may be formed of a transparent photoresist that can permit all the wavelength bands of the visual ray region (or the visible spectrum) to pass therethrough.

When the types and area ratios of the color patterns disposed in the fourth color pixel area PX(W) are varied, it is possible to adjust the position of color coordinates of light passing through the fourth color pixel area PX(W).

Although the third color filter 230B formed in the fourth color pixel area PX(W) has been described, embodiments of the present invention are not limited thereto. For example, two or three of the first color filter 230R, the second color filter 230G, and the third color filter 230B may be formed therein. Further, the positions of the color filters 230R, 230G, and 230B may be varied.

As shown in FIG. 41, a gate line 122 and a gate electrode 124 protruding from the gate line 122 are formed on a substrate. A storage electrode line 131 and a storage electrode 133 protruding from the storage electrode line 131 are formed in a direction that is parallel with the gate line 122. The gate line 122, the storage electrode line 131, and/or the like may be formed on the same substrate as the one including the color filters 230R, 230G, and 230B, or on a substrate opposite to the one including the color filters 230R, 230G, and 230B.

In some embodiments, the gate line 122 mainly extends in (along) a horizontal direction to transmit a gate signal. The storage electrode line 131 also mainly extends in (along) the horizontal direction to transfer a predetermined (or set) voltage, for example, a common voltage.

A gate insulating layer is formed on the gate line 122, the gate electrode 124, the storage electrode line 131, and the storage electrode 133. The gate insulating layer may be formed of an inorganic insulating material, such as a silicon nitride (SiNx) and/or a silicon oxide (SiOx).

A semiconductor 154 is formed on the gate insulating layer. The semiconductor 154 is overlapped with the gate electrode 124.

A data line 171 crossing the gate line 122, a source electrode 173 protruding from the data line 171 toward an upper side of the gate electrode 124, and a drain electrode 175 separated from the source electrode 173 are formed on the semiconductor 154.

The gate electrode 124, the source electrode 173, and the drain electrode 175 constitute one thin film transistor Q, together with the semiconductor 154, and a channel of the thin film transistor Q is formed in a region of the semiconductor disposed between the source electrode 173 and the drain electrode 175.

In some embodiments, the data line 171 is formed to be substantially perpendicular to the gate line 122. The data line 171 is bent once, according to the shape of the fourth color pixel area PX(W). For example, the data line 171 is bent at a region in which the two parallelograms constituting the shape of the fourth color pixel area PX(W) contact each other.

A first passivation layer is formed on the data line 171, the source electrode 173, and the drain electrode 175. A first contact hole 181 is formed in the first passivation layer to expose the storage electrode 133.

A common electrode 270 is formed on the first passivation layer and is connected to the storage electrode 133 through the first contact hole 181. The common electrode 270 may be formed over the entire area of the fourth color pixel area PX(W), in a planar shape, and the common electrodes 270 may also be formed in the adjacent pixel areas PX(R), PX(G), PX(B), and PX(W). In some embodiments, the common electrode 270 is formed of a transparent metal oxide such as indium tin oxide (ITO) and/or indium zinc oxide (IZO), but is not limited thereto.

In some embodiments, a second passivation layer is formed on the common electrode 270. A second contact hole 183 is formed in the first passivation layer and the second passivation layer to expose the drain electrode 175.

The pixel electrode 191 is formed on the second passivation layer and is connected to the drain electrode 175 of the thin film transistor through the second contact hole 183. The pixel electrode 191 is formed to correspond to the shape of the fourth color pixel area PX(W). In other words, the pixel electrode 191 is formed to have a shape obtained by connecting two parallelograms to be symmetrical to each other. In some embodiments, the pixel electrode 191 is formed of a transparent metal oxide such as indium tin oxide (ITO) and/or indium zinc oxide (IZO), but is not limited thereto. The pixel electrode 191 includes a plurality of slits 198.

The fourth color pixel area PX(W) includes two domains, and the two parallelograms constituting the pixel electrode 191 are disposed in different domains. In addition, the slits 198 of the pixel electrodes 191 disposed in different domains extend in different directions. For example, an extending direction of the slits 198 disposed at one of the two domains is different from that of the slits 198 disposed at the other domain. In some embodiments, the extending direction of the slits 198 in each domain is parallel with long sides of the respective domain.

The common electrode 270 and the pixel electrode 191 are formed as different layers, with the second passivation layer interposed between the layers. Here, the common electrode 270 is formed over the entire area of the fourth color pixel area PX(W), and the slits 198 are formed in the pixel electrode 191. Liquid crystal molecules included in the liquid crystal layer of the liquid crystal display are moved by a horizontal electric field that is generated between the common electrode 270 and the pixel electrode 191.

Hitherto, a planar common electrode 270 and the slits 198 formed in the pixel electrode 191 have been described, but embodiments of the present invention are not limited thereto. For example, the slits 198 may be formed in the common electrode 270 as well as in the pixel electrode 191. In this case, the pixel electrode 191 and the common electrode 270 may be formed as the same layer by using (or utilizing) the same material, and may be alternated (e.g., alternately disposed in parallel).

The third color filter 230B may be disposed in the fourth color pixel area PX(W). The third color filter 230B may have a shape including two parallelograms (e.g., first parallelograms) having sides that are parallel with the two parallelograms constituting the shape of the pixel electrode 191 (e.g., second parallelograms). However, the first and the second parallelograms may have different sizes. The third color filter 230B may be disposed at a region where the two second parallelograms constituting the shape of the pixel electrode 191 are connected to each other.

Next, a liquid crystal display according to one or more embodiments of the present invention will be described with reference to FIG. 42.

Figure 42:
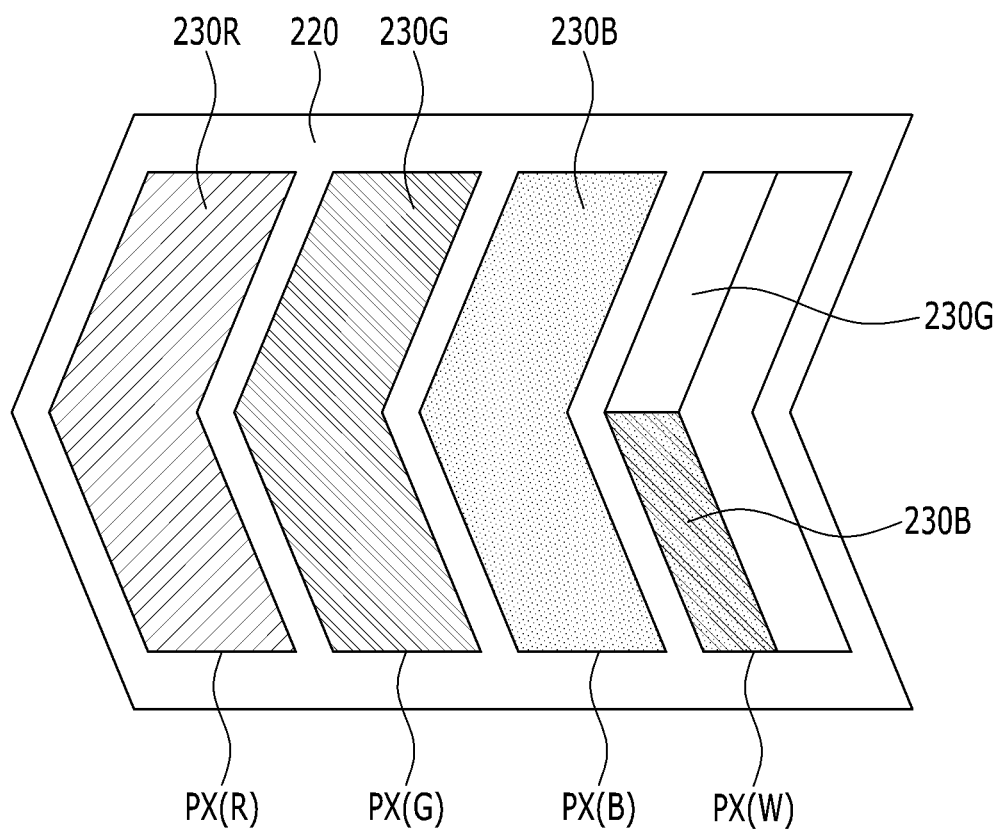
FIG. 42 is a top plan schematic view illustrating a liquid crystal display according to one or more embodiments of the present invention.

Since the liquid crystal display according to the embodiment of the present invention illustrated in FIG. 42 is substantially the same as the liquid crystal display according to the embodiment of the present invention illustrated in FIG. 39 to FIG. 41, the duplicative description thereof will not be provided. The difference between the embodiment illustrated in FIG. 42 and the above-described embodiments is the position of the color filters that are formed in the fourth pixel area, that hereinafter, will be described in more detail.

FIG. 42 is a top plan schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B.

In the embodiment illustrated in FIG. 42, the second color filter 230G and the third color filter 230B are disposed in the fourth color pixel area PX(W). However, the combination of the color filters that are formed in the fourth color pixel area PX(W) may be varied. For example, the first color filter 230R and the second color filter 230G may be formed, or the first color filter 230R and third color filter 230B may be formed. Alternatively, all of the color filters 230R, 230G, and 230B may be disposed in the fourth color pixel area PX(W), or the light-blocking member 220 along with the color filters 230R, 230G, and 230B may be disposed therein.

Each of the pixel areas PX(R), PX(G), PX(B), and PX(W) are formed to have a shape obtained by connecting two parallelograms to be symmetrical to each other. The two parallelograms may be vertically disposed (or aligned). In the fourth color pixel area PX(W), each of the second color filter 230G and the third color filter 230B is formed to have a shape of a parallelogram and to be substantially aligned with the shape of the fourth color pixel area PX(W). For example, the second color filter 230G may be disposed at an upper left side of the fourth color pixel area PX(W), and the third color filter 230B may be disposed at a lower left side of the fourth color pixel area PX(W). Here, the second color filter 230G and the third color filter 230B are not disposed at an upper right side or a lower right side of the fourth color pixel area PX(W). However, embodiments of the present invention are not limited thereto. For example, a white color filter may be disposed at the upper right side and/or the lower right side of the fourth color pixel area PX(W). In this case, the white color filter may be formed of a transparent photoresist that can permit all the wavelength bands of the visual ray region to pass therethrough.

Positions and area ratios of the second color filter 230G and the third color filter 230B may be variously changed, and thus the position of color coordinates of light passing through the fourth color pixel area PX(W) may be adjusted.

Next, a liquid crystal display according to one or more embodiments of the present invention will be described with reference to FIG. 43 and FIG. 44.

Figure 43:
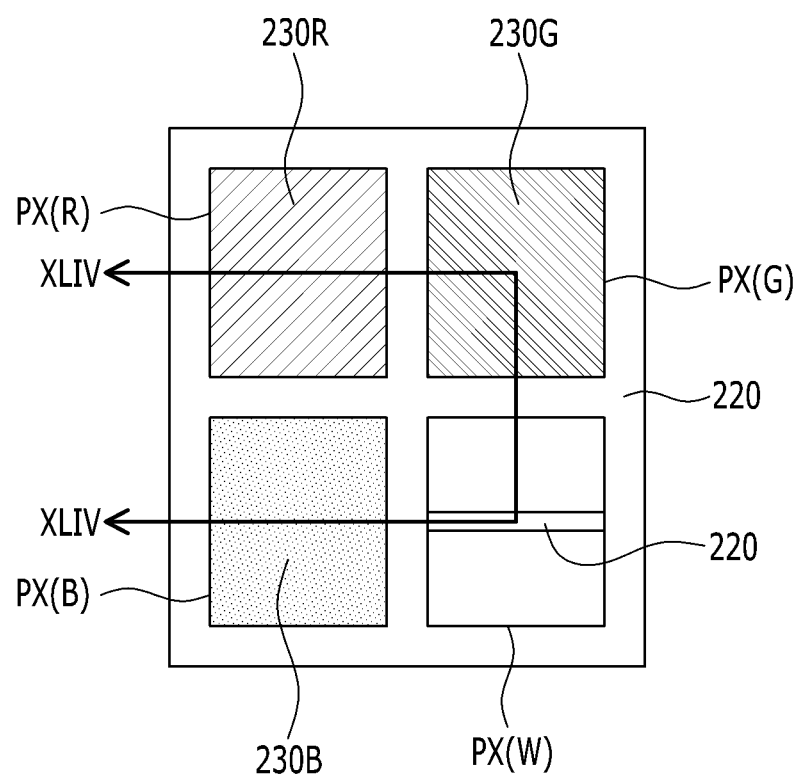
FIG. 43 is a top plan schematic view illustrating a liquid crystal display according to one or more embodiments of the present invention.
Figure 44:
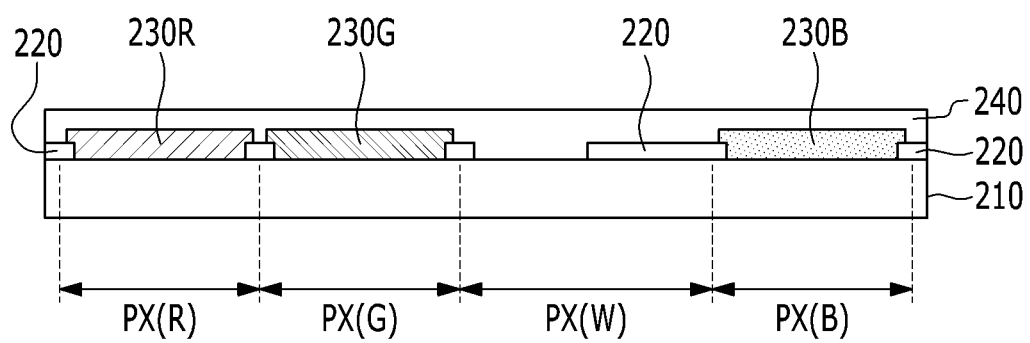
FIG. 44 is a cross-sectional schematic view of the liquid crystal display according to the embodiments of the present invention taken along the line XLIV-XLIV of FIG. 43.

Since the liquid crystal display according to the embodiment of the present invention illustrated in FIG. 43 and FIG. 44 is substantially the same as the liquid crystal display according to the embodiment of the present invention illustrated in FIG. 1 to FIG. 5, the duplicative description thereof will not be provided. The embodiment illustrated in FIG. 43 and FIG. 44 is different from the above-described embodiments in that a light-blocking member is formed in the fourth pixel area instead of the color filters, and hereinafter, will be described in more detail.

FIG. 43 is a top plan schematic view illustrating a liquid crystal display according to one or more embodiments of the present invention, and FIG. 44 is a cross-sectional schematic view of the liquid crystal display according to the embodiments of the present invention taken along the line XLIV-XLIV of FIG. 43.

The first color filter 230R, the second color filter 230G, and the third color filter 230B are respectively disposed in the first color pixel area PX(R), the second color pixel area PX(G), and the third color pixel area PX(B).

A color pattern may be formed in the fourth color pixel area PX(W), and the color pattern may include at least one of the first color filter 230R, the second color filter 230G, and the third color filter 230B.

In the embodiment illustrated in FIG. 43 and FIG. 44, the light-blocking member 220 is formed in the fourth color pixel area PX(W). As illustrated in FIG. 43, the light-blocking member 220 is formed in the fourth color pixel area PX(W), but the color filters 230R, 230G, and 230B are not formed therein. However, embodiments of the present invention are not limited thereto. For example, any of the color filters 230R, 230G, and 230B, as well as the light-blocking member 220, may be formed in the fourth color pixel area PX(W).

In the fourth color pixel area PX(W), the light-blocking member 220 may be formed to have a bar-like shape that extends in one direction.

Each of the pixel areas PX(R), PX(G), PX(B), and PX(W) may be formed in a rectangular shape having two short sides and two long sides. For example, in the fourth color pixel area PX(W), the light-blocking member 220 is disposed in the center between the two short sides of the fourth color pixel area PX(W) and extends in a direction that is parallel with the short sides. However, the shape of the light-blocking member 220 may be changed in various ways without being limited thereto.

The light-blocking member 220 disposed in the fourth color pixel area PX(W) may be used as an auxiliary pattern for performing the planarization with other pixel areas. In a comparative liquid crystal display, the light-blocking member 220 is formed to have a thickness that is smaller than that of each of the color filters 230R, 230G, and 230B. However, in embodiments of the present invention, the light-blocking member 220 is formed to have a thickness that is similar to that of each of the color filters 230R, 230G, and 230B, thus allowing to perform the planarization with other pixel areas. In some embodiments, the thickness of the light-blocking member 220 disposed in the fourth color pixel area PX(W) may be thicker than that of the light-blocking member 220 positioned at or near the boundaries between the pixel areas PX(R), PX(G), and PX(B). In this case, a halftone mask or a slit mask may be employed.

Next, reduction of transmittance facilitated by the color filter and/or the light-blocking member formed in the white pixel area included in the liquid crystal display according to one or more embodiments of the present invention will be described with reference to FIG. 45.

Figure 45:
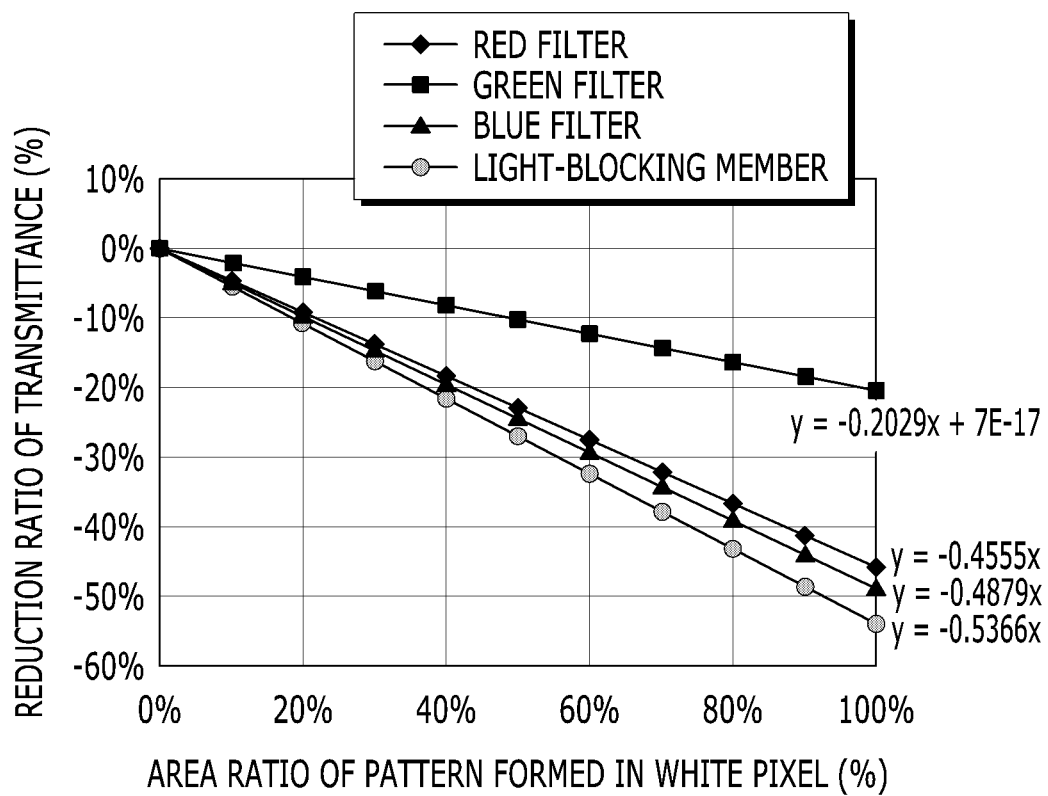
FIG. 45 is a graph illustrating a reduction ratio of transmittance according to an area ratio of a color filter or a light-blocking member that is formed in a white pixel.

FIG. 45 is a graph illustrating a reduction ratio of transmittance according to an area ratio of a color filter or a light-blocking member that is formed in a white pixel.

As illustrated in FIG. 45, the transmittance is gradually reduced as an area of a region at which the color filter or the light-blocking member is formed in the white pixel increases (or becomes wider). This is at least partially because some of light supplied from a light source passes through the portion of the white pixel at which the color filter or the light-blocking member is formed, and thus the transmittance thereof is reduced, as compared with the case when neither the color filter nor the light-blocking member is formed in the white pixel.

When the light-blocking member is included in the white pixel, all wavelength bands of light supplied from the light source are blocked, thereby accomplishing a relatively large reduction of the transmittance.

When the color filter is included in the white pixel, a reduction of the transmittance varies according to the red filter, the green filter, and the blue filter.

Table 1 illustrates an area ratio of each of the red, green, and blue color filters and the light-blocking member in the white pixel, when the transmittance reduction ratio is 10%.

TABLE 1

| Pattern type | Red filter | Green filter | Blue filter | Light-blocking member |
|---|---|---|---|---|
| Area ratio (%) | 22 | 49.3 | 20.5 | 18.6 |

As shown in Table 1, an about 10% reduction in transmittance corresponds to about 20% area ratio of each of the red filter, the blue filter, and the light-blocking member. In the case of the green filter, an about 10% reduction in transmittance corresponds to about 50% area ratio of the green filter in the white pixel. Accordingly, when the green filter is formed, the transmittance reduction is relatively lower.

In some embodiments of the present invention, the green filter may be formed at about 50% or less with respect to the whole area of the white pixel, and the red filter, the blue filter, and the light-blocking member may each be formed at about 20% or less with respect to the whole area of the white pixel.

The change of color coordinates facilitated by the color filter and/or the light-blocking member of a liquid crystal display according to one or more embodiments of the present invention will be described with respect to Table 2 and FIG. 46. The color coordinates used in the liquid crystal display of the present embodiments is the CIE 1931 color coordinates. The CIE 1931 color coordinates were determined by the Commission Internationale de l'Eclairage (CIE) in 1931, employing x-y coordinates.

Figure 46:
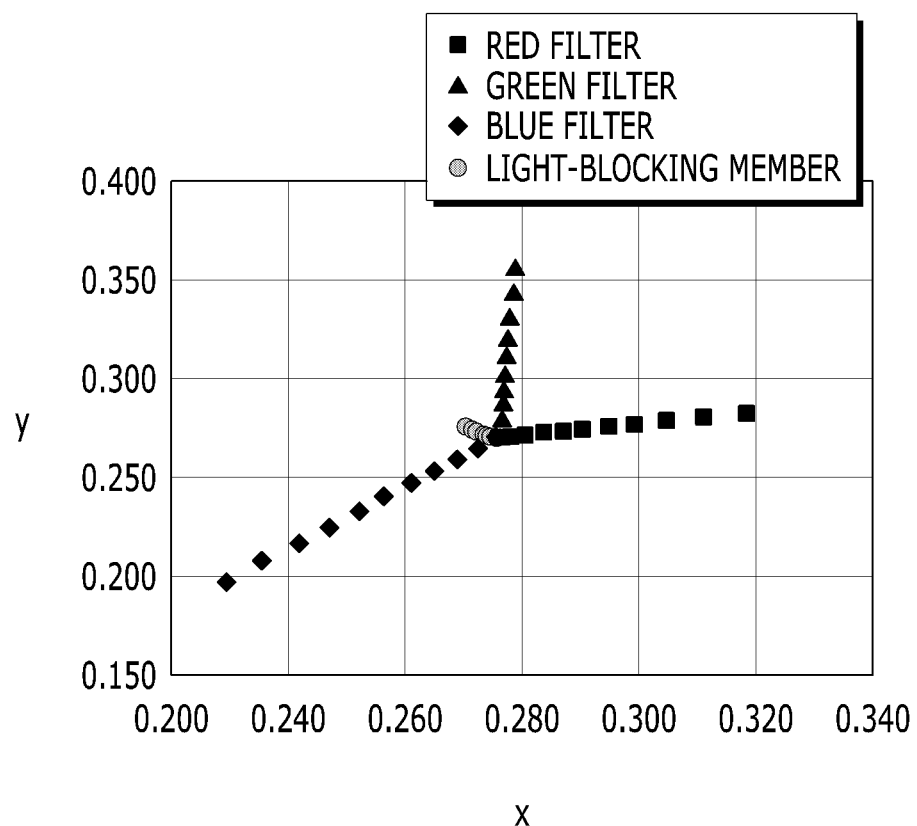
FIG. 46 is a graph illustrating color coordinates according to an area ratio of a color filter or a light-blocking member that is formed in a white pixel.

Table 2 shows color coordinates according to an area ratio of the color filter or the light-blocking member that is formed in the white pixel, and FIG. 46 is a graph illustrating color coordinates according to an area ratio of a color filter or a light-blocking member that is formed in the white pixel.

The basic color coordinates of a light supplied from a light source and passing through the white pixel in which neither the color filter nor the light-blocking member are formed, are represented as (0.276, 0.270). Based on the basic color coordinates (0.276, 0.270), Table 2 shows color coordinates when the red filter, the green filter, the blue filter, or the light-blocking member are included into the white pixel at an area ratio in a range of 10% to 100%.

As illustrated in FIG. 46, when the red filter is disposed in the white pixel, the position of color coordinates (denoted by "■") moves rightwardly. In other words, as the area ratio of the red filter increases, a value of the x-coordinate also increases, with respect to the basic color coordinates (0.276, 0.270). However, the y-coordinate value does not significantly change.

Similarly, when the green filter is disposed in the white pixel, the position of color coordinates (denoted by "▲") moves upwardly. In other words, as the area ratio of the green filter increases, a value of the y-coordinate also increases, with respect to the basic color coordinates (0.276, 0.270). However, the x-coordinate value does not significantly change.

Furthermore, when the blue filter is disposed in the white pixel, the position of color coordinates (denoted by "♦") moves leftwardly and downwardly. In other words, as the area ratio of the blue filter increases, values of the x-coordinate and the y-coordinate decrease, with respect to the basic color coordinates (0.276, 0.270).

Since the light-blocking member blocks all wavelength bands of visible rays, the color coordinates (denoted by "●" in FIG. 46) are not significantly changed. Accordingly, the change of color coordinates according to the light-blocking member is not significant.

Based on the results in Table 2 and FIG. 46, the light-blocking member has no significant effect on the change of color coordinates, and larger areas of the red filter, the green filter, and/or the blue filter lead to larger change of color coordinates. Further, the red filter, the green filter, and the blue filter each facilitate changes in the color coordinates that move in different directions on the graph, with respect to the basic color coordinates (0.276, 0.270).

Next, an area ratio of the color filter disposed in the white pixel area of a liquid crystal display according to one or

TABLE 2

Figure 47:
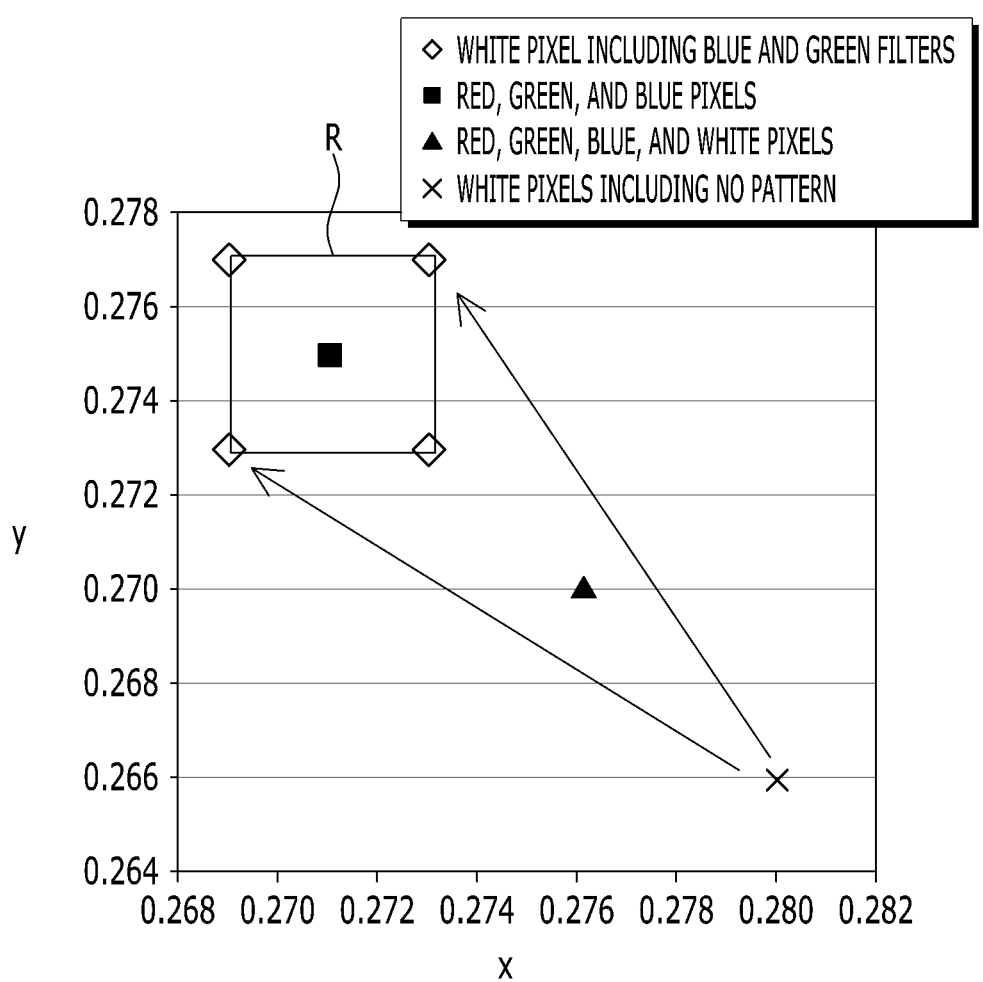
FIG. 47 is a graph illustrating color coordinates of light that passes through white pixels and light in which separate beams first pass through the red pixel, the green pixel, and the blue pixel, and then are combined.

| | Area ratio (%) | | | | | | | | | | |
|---|---|---|---|---|---|---|---|---|---|---|---|
| | 0 | 10 | 20 | 30 | 40 | 50 | 60 | 70 | 80 | 90 | 100 |
| Red filter (x-coordinate) | 0.276 | 0.278 | 0.281 | 0.284 | 0.287 | 0.291 | 0.295 | 0.299 | 0.305 | 0.311 | 0.319 |
| Red filter (y-coordinate) | 0.270 | 0.271 | 0.271 | 0.272 | 0.273 | 0.274 | 0.275 | 0.277 | 0.278 | 0.280 | 0.282 |
| Green filter (x-coordinate) | 0.276 | 0.276 | 0.276 | 0.277 | 0.277 | 0.277 | 0.277 | 0.278 | 0.278 | 0.278 | 0.279 |
| Green filter (y-coordinate) | 0.270 | 0.276 | 0.281 | 0.288 | 0.295 | 0.303 | 0.311 | 0.321 | 0.332 | 0.344 | 0.357 |
| Blue filter (x-coordinate) | 0.276 | 0.273 | 0.269 | 0.265 | 0.261 | 0.257 | 0.252 | 0.247 | 0.242 | 0.236 | 0.230 |
| Blue filter (y-coordinate) | 0.270 | 0.265 | 0.259 | 0.253 | 0.247 | 0.240 | 0.233 | 0.225 | 0.217 | 0.208 | 0.198 |
| Light-blocking member (x-coordinate) | 0.276 | 0.276 | 0.276 | 0.275 | 0.275 | 0.275 | 0.274 | 0.274 | 0.273 | 0.272 | 0.271 |
| Light-blocking member (y-coordinate) | 0.270 | 0.270 | 0.270 | 0.271 | 0.271 | 0.271 | 0.272 | 0.272 | 0.273 | 0.274 | 0.275 | more embodiments of the present invention will be described with reference to FIG. 47.

FIG. 47 is a graph illustrating color coordinates of light that passes through white pixels and light of which separate beams first pass through the red pixel, the green pixel, and the blue pixel and are then combined.

From the wavelength bands of light supplied from a light source, a red wavelength band of light, a green wavelength band of light, and a blue wavelength band of light respectively pass through the red pixel, the green pixel, and the blue pixel. These red wavelength, green wavelength, and blue wavelength bands of light are then combined into white light, which is indicated as color coordinates "■" of (0.271, 0.275).

When no color filter is formed in the white pixel, most of the visible ray wavelength band of light among the light supplied from the light source pass through the white pixel. The light passing through the white pixel may be represented as color coordinates "X" of (0.280, 0.266).

As a result, the color coordinates of the light passing through the white pixel (hereinafter "first light") are different from those of the light of which separate beams first pass through the red pixel, the green pixel, and the blue pixel and are then combined (hereinafter "second light"). Accordingly, a color shift may be generated (the color shift is denoted on the graph by the color coordinates "▲" at (0.276, 0.270)).

According to one or more embodiments of the present invention, in the liquid crystal display, at least one of the red filter, the green filter, and the blue filter is formed in the white pixel to prevent or reduce the possibility of the color shift being generated.

In order to move the color coordinates of the first light to be similar to those of the second light (e.g., in a direction in which the x-axis values are reduced and the y-axis values are increased, as shown by the arrows on the graph of FIG. 47), the green filter or the blue filter may be formed in the white pixel.

Table 3 shows color coordinates (denoted by "◊" in FIG. 47) of the white pixel according to an area of the blue filter and the green filter disposed in the white pixel.

TABLE 3

| Blue filter area ratio (%) | 13.7 | 16.9 | 16.9 | 12.2 | 12.2 |
| Green filter area ratio (%) | 20.5 | 22.7 | 25.3 | 17.7 | 24.1 |
| Blue filter, green filter (x-coordinate) | 0.271 | 0.269 | 0.269 | 0.273 | 0.273 |
| Blue filter, green filter (y-coordinate) | 0.275 | 0.273 | 0.277 | 0.273 | 0.277 |

As shown in Table 3, when desired color coordinates of the white pixel are (0.271, 0.275), the respective area rations of the blue filter and the green filter in the white pixel are 13.7% and 20.5%. In other words, when the blue filter and the green filter are respectively formed in the white pixel at areas of 13.7% and 20.5%, the color coordinates of the first light passing through the white pixel become the same as those of the second light of which separate beams first pass through the red pixel, the green pixel, and the blue pixel and are then combined.

The desired color coordinates of the white pixel may be set as (0.271, 0.275) in a range of ±0.002. In this case, the desired range becomes a range R which surrounds color coordinates of (0.271, 0.275). When the blue filter and the green filter are respectively formed in the white pixel at areas of 16.9% and 22.7%, the color coordinates of the first light passing through the white pixel become (0.269, 0.273). When the blue filter and the green filter are respectively formed in the white pixel at areas of 16.9% and 25.3%, the color coordinates of the first light passing through the white pixel become (0.269, 0.277). When the blue filter and the green filter are respectively formed in the white pixel at areas of 12.2% and 17.7%, the color coordinates of the first light passing through the white pixel become (0.273, 0.273). When the blue filter and the green filter are respectively formed in the white pixel at areas of 12.2% and 24.1%, the color coordinates of the first light passing through the white pixel become (0.273, 0.277).

As a result, when the desired color coordinates of the white pixel are set as (0.271, 0.275) in a range of ±0.002, the blue filter in the white pixel may be formed in an area range of about 12% to 17%, and the green filter may be formed in an area range of about 17% to 26%.

Further, when the desired color coordinates of the white pixel are more widely set, the area ranges of the blue filter and the green filter formed in the white pixel may be respectively widened.

Hereinafter, a relationship between shape and flatness of the color filter or the light-blocking member disposed in the white pixel area will be described with reference to FIG. 48 and FIG. 49.

Figure 48:
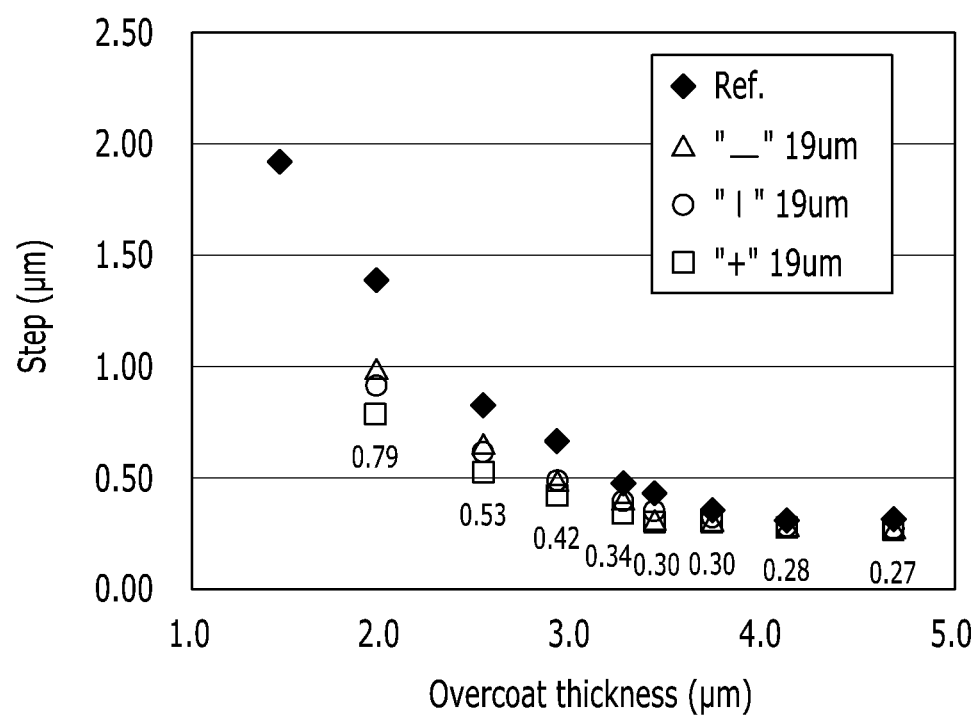
FIG. 48 and FIG. 49 are graphs illustrating step sizes according to the thickness of an overcoat for each shape of various color filters in a white pixel area.
Figure 49:
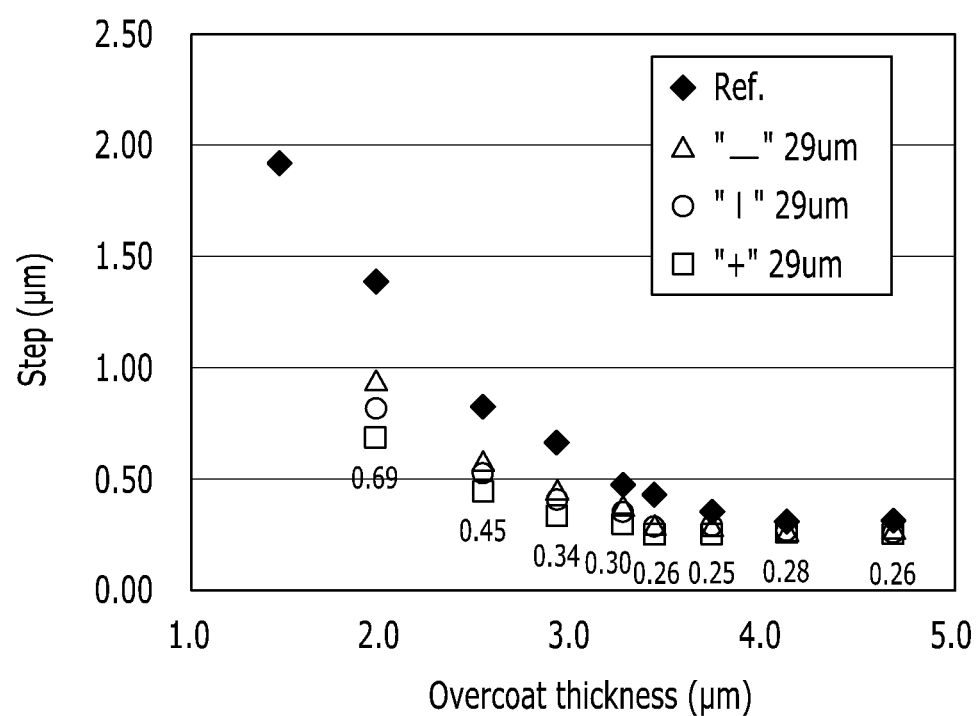

FIG. 48 and FIG. 49 are graphs illustrating step sizes according to the thickness of an overcoat for each shape of color filters disposed in a white pixel area. FIG. 48 and FIG. 49 illustrate experimental results of a structure in which the blue filter is disposed in the white pixel area. The blue filter may be disposed in the white pixel area to have a horizontal bar (–) shape, a vertical bar (|) shape, or a cross (+) shape. When the blue filter is formed to have the horizontal bar (–) shape, the color filter is disposed in parallel with a short side of the white pixel area. When the blue filter is formed to have the vertical bar (|) shape, the color filter is disposed in parallel with a long side of the white pixel area. The reference (Ref.) as the comparative example in which no color filter is disposed in the white pixel area.

In FIG. 48, a width of the color filter disposed in the white pixel area is about 19 μm, and in FIG. 49, a width of the color filter disposed in the white pixel area is about 29 μm.

As illustrated in FIG. 48, the step is reduced when the blue filter disposed in the white pixel area has a horizontal bar (–) shape, a vertical bar (|) shape, or a cross (+) shape, as compared with the reference example in which no blue filter is disposed in the white pixel area. In other words, the step is reduced by disposing the blue color in the white pixel area, thereby increasing the flatness of the pixel area. This effect further increases as the thickness of the overcoat is reduced. In contrast, when the thickness of the overcoat is increased, the above-described effect diminishes and the flatness difference according to whether the blue filter is disposed or not is reduced.

The relationship between shape and flatness of the color filter or the light-blocking member disposed in the white pixel area will be described. In some embodiments, reduced step and increased flatness are better accomplished when the color filter is formed to have the vertical bar (|) shape than when the color filter is formed to have the horizontal bar (–) shape. Since the short side of the white pixel area is arranged in the horizontal direction and the long side of the white pixel area is arranged in the vertical direction, the color filter having the vertical bar shape is longer than the color filter having the horizontal bar (–) shape. Accordingly, the color filter having the vertical bar shape occupies a larger white pixel area, thus better reducing the step (the separation along the thickness direction) and increasing the flatness. Similarly, the color filter having the cross (+) shape reduces the step (the separation along the thickness direction) and increases the flatness to a greater extent than the color filter having the vertical bar shape.

As illustrated in FIG. 49, the step (the separation along the thickness direction) is reduced when the blue filter disposed in the white pixel area has a horizontal bar (–) shape, a vertical bar (|) shape, or a cross (+) shape, as compared with the reference example in which no blue filter is disposed in the white pixel area. Accordingly, results in FIG. 49 (with respect to the color filter in the white pixel area having a width of about 29 μm) show the same tendency as those in FIG. 48 (with respect to the color filter in the white pixel area having a width of about 19 μm).

Furthermore, in FIG. 49, reduced step (the separation along the thickness direction) and increased flatness are accomplished to a greater extent when the color filter is formed to have the vertical bar shape as compared with the case when the color filter is formed to have the horizontal bar shape. In addition, reduced step (a separation along the thickness direction) and increased flatness are accomplished to a greater extent when the color filter is formed to have the cross shape as compared with the case when the color filter is formed to have the vertical bar shape. These results also show the same tendency as those of FIG. 48.

In some embodiments, the flatness is increased by disposing the blue filter in the white pixel area. Although FIG. 48 and FIG. 49 illustrate the cases where the blue filter is disposed, the flatness can also be increased when the red filter, the green filter, or the light-blocking member is disposed in the white pixel area.

Further, as shown in FIG. 48 and FIG. 49, the flatness is increased in the following order of the shapes of the blue filter disposed in the white pixel area: horizontal bar (–) shape, vertical bar (|) shape, and cross (+) shape. In other words, the flatness is increased as the area occupied by the color filter or light-blocking member that is disposed in the white pixel area is increased.

Moreover, when the results of FIG. 48 and FIG. 49 are compared, reduced step (separation along the thickness direction) and increased flatness are accomplished to a lesser extent when the color filter disposed in the white pixel area has the width of about 19 μm as compared with the case of the width of about 29 μm. Accordingly, as the width of the color filter or the light-blocking member that is disposed in the white pixel area is increased, the flatness is also increased.

Hereinafter, the relationship between shape and flatness of the color filter or the light-blocking member disposed in the white pixel area will be described with reference to Table 4 and Table 5.

Table 4 illustrates the size of the step (separation along the thickness direction) according to the thickness of the overcoat for each width of the light-blocking member disposed in the white pixel area, and Table 5 illustrates the size of the step (separation along the thickness direction) according to the thickness of the overcoat for each width of the color filter disposed in the white pixel area.

TABLE 4

| Overcoat thickness (μm) | Reference (Ref.) | Step (μm) Light-blocking member (Thickness) | | | | | |
|---|---|---|---|---|---|---|---|
| | | 5 μm | 8 μm | 11 μm | 14 μm | 17 μm | 20 μm |
| 1.5 | 1.92 | 1.81 | 1.75 | 1.70 | 1.67 | 1.63 | 1.57 |
| 2.0 | 1.39 | 1.32 | 1.24 | 1.18 | 1.20 | 1.15 | 1.12 |
| 2.5 | 0.83 | 0.84 | 0.77 | 0.73 | 0.72 | 0.70 | 0.73 |
| 2.9 | 0.67 | 0.57 | 0.55 | 0.57 | 0.56 | 0.49 | 0.50 |
| 3.3 | 0.48 | 0.47 | 0.47 | 0.42 | 0.41 | 0.42 | 0.42 |
| 3.4 | 0.44 | 0.39 | 0.37 | 0.39 | 0.33 | 0.36 | 0.33 |
| 3.7 | 0.36 | 0.36 | 0.30 | 0.31 | 0.30 | 0.29 | 0.28 |

TABLE 4-continued

| Overcoat thickness (μm) | Reference (Ref.) | Step (μm) Light-blocking member (Thickness) | | | | | |
|---|---|---|---|---|---|---|---|
| | | 5 μm | 8 μm | 11 μm | 14 μm | 17 μm | 20 μm |
| 4.1 | 0.31 | 0.30 | 0.26 | 0.28 | 0.29 | 0.26 | 0.26 |
| 4.7 | 0.32 | 0.28 | 0.27 | 0.26 | 0.24 | 0.29 | 0.24 |

As illustrated by the results in Table 4, the step (separation along the thickness direction) is reduced as the width of the light-blocking member disposed in the white pixel area is increased. When the width of the light-blocking member is constant, the step is reduced as the thickness of the overcoat is increased.

When the thickness of the overcoat exceeds a predetermined (or set) level, reduction in the size of the step (separation along the thickness direction) significantly decreases and the step (separation along the thickness direction) remains substantially uniform. For example, when the width of the light-blocking member is about 5 μm, and the thickness of the overcoat is equal to or greater than about 4.1 μm, the range by which the step (separation along the thickness direction) can be reduced is significantly decreased. Similarly, when the width of the light-blocking member is about 8 μm, and about 11 μm, and the thickness of the overcoat is equal to or greater than about 3.7 μm, the range by which the step can be reduced is significantly decreased.

In addition, when the width of the light-blocking member is about 14 μm, about 17 μm, and about 20 μm, and the thickness of the overcoat is equal to or greater than about 3.4 μm, the range by which the step (separation along the thickness direction) can be reduced is significantly decreased. Accordingly, as the width of the light-blocking member is increased, the predetermined (or set) level of the thickness of the overcoat at which the reduction in the size of the step (separation along the thickness direction) significantly decreases is reduced.

In one or more embodiments of the present invention, as the width of the light-blocking member is increased, the flatness is also increased, thereby accomplishing the thin and flat formation of the overcoat.

TABLE 5

| Overcoat thickness (μm) | Reference (Ref.) | Step (μm) Blue filter Width - 19 μm | Blue filter Width - 29 μm |
|---|---|---|---|
| 1.5 | 1.92 | — | — |
| 2.0 | 1.39 | 0.79 | 0.69 |
| 2.5 | 0.83 | 0.53 | 0.45 |
| 2.9 | 0.67 | 0.42 | 0.34 |
| 3.3 | 0.48 | 0.34 | 0.30 |
| 3.4 | 0.44 | 0.30 | 0.26 |
| 3.7 | 0.36 | 0.30 | 0.25 |
| 4.1 | 0.31 | 0.28 | 0.26 |
| 4.7 | 0.32 | 0.27 | 0.26 |

As illustrated by the results in Table 5, the step (separation along the thickness direction) is reduced as the width of the blue filter disposed in the white pixel area is increased.

Furthermore, when the width of the blue filter is constant, the step (separation along the thickness direction) is reduced as the thickness of the overcoat is increased.

Table 5 illustrates the case when the color filter is disposed in the white pixel area. However, similarly, when the red filter or the green filter is disposed in the white pixel area, as the thickness of the overcoat is increased, the step is reduced.

When the thickness of the overcoat exceeds a predetermined (or set) level, reduction in the size of the step (separation along the thickness direction) significantly decreases and the step remains substantially uniform. For example, when the width of the blue filter is about 19 μm, and the thickness of the overcoat is equal to or greater than about 3.3 μm, the range by which the step is reduced is significantly decreased. When the width of the blue filter is about 29 μm, and the thickness of the overcoat is equal to or greater than about 2.9 μm, the range by which the step is reduced is significantly decreased. Accordingly, as the width of the blue filter is increased, the predetermined (or set) level of the thickness of the overcoat at which the reduction in the size of the step (separation along the thickness direction) significantly decreases is reduced. As a result, as the width of the blue filter is increased, the flatness is also increased, thereby accomplishing the thin and flat formation of the overcoat.

As shown in Table 4 and Table 5, as the width of the color filter or the light-blocking member disposed in the white pixel area is increased, reduced step (separation along the thickness direction) and increased flatness can be accomplished. Further, increased flatness can be accomplished by increasing the width of the color filter or the light-blocking member disposed in the white pixel area even when the thickness of the overcoat is reduced.

Hereinafter, exemplary ranges of the thickness of the overcoat and the width of the light-blocking member that is disposed in the white pixel area will be described with reference to Table 6.

Table 6 illustrates a reduction ratio of transmittance and step according to the shape of the light-blocking member disposed in the white pixel area. The light-blocking member may be disposed in the white pixel area to have a horizontal bar (−) shape, a vertical bar (|) shape, or a cross (+) shape. When the light-blocking member is formed to have the vertical bar (|) shape, the light-blocking member is disposed in parallel with a long side of the white pixel area. When the light-blocking member is formed to have the horizontal bar (−) shape, the light-blocking member is disposed in parallel with a short side of the white pixel area.

Table 6 shows experimental results of the case when the width of the light-blocking member disposed in the white pixel area is about 8 μm and the thickness of the overcoat is about 4.1 μm.

TABLE 6

| Shape of light-blocking member | Reduction ratio of transmittance | Step (when thickness of overcoat is about 4.1 μm) |
| --- | --- | --- |
| + | −4.0% | 0.26 μm |
| | | −2.6% | 0.27 μm |
| — | −1.4% | 0.32 μm |

By referring to Table 6, reduced step (separation along the thickness direction) and increased flatness are accomplished to a greater extent when the light-blocking member in the white pixel area is formed to have the vertical bar (|) shape as compared with the case when the light-blocking member is formed to have the horizontal bar (−) shape. This is at least partially because the light-blocking member having the vertical bar (|) shape extends along the longer side of the white pixel area, and thus, the area occupied by the light-blocking member having the vertical bar (|) shape is larger than the area occupied by the light-blocking member having the horizontal bar (−) shape and extending along the shorter side of the white pixel area. Accordingly, the light-blocking member having the vertical bar (|) shape can facilitate increased flatness. However, the transmittance is reduced as the area of the light-blocking member is increased, because the wider light-blocking member blocks out more light.

Similarly, the light-blocking member disposed in the white pixel area and having the cross (+) shape reduces the step (separation along the thickness direction) and increases the flatness to a greater extent than the light-blocking member disposed in the white pixel area and having the vertical bar (|) shape. However, the transmittance is also reduced.

Since the light-blocking member is formed to have a wide width so as to block all wavelengths of light, the reduction ratio of the transmittance is also increased. In one or more embodiments of the present invention, the light-blocking member can be formed to have a narrow width in order to minimize the transmittance reduction, (e.g., the width may be formed to be equal to or less than about 11 μm). However, when the width of the light-blocking member is too narrow, it may be difficult to achieve the desired flatness. Accordingly, in one or more embodiments of the present invention, the light-blocking member may be formed to have a width of about 5 μm.

Referring to the aforementioned Table 4 again, when the width of the light-blocking member is in a range of about 5 μm to 11 μm, the overcoat may be formed to have a thickness that is in a range of about 3.4 μm to about 4.7 μm, such that the step is smaller than about 0.4 μm and planarization can be performed. When the thickness of the overcoat is smaller than 3.4 μm, the step between the white pixel area and another pixel area that is adjacent thereto becomes larger, thereby making it difficult to accomplish good planarization. When the thickness of the overcoat exceeds about 4.7 μm, the step (separation along the thickness direction) reduction is limited.

In some embodiments, the appropriate width of the light-blocking member and the thickness of the overcoat can be selected in consideration of transmittance reduction and planarization. For example, the width of the light-blocking member disposed in the white pixel area and the thickness of the overcoat may be selected to be about 8 μm and about 4.1 μm, respectively. Moreover, as illustrated in Table 4, the size of the step when the thickness of the overcoat and the width of the light-blocking member are respectively about 4.1 μm and about 8 μm is similar to the size of the step when the thickness of the overcoat and the width of the light-blocking member are respectively about 4.1 μm and about 20 μm. Accordingly, the width of the light-blocking member may be selected to be about 8 μm, in order to minimize the transmittance reduction, while accomplishing a similar planarization level.

Hereinafter, exemplary ranges of the width of the color filter that is disposed in the white pixel area and the thickness of the overcoat will be described with reference to Table 7 and Table 8.

Table 7 illustrates a reduction ratio of transmittance and step size according to the shape of the blue filter disposed in the white pixel area, and Table 8 illustrates a reduction ratio of transmittance and step size according to the shape of the green filter disposed in the white pixel area.

In Table 7 and Table 8, the color filter may be disposed in the white pixel area to have a horizontal bar (−) shape, a vertical bar (|) shape, or a cross (–) shape. When the color filter is formed to have the vertical bar (|) shape, the color filter is disposed in parallel with a long side of the white pixel area. When the color filter is formed to have the horizontal bar (–) shape, the color filter is disposed in parallel with a short side of the white pixel area.

Table 7 and Table 8 show experimental results of the case when the width of the respective color filter disposed in the white pixel area is about 29 μm and the thickness of the overcoat is about 3.4 μm

TABLE 7

| Shape of blue filter | Reduction ratio of transmittance | Step (when thickness of overcoat is about 3.4 μm) |
|---|---|---|
| + | –23.5% | 0.26 μm |
| \| | –16.5% | 0.29 μm |
| — | –9.4% | 0.30 μm |

TABLE 8

| Shape of green filter | Reduction ratio of transmittance | Step (when thickness of overcoat is about 3.4 μm) |
|---|---|---|
| + | –9.8% | 0.26 μm |
| \| | –6.8% | 0.29 μm |
| — | –3.9% | 0.30 μm |

Referring to Table 7 and Table 8, greater reduction in step (separation along the thickness direction) size and increased flatness are accomplished when the blue or green filter disposed in the white pixel area is formed to have the vertical bar (|) shape than when the blue or green filter is formed to have the horizontal bar (–) shape. This is at least partially because the long side of the white pixel area is arranged in the vertical direction, and thus, the area occupied by the blue or green filter in the white pixel area is larger when the blue or green filter is formed to have the vertical bar (|) shape than when the blue or green filter is formed to have the horizontal bar (–) shape that extends along the short side of the white pixel area. Accordingly, when the blue or green filter is formed to have the vertical bar (|) shape, the flatness can be increased. However, the transmittance is reduced as the area of the light-blocking member is widened, because the blue or green filter partially blocks the light.

Similarly, as compared with the case when the blue or green filter disposed in the white pixel area has the vertical bar (|) shape, the blue or green filter disposed in the white pixel area and having the cross (+) shape facilitates the reduction in the step size and increased flatness to a greater extent, but also reduces the transmittance.

Although an experimental example in which the red filter is disposed in the white pixel area is not described herein, it is likely to show a similar tendency.

Since the blue or green filter only blocks a specific wavelength band of light, the reduction ratio of transmittance by the blue or green filter is relatively smaller, as compared with the light-blocking member.

However, it may be difficult to form the color filter to have a width that is as narrow as that of the light-blocking member during the manufacturing process. Accordingly, in one or more embodiments of the present invention, the color filter may be formed in the white pixel area to have a width that is in a range of about 19 μm to about 29 μm, in consideration of the efficiency of the manufacturing process and the satisfactory reduction ratio of transmittance.

By referring to the aforementioned Table 5 again, when the width of the color filter is in a range of about 19 μm to 29 μm, the overcoat may be formed to have a thickness that is in a range of about 2.9 μm to about 4.7 μm, to perform planarization such that the step is smaller than about 0.4 μm. When the thickness of the overcoat is smaller than 2.9 μm, the step between the white pixel area and another pixel area that is adjacent thereto is large, thereby making it difficult to accomplish good planarization. When the thickness of the overcoat exceeds about 4.7 μm, the step reduction is limited.

In some embodiments, the appropriate width of the light-blocking member and the thickness of the overcoat can be selected in consideration of transmittance reduction and planarization. For example, the width of the color filter disposed in the white pixel area may be selected to be 29 μm, and the thickness of the overcoat may be selected to be in a range of about 3.3 μm to about 3.4 μm. Specifically, when the thickness of the overcoat exceeds about 3.4 μm, the step is not significantly reduced. Accordingly, to facilitate further reduction in step size, the thickness of the overcoat may be selected to be in a range of about 3.3 μm to about 3.4 μm, and the width of the color filter may be selected to be 29 μm.

By comparing the results in Table 7 and Table 8, it can be seen that the reduction in transmittance is relatively smaller when the green filter is disposed in the white pixel area than when the blue filter is disposed therein. This is at least partially because the green filter can enable more light to pass therethrough than the blue filter. Accordingly, to achieve a lower transmittance reduction, the green filter may be disposed in the white pixel area. However, to ameliorate a yellowish phenomenon (e.g., to reduce the yellowish appearance of the images displayed by the liquid crystal display), the blue filter may be disposed in the white pixel area.

A liquid crystal display according to one or more embodiments of the present invention will now be described with reference to FIG. 50 and FIG. 51.

Figure 50:
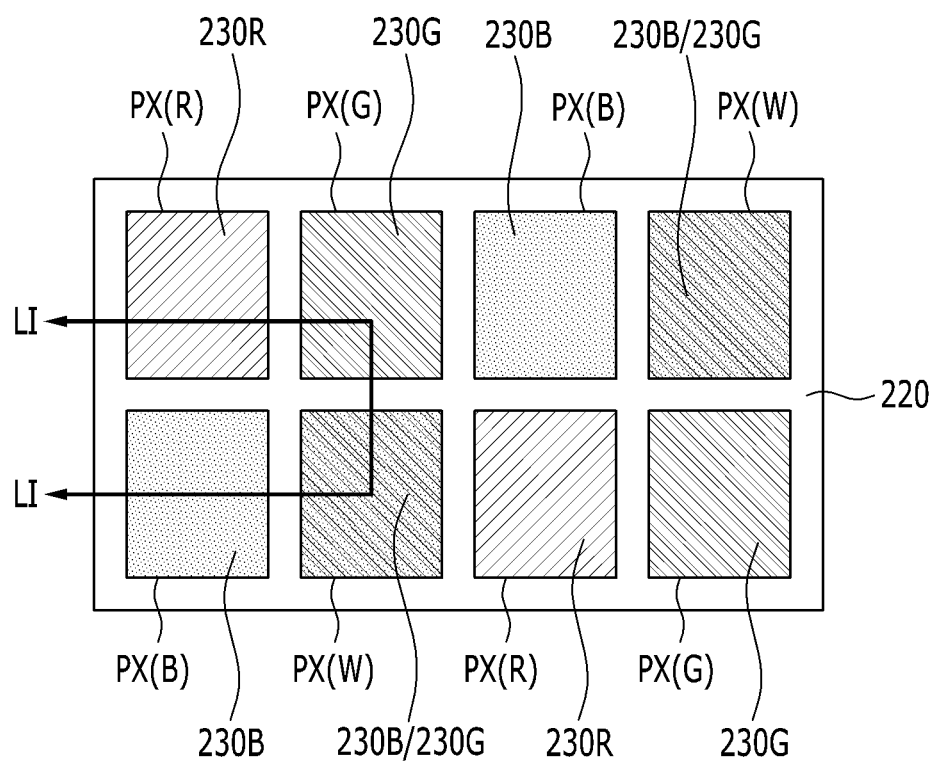
FIG. 50 is a top plan view illustrating a liquid crystal display according to one or more embodiments of the present invention.
Figure 51:
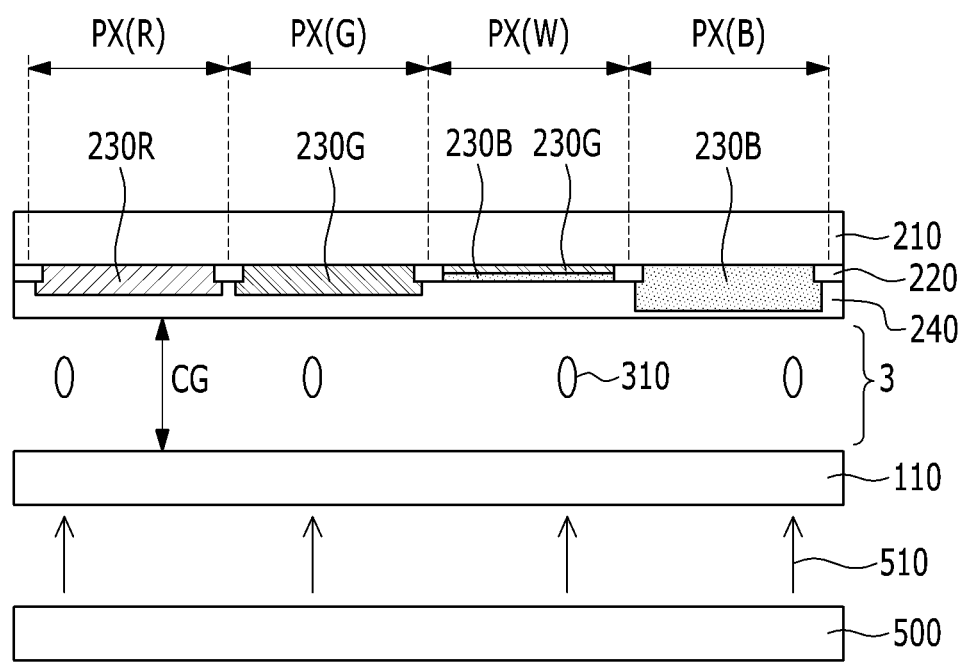
FIG. 51 is a cross-sectional schematic view of the liquid crystal display according to the embodiments of the present invention taken along the line LI-LI of FIG. 50.

FIG. 50 is a top plan schematic view illustrating a liquid crystal display according to one or more embodiments of the present invention, and FIG. 51 is a cross-sectional schematic view of the liquid crystal display according to the embodiments of the present invention taken along the line LI-LI of FIG. 50.

The liquid crystal display according to the present embodiments includes a first substrate 110 and a second substrate 210 facing the first substrate 110, and a liquid crystal layer 3 between the first substrate 110 and the second substrate 210.

The first substrate 110 and the second substrate 210 may be each independently formed of glass, plastic, and/or the like. The liquid crystal layer 3 may include a plurality of liquid crystal molecules 310, and may be formed as a positive type or a negative type.

A light source 500 may be disposed on a rear (or bottom) surface of the first substrate 110. The light source 500 may include a light emitting diode (LED) to supply a light 510. An orientation of the liquid crystal molecules 310 in the liquid crystal layer 3 is determined according to an electric filed generated between the first substrate 110 and the second substrate 210, and an amount of light that passes through the liquid crystal layer 3 is varied according to the orientation of the liquid crystal molecules 310. A plurality of color filters 230R, 230G, and 230B are disposed on the second substrate 210. When the light passing through the liquid crystal layer 3 passes through the color filters 230R, 230G, and 230B, some light passes therethrough and the rest of the light is absorbed therein.

The liquid crystal display may include a plurality of pixel areas, for example, a first color pixel area PX(R), a second color pixel area PX(G), a third color pixel area PX(B), and a fourth color pixel area PX(W). The first color pixel area PX(R), the second color pixel area PX(G), and the third color pixel area PX(B) respectively serve to display different colors, and their colors may be combined into a white color. The fourth color pixel area PX(W) may display a white color. For example, the first color pixel area PX(R), the second color pixel area PX(G), the third color pixel area PX(B), and the fourth color pixel area PX(W) may respectively display red, green, blue, and white colors.

However, embodiments of the present invention are not limited thereto. For example, the first color pixel area PX(R), the second color pixel area PX(G), the third color pixel area PX(B), and the fourth color pixel area PX(W) may respectively display cyan, magenta, yellow, and white colors.

The color filters 230R, 230G, and 230B are disposed in their respective pixel areas on the second substrate 210. Specifically, the first color filter 230R, the second color filter 230G, and the third color filter 230B are respectively disposed in the first color pixel area PX(R), the second color pixel area PX(G), and the third color pixel area PX(B). The first color filter 230R may serve as a red filter for exclusively permitting wavelengths of red light to pass therethrough. The second color filter 230G may serve as a green filter for exclusively permitting wavelengths of green light to pass therethrough. The first color filter 230R may serve as a blue filter for exclusively permitting wavelengths of blue light to pass therethrough.

A color pattern may be formed in the fourth color pixel area PX(W), and the color pattern may include at least one of the first color filter 230R, the second color filter 230G, and the third color filter 230B. As shown in FIG. 50 and FIG. 51, the second color filter 230G and the third color filter 230B are disposed in the fourth color pixel area PX(W). However, embodiments of the present invention are not limited thereto. For example, the first color filter 230R may be disposed in the fourth color pixel area PX(W) instead of the third color filter 230B and/or the second color filter 230G. The location of the filters may be varied. In some embodiments, the green filter and/or the blue filter may be formed in the fourth color pixel area PX(W) to prevent or reduce a yellowish phenomenon thereof.

As described above, the color filters 230R, 230G, and 230B are disposed on the second substrate 210, but embodiments of the present invention are not limited thereto. For example, the color filters 230R, 230G, and 230B may be disposed on the first substrate 110.

Each of the pixel areas PX(R), PX(G), PX(B), and PX(W) may be formed in a rectangular shape having two short sides and two long sides. At the first color pixel area PX(R), the second color pixel area PX(G), and the third color pixel area PX(B), each of the first color filter 230R, the second color filter 230G, and the third color filter 230B may be formed substantially in a quadrangular shape, which may be similar to the shapes of the pixel areas PX(R), PX(G), and PX(B).

The third color filter 230B may be formed to have a thickness that is thicker than those of the first color filter 230R and second color filter 230G. Since the third color filter 230B may serve as a blue filter, and it is possible to prevent or reduce decolorization of a short wavelength band by increasing the thickness of the blue filter.

In some embodiments, the second color filter 230G and the third color filter 230B are disposed over the entire area of the fourth color pixel area PX(W), not at a portion thereof.

In some embodiments, the thickness of the second color filter 230G disposed in the fourth color pixel area PX(W) is thinner than that of the second color filter 230G disposed in the second color pixel area PX(G). The thickness of the third color filter 230B disposed in the fourth color pixel area PX(W) is thinner than that of the third color filter 230B disposed in the third color pixel area PX(B).

The second color filter 230G and the third color filter 230B in the fourth color pixel area PX(W) are stacked one on top of the other. For example, the second color filter 230G is between the second substrate 210 and the third color filter 230B. However, embodiments of the present invention are not limited thereto. Alternatively, the third color filter 230B may be disposed between the second substrate 210 and the second color filter 230G.

As explained above, when no color filter is formed in the fourth color pixel area PX(W), color coordinates of white light displayed from the fourth color pixel area PX(W) may be different from color coordinates of a white color obtained by combining light beams emitted from the respective pixel areas PX(R), PX(G), and PX(B). In other words, a color shift may be generated in white light displayed by the fourth color pixel area PX(W). However, in embodiments of the present invention, when at least one of the first color filter 230R, the second color filter 230G, and the third color filter 230B are formed in the fourth color pixel area PX(W), and the thickness ratio of the pixel areas PX(R), PX(G), and PX(B) is adjusted, it is possible to enable color coordinates of the white light passing through the fourth color pixel area PX(W) to approach color coordinates of the white light obtained from the separate beams that first passed through the pixel areas PX(R), PX(G), and PX(B) and were then combined.

The light-blocking member 220 may be further disposed at or near the boundaries between the first color pixel area PX(R), the second color pixel area PX(G), the third color pixel area PX(B), and the fourth color pixel area PX(W). For example, the light-blocking member 220 may be disposed at or near the boundaries between the pixel areas PX(R), PX(G), PX(B), and PX(W), to prevent or reduce color mixture, light leakage, and/or the like.

An overcoat 240 may be further disposed on the first color filter 230R, the second color filter 230G, the third color filter 230B, and the light-blocking member 220. The overcoat 240 may serve to planarize a top surface of the second substrate 210.

The second color filter 230G disposed in the fourth color pixel area PX(W) and the second color filter 230G disposed in the second color pixel area PX(G) can be formed by the same process. Further, the third color filter 230B disposed in the fourth color pixel area PX(W) and the third color filter 230B disposed in the third color pixel area PX(B) can be formed by the same process. Hereinafter, a process for forming a color filter on a second substrate will be described with reference to FIG. 52 to FIG. 54.

Figure 52:
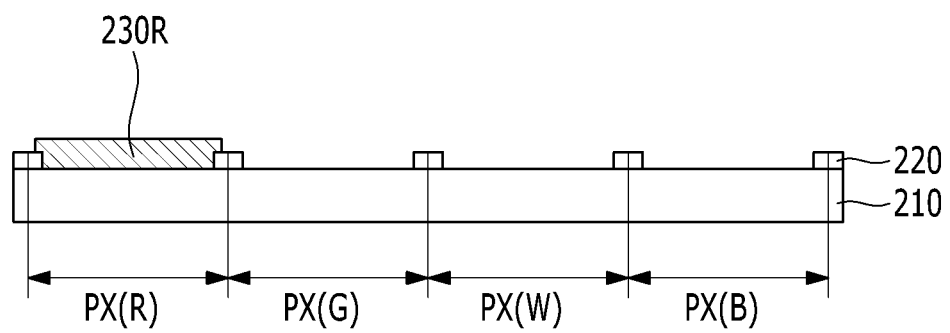
FIG. 52 to FIG. 54 are cross-sectional schematic views of one or more acts of a manufacturing method of a liquid crystal display according to one or more embodiments of the present invention.
Figure 53:
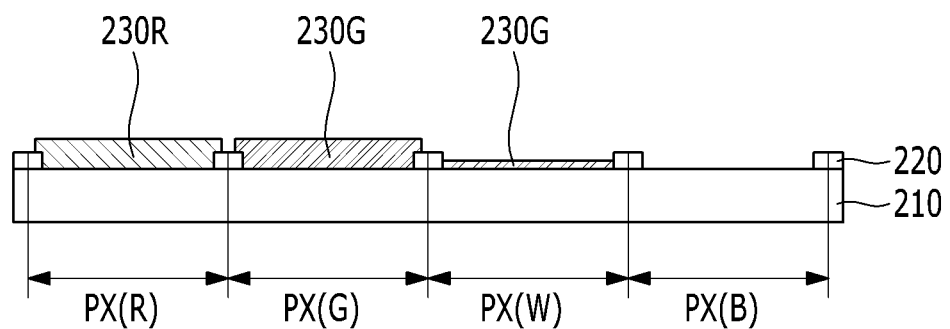
Figure 54:
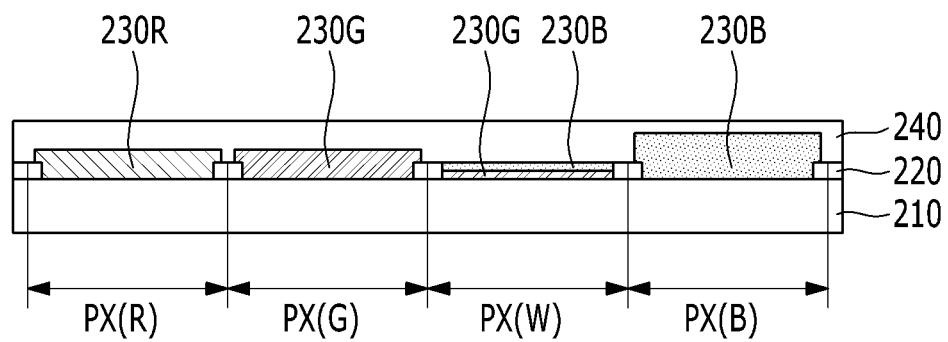

FIG. 52 to FIG. 54 are cross-sectional schematic views illustrating one or more acts of a manufacturing method of a liquid crystal display according to one or more embodiments of the present invention.

As shown in FIG. 52, the light-blocking member 220 is disposed on the second substrate 210. For example, the light-blocking member 220 is disposed at or near the boundaries between the pixel areas PX(R), PX(G), PX(B), and PX(W).

Then, a first color organic material is coated on the second substrate 210 and is patterned to form the first color filter 230R. The first color filter 230R is disposed in the first color pixel area PX(R).

As shown in FIG. 53, a second color organic material is coated on the second substrate 210 and is patterned to form the second color filter 230G. In this case, the thickness of the second color filter 230G can be varied (depending on the pixel area in which the second color filter 230G is positioned) by using (or utilizing) a halftone mask or a slit mask. The second color filter 230G is disposed in the second color pixel area PX(G) and the fourth color pixel area PX(W). In this case, the thickness of the second color filter 230G disposed in the fourth color pixel area PX(W) is thinner than that of the second color filter 230G disposed in the second color pixel area PX(G). For example, the second color filters 230G disposed in the second color pixel area PX(G) and the fourth color pixel area PX(W) can be simultaneously formed to have different thicknesses by using the halftone mask or the slit mask.

As shown in FIG. 54, a third color organic material is coated on the second substrate 210 and is patterned to form the third color filter 230B. In this case, the thickness of the third color filter 230B can be varied (depending on the pixel area in which the third color filter 230B is positioned) by using a halftone mask or a slit mask The third color filter 230B is disposed in each of the third color pixel area PX(B) and the fourth color pixel area PX(W).

For example, the third color filters 230B disposed in the third color pixel area PX(B) and the fourth color pixel area PX(W) can be simultaneously formed to have different thicknesses by using the halftone mask or the slit mask.

Next, the overcoat 240 is formed on the first color filter 230R, the second color filter 230G, and the third color filter 230B. The overcoat 240 is formed to cover the first color filter 230R, the second color filter 230G, and the third color filter 230B to perform planarization.

As described above, the second color filter 230G and the third color filter 230B are stacked in the fourth color pixel area PX(W), and the overcoat 240 can be formed thereon. However, embodiments of the present invention are not limited thereto. For example, a white filter may be additionally formed in the fourth color pixel area PX(W). This will be described further with reference to FIG. 55.

Figure 55:
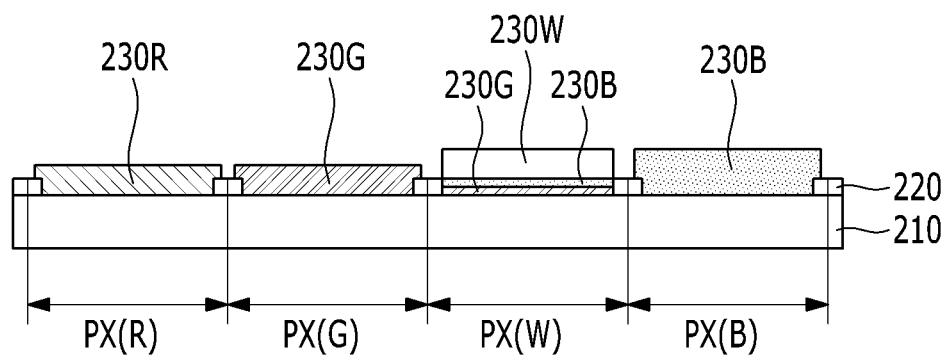
FIG. 55 is a cross-sectional schematic view illustrating a liquid crystal display according to one or more embodiments of the present invention.

FIG. 55 is a cross-sectional schematic view illustrating a liquid crystal display according to one or more embodiments of the present invention.

Referring to FIG. 55, in the fourth color pixel area PX(W), the second color filter 230G and the third color filter 230B are stacked on the second substrate 210, and a white filter 230W is disposed on the third color filter 230B. The white filter 230W may be formed of a transparent photoresist through which all wavelength bands of visible rays can pass, but is not limited thereto.

Next, a liquid crystal display according to one or more embodiments of the present invention will be described with reference to FIG. 56 and FIG. 57.

Figure 56:
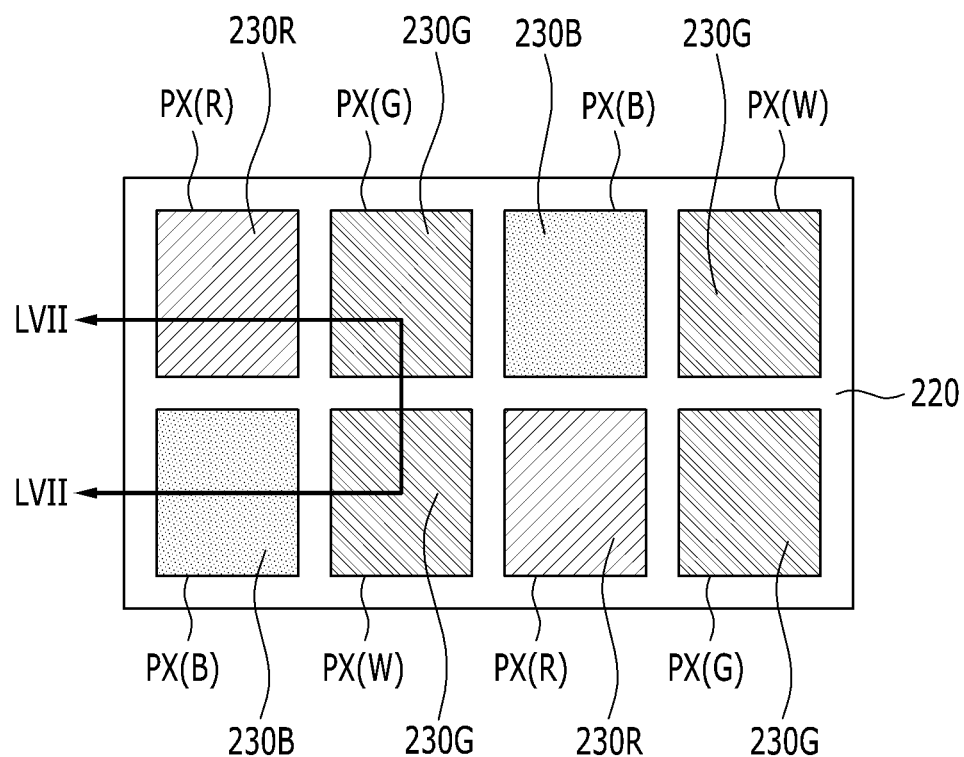
FIG. 56 is a top plan schematic view illustrating a liquid crystal display according to one or more embodiments of the present invention.
Figure 57:
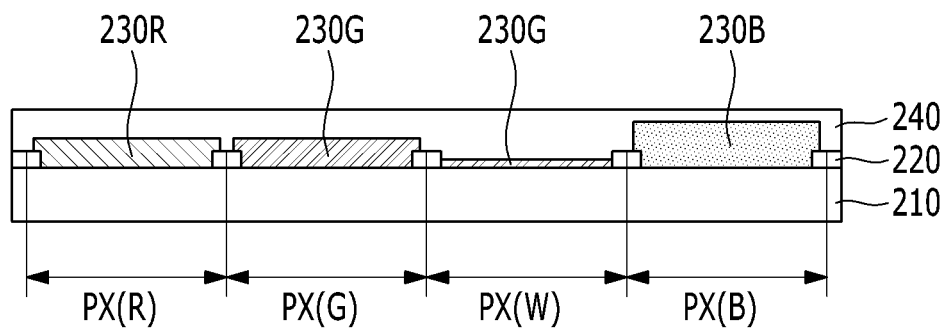
FIG. 57 is a cross-sectional schematic view of the liquid crystal display according to the embodiments of the present invention taken along the line LVII-LVII of FIG. 56.

Since the liquid crystal display according to the embodiment of the present invention illustrated in FIG. 56 and FIG. 57 is substantially the same as the liquid crystal display according to the embodiment of the present invention illustrated in FIG. 50 and FIG. 51, the duplicative description thereof will not be provided. The embodiment illustrated in FIG. 56 and FIG. 57 is different from the above-described embodiments in that only one color filter is disposed in the fourth color pixel area, and hereinafter, will be described in more detail.

FIG. 56 is a top plan schematic view illustrating a liquid crystal display according to one or more embodiments of the present invention, and FIG. 57 is a cross-sectional schematic view of the liquid crystal display according to the embodiments of the present invention taken along the line LVII-LVII of FIG. 56.

In FIG. 57, the illustration of the first substrate, the liquid crystal layer, the light source, and/or the like is omitted, but should be apparent from the illustration of the first substrate, the liquid crystal layer, the light source, and/or the like provided in FIG. 50. For convenience of explanation, in FIG. 57, a surface of the second substrate 210 on which the color filters 230R, 230G, and 230B are positioned (i.e., the surface of the second substrate 210 facing the first substrate 110) is illustrated facing upward.

The first color filter 230R, the second color filter 230G, and the third color filter 230B are respectively disposed in the first color pixel area PX(R), the second color pixel area PX(G), and the third color pixel area PX(B). A color pattern is formed in the fourth color pixel area PX(W), and the color pattern is formed of the second color filter 230G. The second color filter 230G may be a green filter.

The second color filter 230G is disposed over the entire area of the fourth color pixel area PX(W). The thickness of the second color filter 230G disposed in the fourth color pixel area PX(W) is thinner than that of the second color filter 230G disposed in the second color pixel area PX(G).

While in the above-described embodiments, two different color filters are stacked in the fourth color pixel area PX(W), in the embodiment illustrated in FIG. 56 and FIG. 57, only one color filter is stacked in the fourth color pixel area PX(W).

Next, a liquid crystal display according to one or more embodiments of the present invention will be described with reference to FIG. 58 and FIG. 59.

Figure 58:
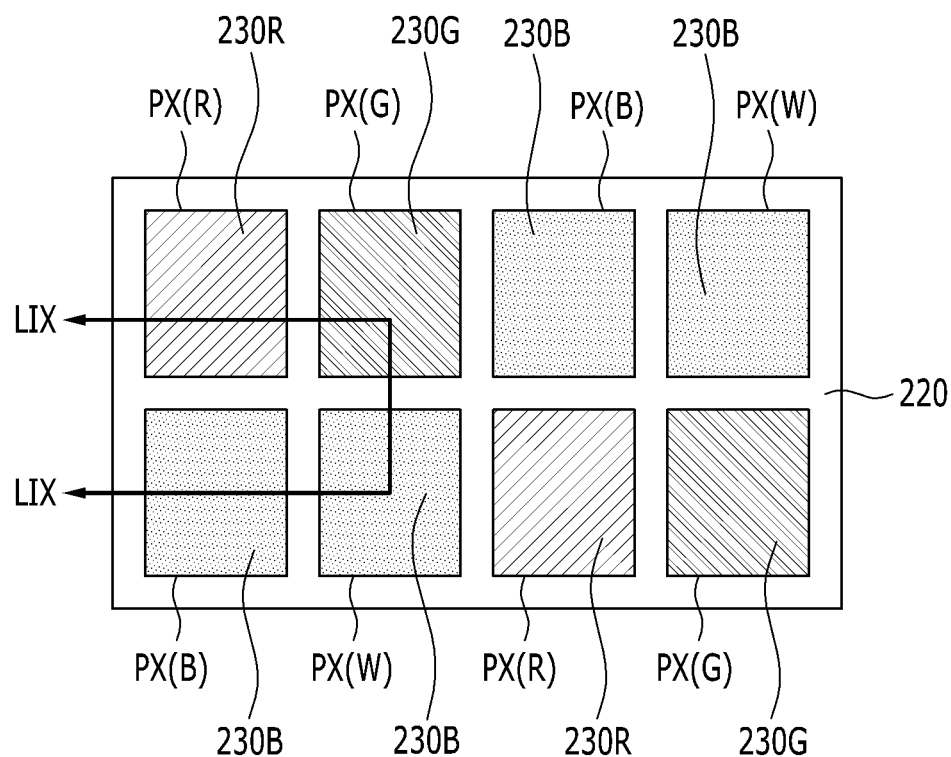
FIG. 58 is a top plan schematic view illustrating a liquid crystal display according to one or more embodiments of the present invention.
Figure 59:
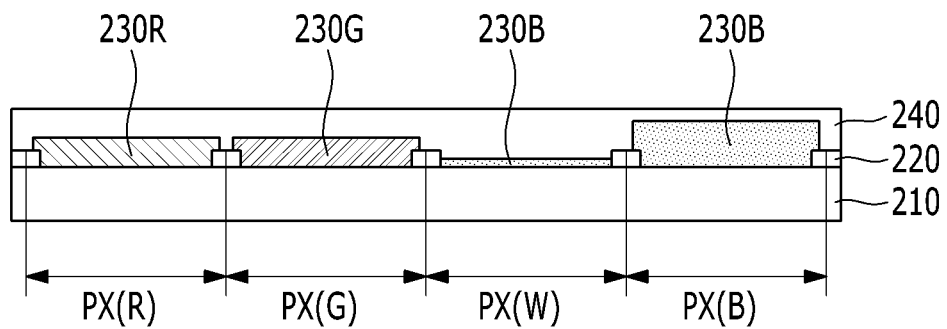
FIG. 59 is a cross-sectional schematic view of the liquid crystal display according to the embodiments of the present invention taken along the line LIX-LIX of FIG. 58.

Since the liquid crystal display according to the embodiment of the present invention illustrated in FIG. 58 and FIG. 59 is substantially the same as the liquid crystal display according to the embodiment of the present invention illustrated in FIG. 56 and FIG. 57, the duplicative description thereof will not be provided. The embodiment illustrated in FIG. 58 and FIG. 59 is different from the above-described embodiments in that the kinds of the color filters are different, and will be described in more detail.

FIG. 58 is a top plan schematic view illustrating a liquid crystal display according to one or more embodiments of the present invention, and FIG. 59 is a cross-sectional schematic view of the liquid crystal display according to the embodiments of the present invention taken along the line LIX-LIX of FIG. 58.

The first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and may include the third color filter 230B. The third color filter 230B may be a blue filter.

The third color filter 230B is disposed over the entire area of the fourth color pixel area PX(W). The thickness of the third color filter 230B disposed in the fourth color pixel area PX(W) is thinner than that of the third color filter 230B disposed in the third color pixel area PX(B).

Next, the transmittance according to a thickness ratio of a color filter disposed in the white pixel area of a liquid crystal display according to one or more embodiments of the present invention will be described with reference to FIG. 60.

Figure 60:
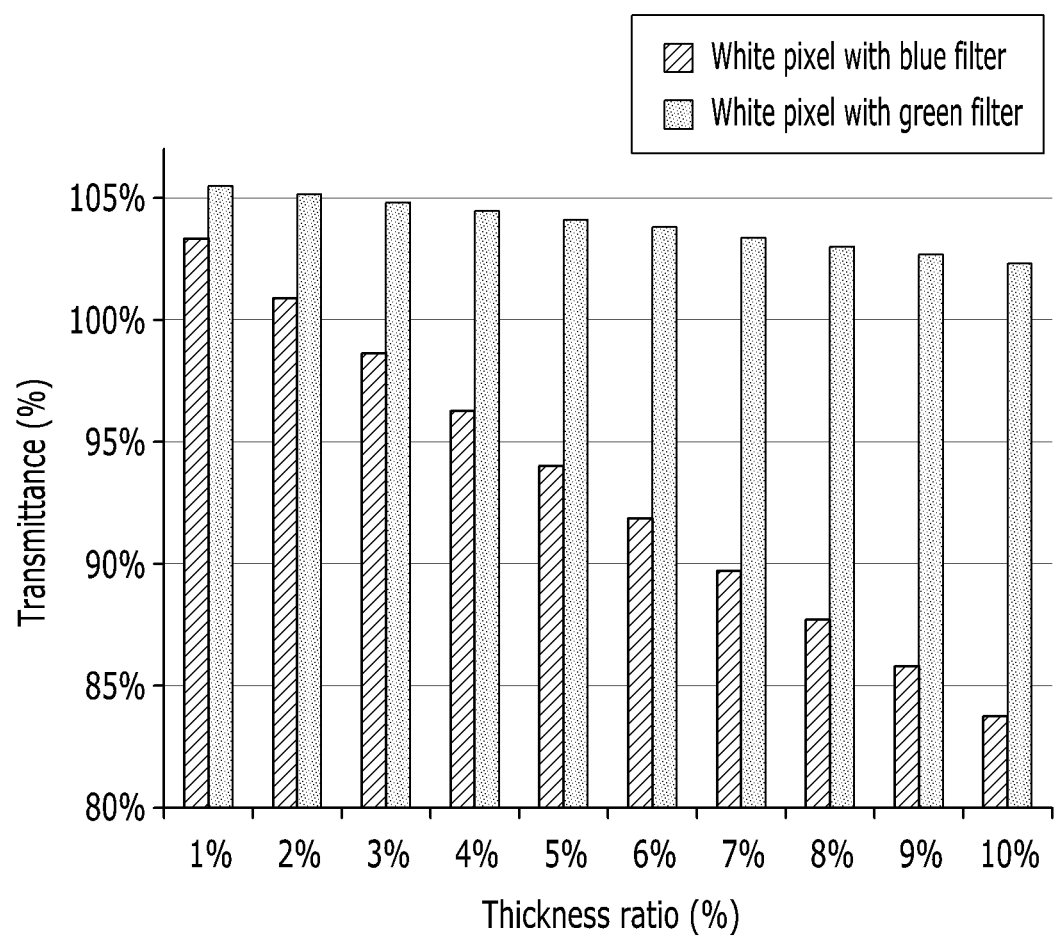
FIG. 60 is a graph illustrating transmittance according to a thickness ratio of a color filter disposed in a white pixel area of a liquid crystal display according to one or more embodiments of the present invention.

FIG. 60 is a graph illustrating transmittance according to a thickness ratio of a color filter disposed in a white pixel area of a liquid crystal display according to one or more embodiments of the present invention.

In the graph of FIG. 60, the horizontal axis indicates a thickness ratio of a color filter disposed in the white pixel area. For example, if the blue filter is disposed in the white pixel area, the horizontal axis indicates a ratio of the thickness of the blue filter disposed in the white pixel area to the thickness of the blue pixel disposed in the blue pixel area. Similarly, if the green filter is disposed in the white pixel area, the horizontal axis indicates a ratio of the thickness of the green filter disposed in the white pixel area to the thickness of the green pixel disposed in the green pixel area.

In the graph of FIG. 60, the vertical axis indicates transmittance, and the transmittance of the liquid crystal display exclusively including red, blue, and green pixel areas is set as the reference and is illustrated at 100% transmittance.

When the color filter is disposed in the white pixel area, the transmittance is reduced as the thickness of the color filter is increased. This is at least partially because the amount of light passing through the white pixel area is reduced as the thickness of the color filter is increased.

When the green filter is disposed in the white pixel area, the transmittance reduction is significantly small. In contrast, when the blue filter is disposed in the white pixel area, the transmittance reduction is increased, as compared with the case when the green filter is disposed in the white pixel area.

Next, the change in color coordinates according to a thickness ratio of a color filter disposed in the white pixel area of a liquid crystal display according to one or more embodiments of the present invention will be described with reference to FIG. 61.

Figure 61:
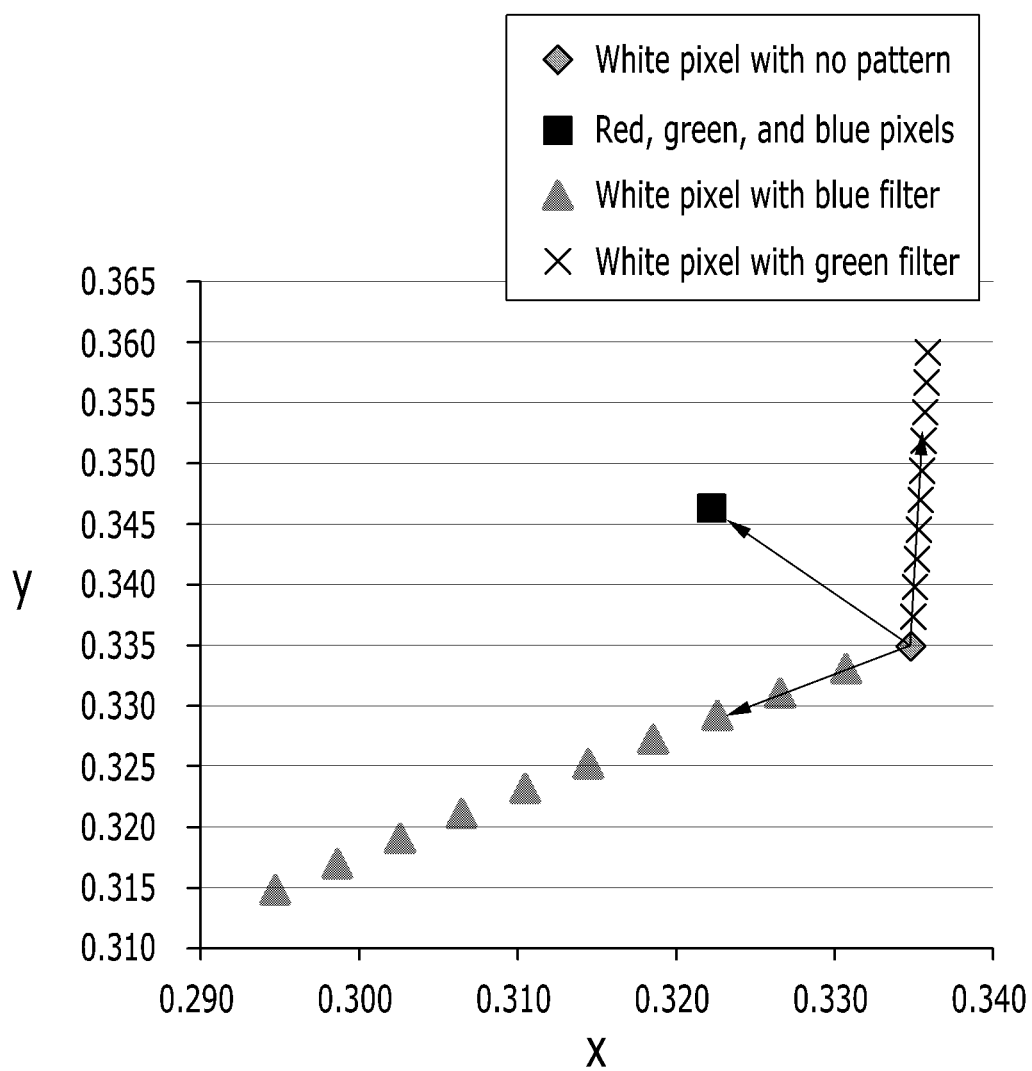
FIG. 61 is a graph illustrating color coordinates of a liquid crystal display according to one or more embodiments of the present invention.

FIG. 61 is a graph illustrating color coordinates of a liquid crystal display according to one or more embodiments of the present invention.

From the wavelength bands of light supplied from the light source, a red wavelength band of light passes through the red pixel area, a green wavelength band of light passes through the green pixel area, and a blue wavelength band of light passes through the blue pixel area. These red wavelength, green wavelength, and blue wavelength bands of light are then combined into white light. The color coordinates of the white light obtained in this way are different from the color coordinates of a white light passing through the white pixel area in which no color filter is formed.

According to one or more embodiments of the present invention, when the blue filter and/or the green filter is disposed in the white pixel area, it is possible to shift a position of color coordinates of the white light passing through the white pixel area at which no color filter is formed. Moreover, as the thickness of the color filter disposed in the white pixel area is increased, the position of the color coordinates is shifted further. When the blue filter is disposed in the white pixel area, both the x-axis and y-axis position of the color coordinates are reduced. When the green filter is disposed in the white pixel area, the x-axis position of the color coordinates is not significantly changed and the y-axis position thereof is increased.

Accordingly, when the blue filter and the green filter are both disposed in the white pixel area, the position of the color coordinates is shifted according to a vector sum of the color coordinates shift of the blue filter and the color coordinates shift of the green filter.

As illustrated in FIG. 61, when the thickness ratios of the green filter and the blue filter disposed in the white pixel area are respectively about 7% and about 3%, the color coordinates of the white light passing through the white pixel area are closest to the color coordinates of the white light obtained when separate beams first pass through the red, green, and blue pixel areas and are then combined. However, embodiments of the present invention are not limited thereto, and thickness ratios of the green filter and the blue filter may be varied.

Further, when the transmittance is considered, the thickness ratios of the green filter and the blue filter disposed in the white pixel area may be reduced further.

In some embodiments, to further improve the transmittance and color coordinates, the difference between the thickness of the green filter disposed in the white pixel area and the thickness of the green filter disposed in the green pixel area may be in a range of about 0% to 20%, for example, in a range of 5% to 10%, inclusive.

Similarly, the difference between the thickness of the blue filter disposed in the white pixel area and the thickness of the blue filter disposed in the blue pixel area may be in a range of about 0% to 10%, for example, in a range of 1% to 5%, inclusive.

Hereinafter, a liquid crystal display according to one or more embodiments of the present invention will be described with reference to FIG. 62.

Figure 62:
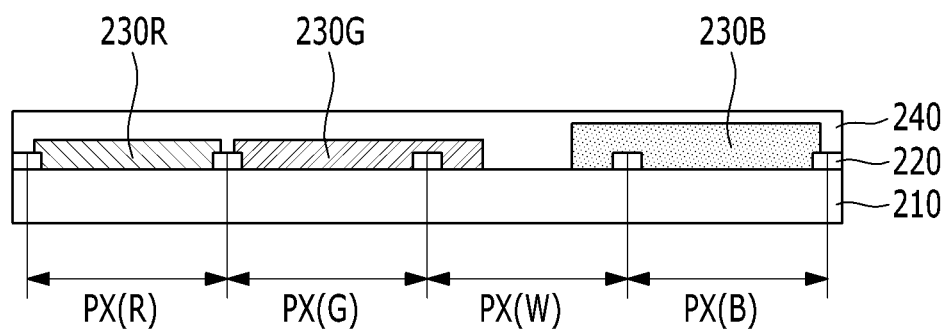
FIG. 62 is a cross-sectional schematic view illustrating a liquid crystal display according to one or more embodiments of the present invention.

Since the liquid crystal display according to the embodiment of the present invention illustrated in FIG. 62 is substantially the same as the liquid crystal display according to the embodiment of the present invention illustrated in FIG. 50 and FIG. 51, the duplicative description thereof will not be provided. The embodiment illustrated in FIG. 62 is different from the above-described embodiments in that a color filter is disposed at a portion of the fourth color pixel area, and hereinafter, will be described in more detail.

FIG. 62 is a cross-sectional schematic view illustrating a liquid crystal display according to one or more embodiments of the present invention. For convenience of explanation, the illustration of the first substrate, the liquid crystal layer, the light source, and/or the like is omitted, but should be apparent from the illustration of the first substrate, the liquid crystal layer, the light source, and/or the like provided in FIG. 50.

The first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and the color pattern may be formed of at least one of the first color filter 230R, the second color filter 230G, and the third color filter 230B. As shown in FIG. 62, the second color filter 230G and the third color filter 230B are disposed in the fourth color pixel area PX(W). However, embodiments of the present invention are not limited thereto. For example, the first color filter 230R may be disposed in the fourth color pixel area PX(W) instead of the second color filter 230G and/or the third color filter 230B. However, the selection of color filters may be further varied. In some embodiments, the green filter and/or the blue filter may be formed in the fourth color pixel area PX(W) to prevent or reduce a yellowish phenomenon thereof.

Referring to FIG. 62, the second color filter 230G and the third color filter 230B are each disposed at a portion of the fourth color pixel area PX(W). The second color filter 230G and the third color filter 230B may be formed to have various shapes at different positions. For example, the second color filter 230G and the third color filter 230B may be respectively disposed at either edge of the fourth color pixel area PX(W).

The thickness of the second color filter 230G disposed in the fourth color pixel area PX(W) may be similar to the thickness of the second color filter 230G disposed in the second color pixel area PX(G). The thickness of the third color filter 230B disposed in the fourth color pixel area PX(W) may be similar to the thickness of the third color filter 230B disposed in the third color pixel area PX(B).

In one or more embodiments of the present invention, when at least one of the first color filter 230R, the second color filter 230G, and the third color filter 230B are formed in the fourth color pixel area PX(W), and the area ratios of the pixel areas PX(R), PX(G), and PX(B) are adjusted, it is possible to enable color coordinates of the white light passing through the fourth color pixel area PX(W) to approach color coordinates of the white light obtained from the separate light beams that first pass through the pixel areas PX(R), PX(G), and PX(B) and are then combined.

The light-blocking member 220 may be further disposed at or near the boundaries between the first color pixel area PX(R), the second color pixel area PX(G), the third color pixel area PX(B), and the fourth color pixel area PX(W). An overcoat 240 may be further disposed on the first color filter 230R, the second color filter 230G, the third color filter 230B, and the light-blocking member 220.

The second color filter 230G disposed in the fourth color pixel area PX(W) and the second color filter 230G disposed in the second color pixel area PX(G) can be formed by the same process. Further, the third color filter 230B disposed in the fourth color pixel area PX(W) and the third color filter 230B disposed in the third color pixel area PX(B) can be formed by the same process. Hereinafter, a process for forming a color filter on a second substrate in accordance with one or more embodiments of the present invention will be described with reference to FIG. 63 to FIG. 65.

Figure 63:
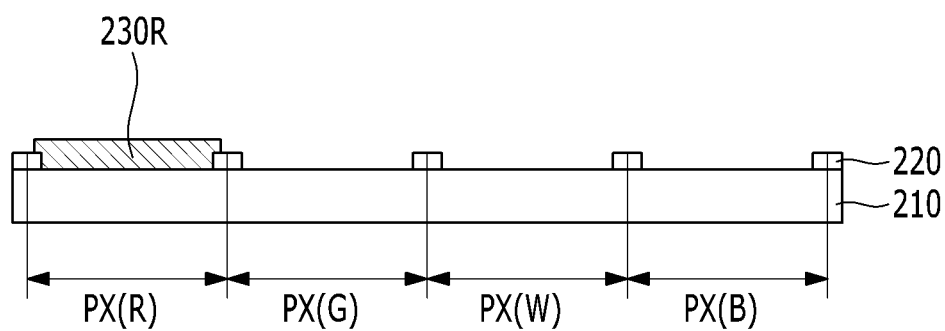
FIG. 63 to FIG. 65 are cross-sectional schematic views of one or more acts of a manufacturing method of a liquid crystal display according to one or more embodiments of the present invention.
Figure 64:
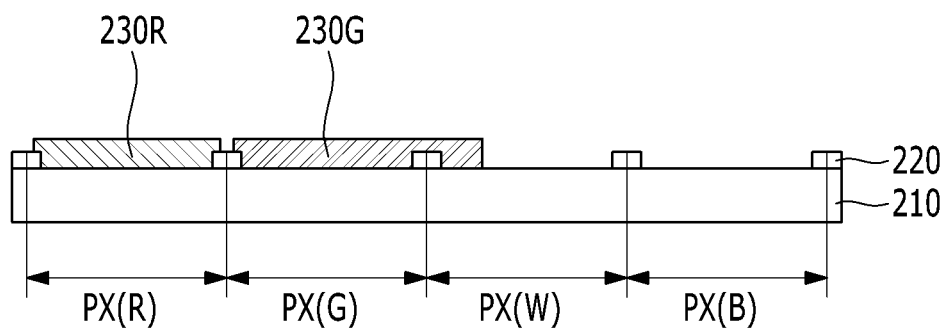
Figure 65:
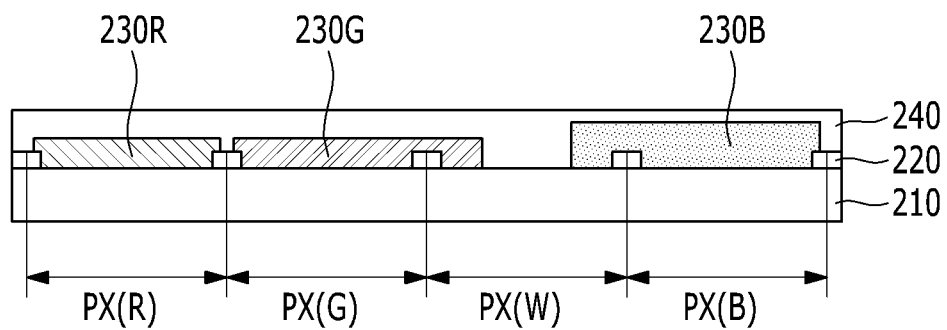

FIG. 63 to FIG. 65 are cross-sectional schematic views illustrating one or more acts of a manufacturing method of a liquid crystal display according to one or more embodiments of the present invention.

As shown in FIG. 63, the light-blocking member 220 is disposed on the second substrate 210. The light-blocking member 220 is disposed at or near the boundaries between the pixel areas PX(R), PX(G), PX(B), and PX(W).

A first color organic material is coated on the second substrate 210 and is patterned to form the first color filter 230R. The first color filter 230R is disposed in the first color pixel area PX(R).

As shown in FIG. 64, a second color organic material is coated on the second substrate 210 and is patterned to form the second color filter 230G. The second color filter 230G is disposed in the second color pixel area PX(G) and a portion of the fourth color pixel area PX(W). In this case, the thickness of the second color filter 230G disposed in the fourth color pixel area PX(W) is similar to the thickness of the second color filter 230G disposed in the second color pixel area PX(G). Here, the second color filter 230G can be formed in the fourth color pixel area PX(W) without using a halftone mask or a slit mask.

As shown in FIG. 65, a third color organic material is coated on the second substrate 210 and is patterned to form the third color filter 230B. The third color filter 230B is disposed in the third color pixel area PX(B) and a portion of the fourth color pixel area PX(W). In this case, the thickness of the third color filter 230B disposed in the fourth color pixel area PX(W) is similar to the thickness of the third color filter 230B disposed in the third color pixel area PX(B). Here, the third color filter 230B can be formed in the fourth color pixel area PX(W) without using a halftone mask or a slit mask.

Next, the overcoat 240 is formed on the first color filter 230R, the second color filter 230G, and the third color filter 230B. The overcoat 240 is formed to cover the first color filter 230R, the second color filter 230G, and the third color filter 230B to perform planarization.

As described above, the second color filter 230G and the third color filter 230B are formed in the fourth color pixel area PX(W), and the overcoat 240 is formed thereon. However, embodiments of the present invention are not limited thereto. A white filter may be additionally formed in the fourth color pixel area PX(W). This will be described further with reference to FIG. 66.

Figure 66:
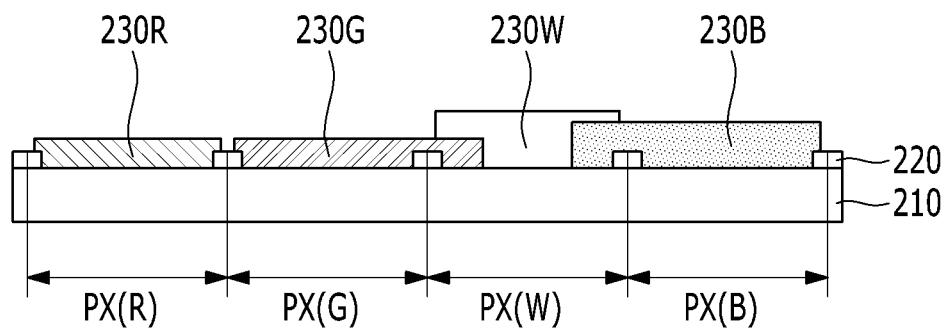
FIG. 66 is a cross-sectional schematic view illustrating a liquid crystal display according to one or more embodiments of the present invention.

FIG. 66 is a cross-sectional schematic view illustrating a liquid crystal display according to one or more embodiments of the present invention.

Referring to FIG. 66, in the fourth color pixel area PX(W), the second color filter 230G and the third color filter 230B are formed on the second substrate 210, and the white filter 230W is further disposed in the fourth color pixel area PX(W). For example, the white filter 230W may be disposed at a portion of the fourth color pixel area PX(W) at which the second color filter 230G and the third color filter 230B are not disposed and may be further formed on the second color filter 230G and the third color filter 230B. The white filter 230W may be formed of a transparent photoresist through which all wavelength bands of visible rays can pass, but is not limited thereto.

Next, a liquid crystal display according to one or more embodiments of the present invention will be described with reference to FIG. 67.

Figure 67:
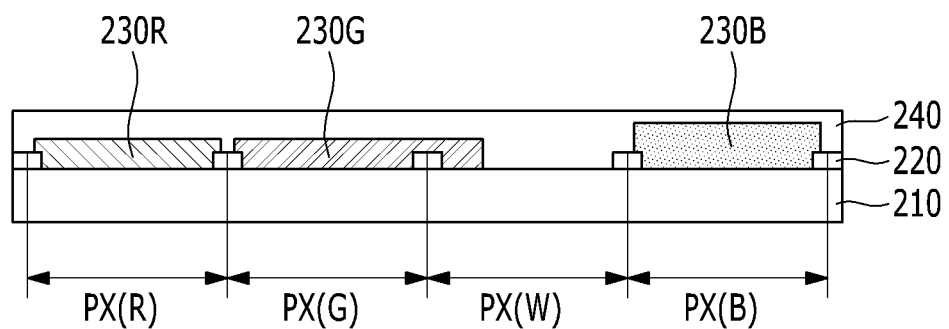
FIG. 67 is a cross-sectional schematic view illustrating a liquid crystal display according to one or more embodiments of the present invention.

Since the liquid crystal display according to the embodiment of the present invention illustrated in FIG. 67 is substantially the same as the liquid crystal display according to the embodiment of the present invention illustrated in FIG. 62, the duplicative description thereof will not be provided. The embodiment illustrated in FIG. 67 is different from the above-described embodiments in that only one color filter is disposed in the fourth color pixel area, and hereinafter, will be described in more detail.

FIG. 67 is a cross-sectional schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B). A color pattern is formed in the fourth color pixel area PX(W), and the color pattern includes the second color filter 230G. The second color filter 230G may be a green filter.

The second color filter 230G is disposed at a portion of the fourth color pixel area PX(W). The thickness of the second color filter 230G disposed in the fourth color pixel area PX(W) is similar to the thickness of the second color filter 230G disposed in the second color pixel area PX(G).

While in the above-described embodiments, two different color filters are disposed in the fourth color pixel area PX(W), in the embodiment illustrated in FIG. 67, only one color filter is disposed in the fourth color pixel area PX(W).

Next, a liquid crystal display according to one or more embodiments of the present invention will be described with reference to FIG. 68.

Figure 68:
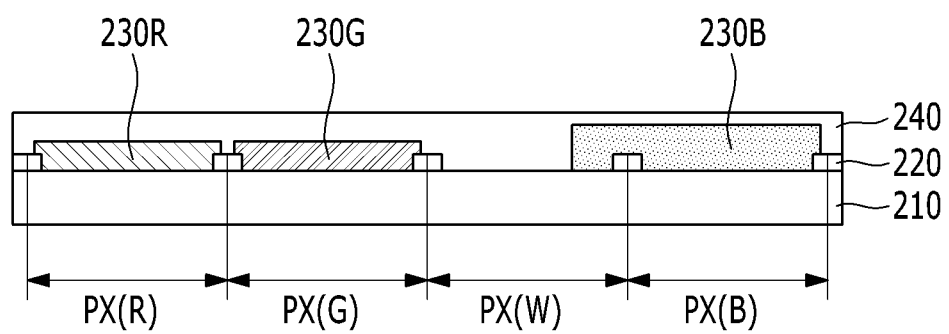
FIG. 68 is a cross-sectional schematic view illustrating a liquid crystal display according to one or more embodiments of the present invention.

Since the liquid crystal display according to the embodiment of the present invention illustrated in FIG. 68 is substantially the same as the liquid crystal display according to the embodiment of the present invention illustrated in FIG. 67, the duplicative description thereof will not be provided. The embodiment illustrated in FIG. 68 is different from the above-described embodiments in that the kinds of the color filters utilized are different, and will be described in more detail.

FIG. 68 is a cross-sectional schematic view illustrating a liquid crystal display according to one or more embodiments of the present invention.

The first color filter 230R, the second color filter 230G, and the third color filter 230B are respectively disposed in the first color pixel area PX(R), the second color pixel area PX(G), and the third color pixel area PX(B). A color pattern may be formed in the fourth color pixel area PX(W), and the color pattern includes the third color filter 230B. The third color filter 230B may be a blue filter.

The third color filter 230B is disposed at a portion of the fourth color pixel area PX(W). The thickness of the third color filter 230B disposed in the fourth color pixel area PX(W) is similar to the thickness of the third color filter 230B disposed in the third color pixel area PX(B).

Next, the transmittance according to an area ratio of a color filter disposed in the white pixel area of a liquid crystal display according to one or more embodiments of the present invention will be described with reference to FIG. 69.

Figure 69:
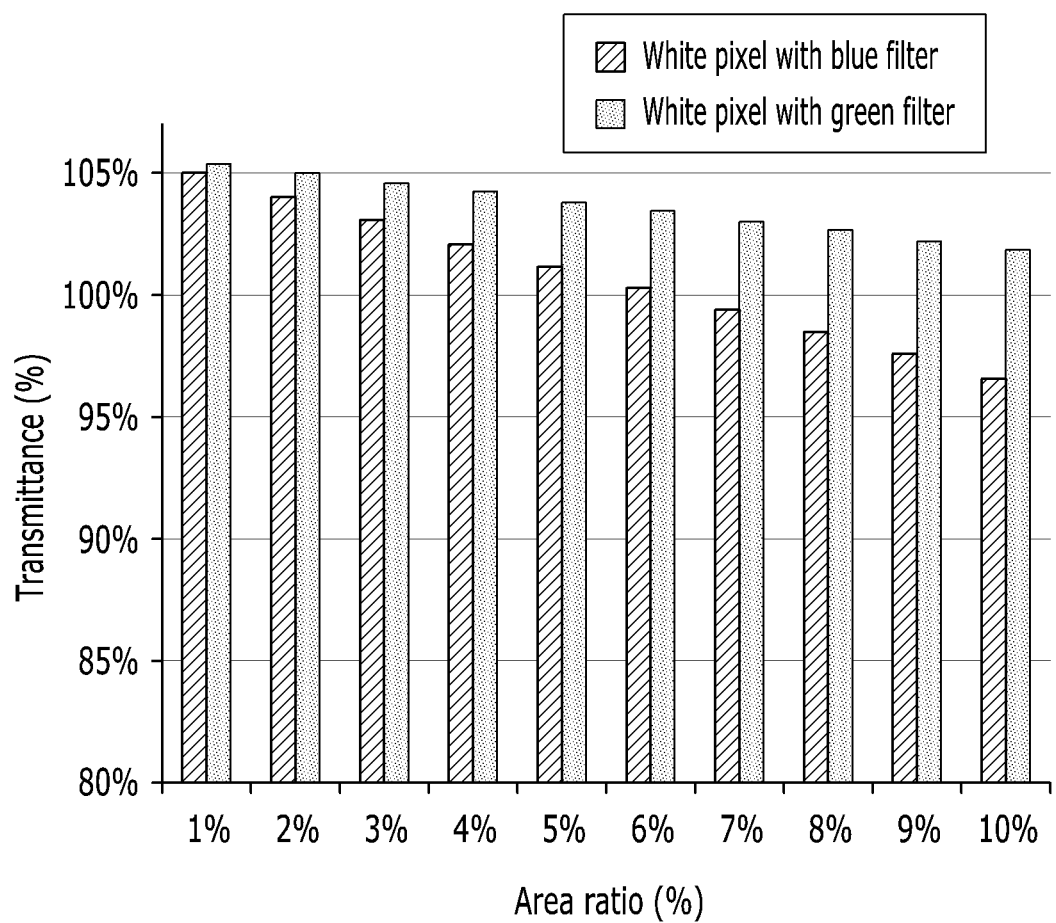
FIG. 69 is a graph illustrating transmittance according to an area ratio of a color filter disposed in a white pixel area of a liquid crystal display according to one or more embodiments of the present invention.

FIG. 69 is a graph illustrating transmittance according to an area ratio of a color filter disposed in a white pixel area of a liquid crystal display according to one or more embodiments of the present invention.

In the graph of FIG. 69, the horizontal axis indicates an area ratio of a respective color filter disposed in the white pixel area. For example, if the blue filter is disposed in the white pixel area, the horizontal axis indicates a ratio of the area occupied by the blue filter to the entire area of the white pixel area. Similarly, if the green filter is disposed in the white pixel area, the horizontal axis indicates a ratio of the area occupied by the green filter to the entire area of the white pixel area.

In the graph of FIG. 69, the vertical axis indicates transmittance, and the transmittance of the liquid crystal display exclusively including red, blue, and green pixel areas is set as the reference and is illustrated at 100%.

When the color filter is disposed in the white pixel area, the transmittance is reduced as the area of the color filter is increased. This is at least partially because the amount of light passing through the white pixel area is reduced as the area occupied by the color filter in the white pixel area is increased.

When the green filter is disposed in the white pixel area, the transmittance reduction is significantly small. In contrast, when the blue filter is disposed in the white pixel area, the transmittance reduction is increased as compared with the case when the green filter is disposed in the white pixel area.

Next, the change in color coordinates according to an area ratio of a color filter disposed in the white pixel area of a liquid crystal display according to one or more embodiments of the present invention will be described with reference to FIG. 70.

Figure 70:
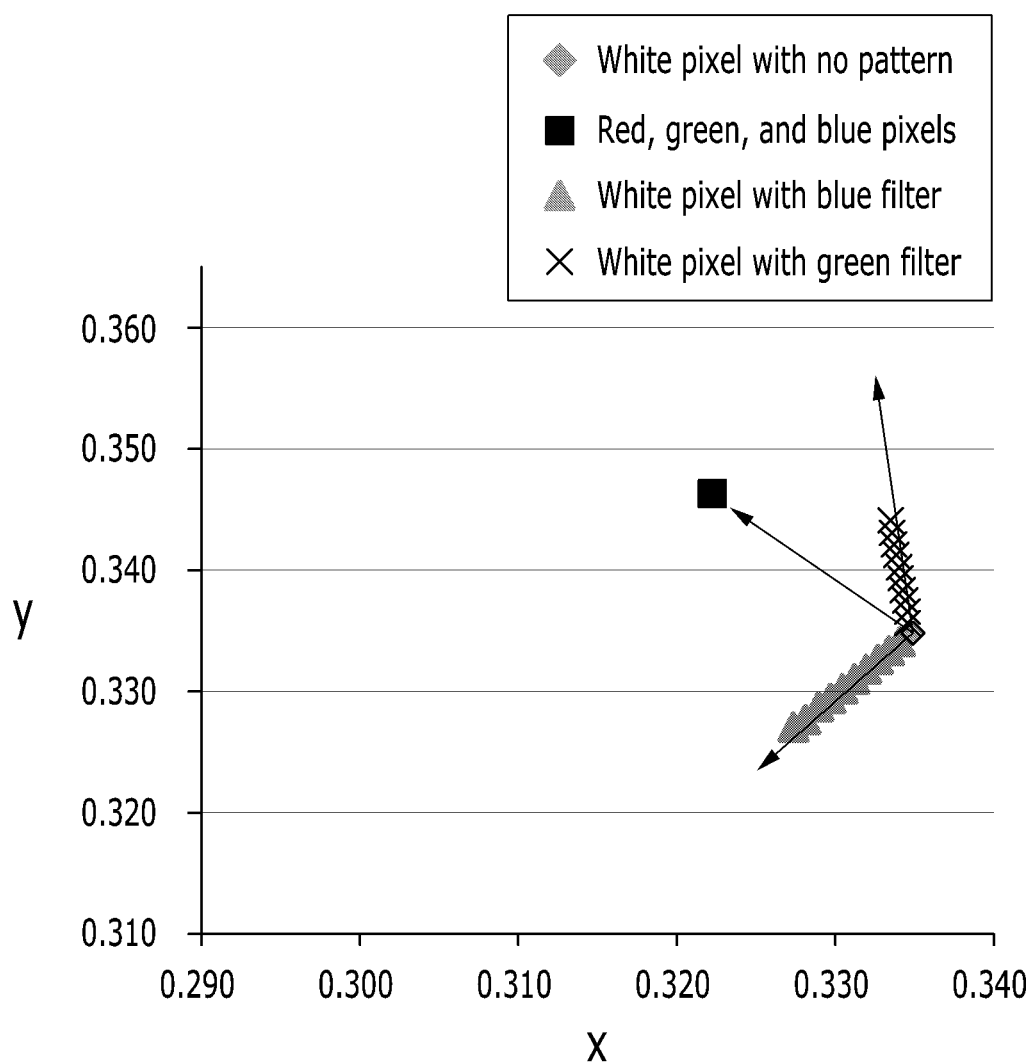
FIG. 70 is a graph illustrating color coordinates of a liquid crystal display according to one or more embodiments of the present invention.

FIG. 70 is a graph illustrating color coordinates of a liquid crystal display according to one or more embodiments of the present invention.

From the wavelength bands of light supplied from the light source, a red wavelength band of light passes through the red pixel area, a green wavelength band of light passes through the green pixel area, and a blue wavelength band of light passes through the blue pixel area. These red wavelength, green wavelength, and blue wavelength bands of light are then combined into white light. The color coordinates of the white light obtained in this way are different from the color coordinates of the white light passing through the white pixel area at which no color filter is formed.

When the blue filter and/or the green filter is disposed in the white pixel area, it is possible to shift a position of color coordinates of the white light passing through the white pixel area at which no color filter is formed. Moreover, as the area of the color filter disposed in the white pixel area is increased, the position of the color coordinates is shifted further. For example, when the blue filter is disposed in the white pixel area, both x-axis and y-axis positions of the color coordinates are reduced. When the green filter is disposed in the white pixel area, the x-axis position of the color coordinates is not significantly changed and the y-axis position thereof is increased. Accordingly, when the blue filter and the green filter are both disposed in the white pixel area, the position of the color coordinates is shifted according to a vector sum of the color coordinates shift of the blue filter and the color coordinates shift of the green filter.

As illustrated in FIG. 70, when the area ratios of the green filter and the blue filter disposed in the white pixel area are respectively about 20% and about 12%, the color coordinates of the white light passing through the white pixel area are closest to the color coordinates of the white light obtained when separate beams first pass through the red, green, and blue pixel areas and are then combined. However, embodiments of the present invention are not limited thereto and area ratios of the green filter and the blue filter may be varied.

Further, when the transmittance is considered, the area ratios of the green filter and the blue filter disposed in the white pixel area may be reduced further.

In some embodiments, to further improve the transmittance and the color coordinates, the area ratio of the green filter disposed in the white pixel area to the white pixel area may be in a range of about 0% to 25%, for example, in a range of 10% to 25%, inclusive.

Similarly, the area ratio of the blue filter disposed in the white pixel area to the white pixel area may be in a range of about 0% to 20%, for example, in a range of 8% to 15%, inclusive.

Hereinafter, the change in color coordinates of a liquid crystal display according to one or more embodiments of the present invention and corresponding change of a luminance thereof will be described with reference to FIG. 71, FIG. 72, and Table 9.

Figure 71:
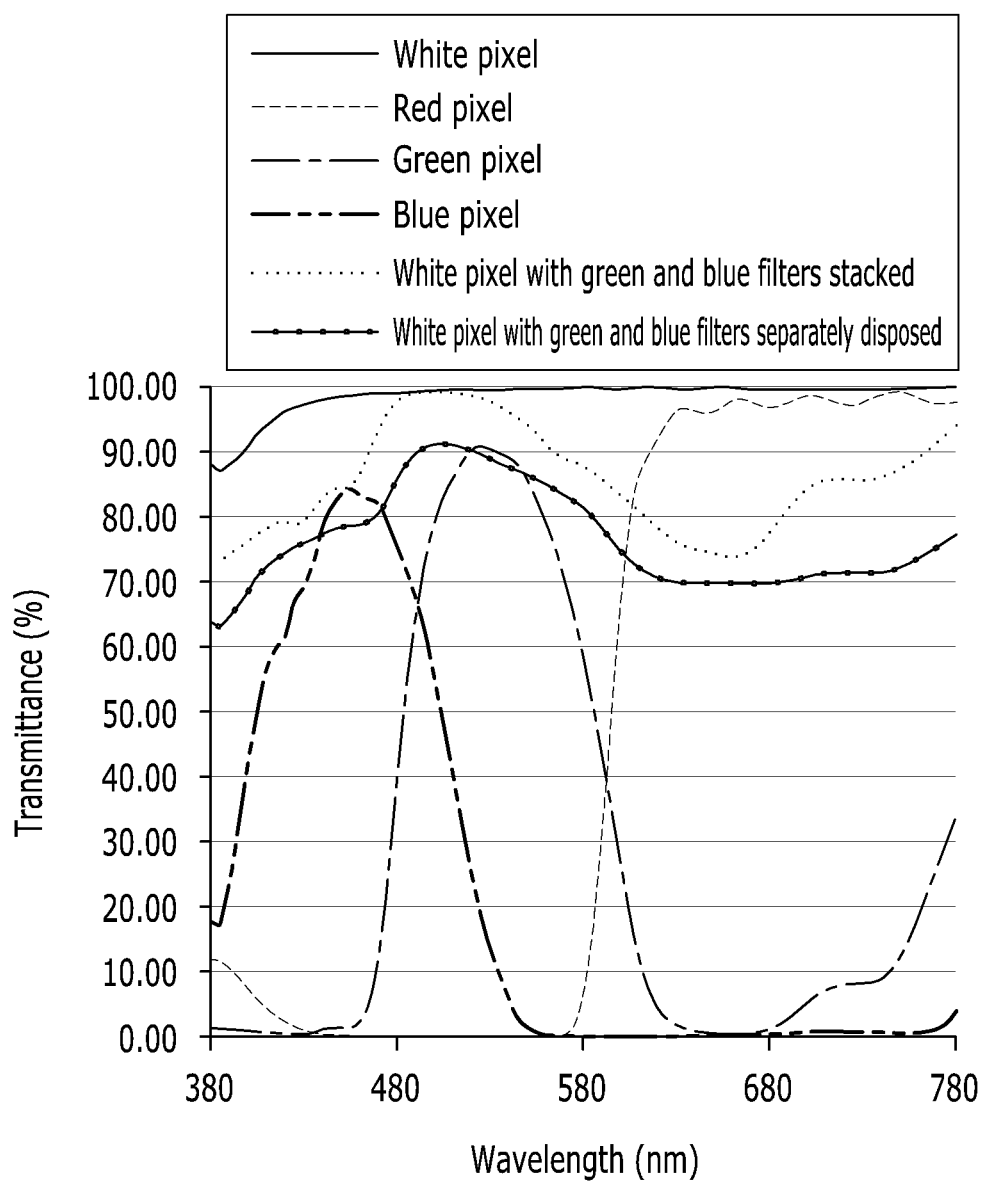
FIG. 71 is a graph illustrating transmittance spectra of a liquid crystal display according to one or more embodiments of the present invention.
Figure 72:
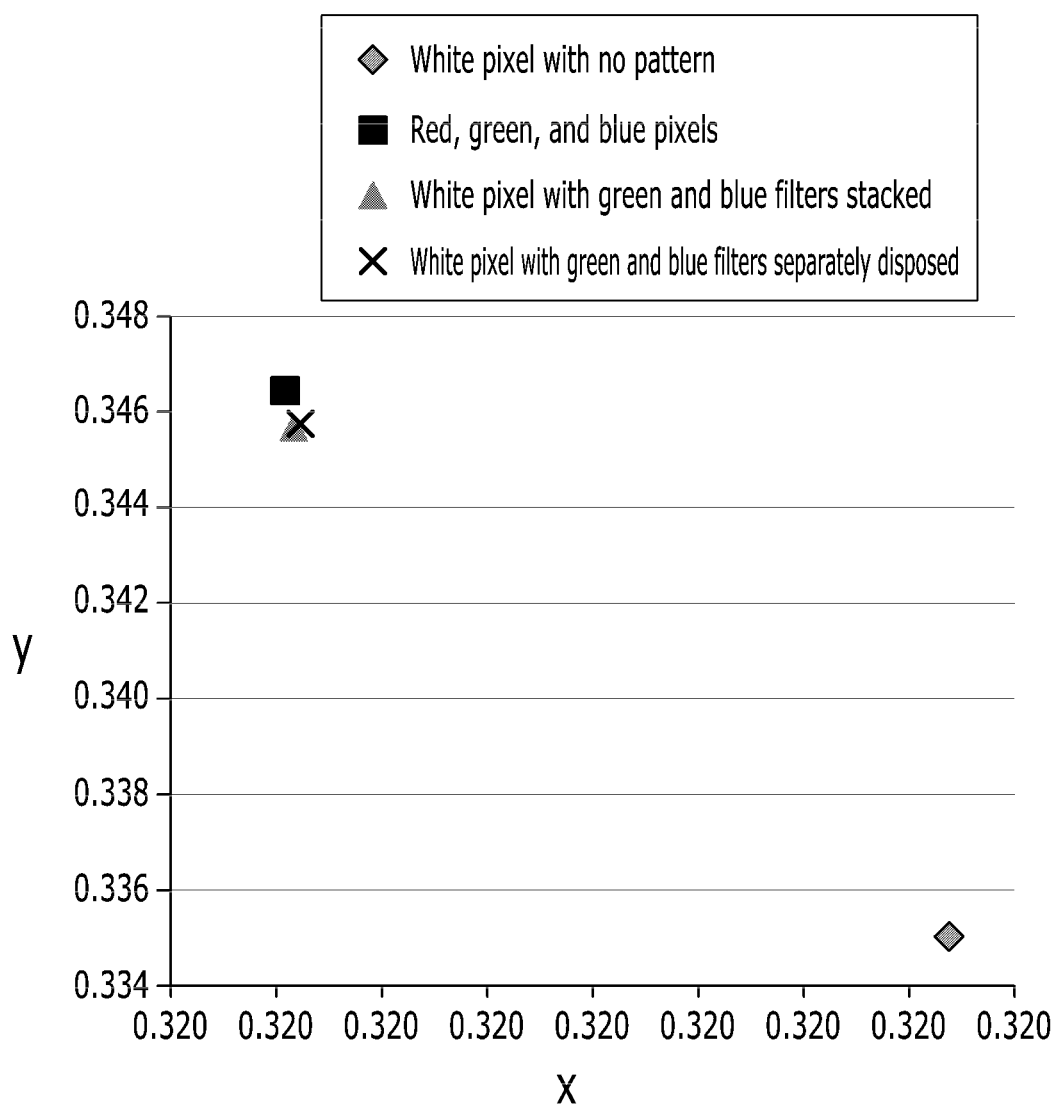
FIG. 72 is a graph illustrating color coordinates of a liquid crystal display according to one or more embodiments of the present invention.

FIG. 71 is a graph illustrating transmittance spectra of a liquid crystal display according to one or more embodiments of the present invention, FIG. 72 is a graph illustrating color coordinates of a liquid crystal display according to one or more embodiments of the present invention, and Table 9 illustrates a luminance and color coordinates of a liquid crystal display according to one or more embodiments of the present invention.

Referring to FIG. 71, most of all the wavelength band of light passes through a white pixel area in which no pattern is formed, and a red wavelength band of light passes through the red pixel area in which the red filter is formed. A green wavelength band of light passes through the green pixel area in which the green filter is formed, and a blue wavelength band of light passes through the blue pixel area in which the blue filter is formed.

In embodiments where the green filter and the blue filter are thinly formed and are stacked in a white pixel area, the green wavelength band of light mostly passes therethrough and the blue and red wavelengths of light are partially blocked. In embodiments where the green filter and the blue filter are separately disposed in a white pixel area, all wavelength bands of light are blocked little by little. In the aforementioned embodiments, all wavelength bands of light mostly pass through the white pixel area, thereby forming white light.

Referring to FIG. 72, color coordinates of light passing through the white pixel area having no pattern (e.g., when no color filters are formed in the white pixel area) are different from color coordinates of light obtained from the separate beams that first pass through the red, green, and blue pixel areas and are then combined.

In the embodiments where the green filter and the blue filter are thinly formed and are stacked in the white pixel area, color coordinates of light passing through the white pixel area having no pattern are similar to the color coordinates of light obtained from the separate beams that first pass through the red, green, and blue pixel areas and are then combined. In the embodiments where the green filter and the blue filter are separately disposed in the white pixel area, color coordinates of light passing through the white pixel area having no pattern are similar to the color coordinates of light obtained from the separate beams that first pass through the red, green, and blue pixel areas and are then combined.

Referring to Table 9, the white pixel area in which the green filter and the blue filter are thinly formed and are stacked exhibits better luminance than the white pixel area in which the green and blue filters are separately disposed.

TABLE 9

|  |  | White pixel having no pattern | Red, green, and blue pixels | White pixel including green and blue filters | White pixel in which green and blue filters are separately disposed |
|---|---|---|---|---|---|
| luminance |  | — | 100% | 102% | 88% |
| color | X | 0.335 | 0.322 | 0.322 | 0.322 |
| coordinates | y | 0.335 | 0.346 | 0.346 | 0.346 |

The color coordinates of the light passing through the white pixel area with no color filter are (0.335, 0.335), and the color coordinates of the light obtained from the separate beams that first pass through the red, green, and blue pixel areas and are then combined are (0.322, 0.346).

According to one or more embodiments of the present invention, a green filter and a blue filter may be formed in the white pixel area to enable the color coordinates of the light passing through the white pixel area to be similar to the color coordinates of the light obtained from the separate beams that first pass through the red, green, and blue pixel areas and are then combined.

In the embodiments where the white pixel area includes the green filter and the blue filter that are thinly formed and stacked, the color coordinates can be shifted by adjusting the thicknesses thereof. When the color coordinates of the light passing through the white pixel area are (0.322, 0.346), a high level luminance of about 102% can be obtained.

In the embodiments where the white pixel area includes the green filter and the blue filter that are separately disposed, the color coordinates can also be shifted by adjusting the area thereof. However, in contrast to the previously described embodiment, when the color coordinates of the light passing through the white pixel area are (0.322, 0.346), a relatively low level luminance of about 88% is obtained.

Accordingly, the white pixel area in which the green filter and the blue filter are thinly formed and stacked can exhibit significantly better luminance.

However, the white pixel area in which the green filter and the blue filter are separately disposed can exhibit better side color shift by forming the blue filter to have a thickness that is different from that of another color filter (e.g., the green filter).

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims and equivalents thereof.

| Description of Symbols | |
|---|---|
| 3: liquid crystal layer | 110: first substrate |
| 121: gate line | 131: storage electrode line |
| 133: storage electrode | 171: data line |
| 191: pixel electrode | 191h: first subpixel electrode |
| 191l: second subpixel electrode | 198: slit |
| 210: second substrate | 220: light-blocking member |
| 230R: first color filter | 230G: second color filter |
| 230B: third color filter | 270: common electrode |

What is claimed is:

1. A liquid crystal display comprising:
   a first color pixel area, a second color pixel area, a third color pixel area, and a white pixel area;
   a first substrate and a second substrate facing each other;
   a first color filter disposed in the first color pixel area on any one of the first substrate and the second substrate;
   a second color filter disposed in the second color pixel area on any one of the first substrate and the second substrate;
   a third color filter disposed in the third color pixel area on any one of the first substrate and the second substrate; and
   a liquid crystal layer between the first substrate and the second substrate,
   wherein the first color filter and the second color filter have respectively a further disposed part in the white pixel area,
   wherein the further disposed parts in the white pixel area of the first color filter and the second color filter are overlapped with each other in the white pixel area,
   wherein the further disposed part in the white pixel area of the first color filter extends in a first direction,
   wherein the further disposed part in the white pixel area of the second color filter extends in a second direction, and
   wherein the first color is a green color filter, and the second color filter is a blue color filter.

2. The liquid crystal display of claim 1, wherein the further disposed part in the white pixel area of the first color filter is connected to the first color filter, and the further disposed part in the white pixel area of the second color filter is connected to the second color filter.

3. The liquid crystal display of claim 1, wherein the first color filter and the second color filter cross each other in the white pixel area, and are overlapped with each other at a portion at which they cross each other.

4. The liquid crystal display of claim 1, further comprising:
a pixel electrode disposed in each of the first, second, third, and white pixel areas on any of the first substrate and the second substrate,
wherein the first color filter and the second color filter are overlapped with the pixel electrode in the white pixel area.

5. The liquid crystal display of claim 4, wherein an area of the further disposed part in the white pixel area of the first color filter ranges from 17% to 26% of the white pixel area, and
wherein an area of the further disposed part in the white pixel area of the second color filter ranges from 12% to 17% of the white pixel area.

6. The liquid crystal display of claim 4, wherein the pixel electrode includes a first subpixel electrode and a second subpixel electrode, and
wherein the first color filter and the second color filter are overlapped with the second subpixel electrode in the white pixel area.

7. The liquid crystal display of claim 6, wherein a data voltage that is applied to the second subpixel electrode is lower than a data voltage that is applied to the first subpixel electrode.

8. The liquid crystal display of claim 1, wherein the first color filter, the second color filter, and the third color filter are overlapped with each other in the white pixel area.

9. The liquid crystal display of claim 8, wherein the first color filter and the second color filter cross each other in the white pixel area, and the third color filter is disposed at a portion at which the first color filter and the second color filter cross each other.

10. The liquid crystal display of claim 9, further comprising:
a pixel electrode disposed in each of the first, second, third, and white pixel areas,
wherein the first color filter and the second color filter are overlapped with the pixel electrode in the white pixel area.

11. The liquid crystal display of claim 10, wherein a thickness of a portion at which the first color filter, the second color filter, and the third color filter are overlapped with each other in the white pixel area is the same as a cell gap of the liquid crystal display.

* * * * *